US011580166B2

(12) United States Patent
Malak et al.

(10) Patent No.: US 11,580,166 B2
(45) Date of Patent: Feb. 14, 2023

(54) REGULAR EXPRESSION GENERATION USING SPAN HIGHLIGHTING ALIGNMENT

(71) Applicant: Oracle International Corporation, Redwood Shores, CA (US)

(72) Inventors: Michael Malak, Denver, CO (US); Luis E. Rivas, Denver, CO (US); Mark L. Kreider, Arvada, CO (US)

(73) Assignee: Oracle International Corporation, Redwood Shores, CA (US)

(*) Notice: Subject to any disclaimer, the term of this patent is extended or adjusted under 35 U.S.C. 154(b) by 12 days.

(21) Appl. No.: 16/904,316

(22) Filed: Jun. 17, 2020

(65) Prior Publication Data

US 2020/0320142 A1  Oct. 8, 2020

Related U.S. Application Data

(63) Continuation-in-part of application No. 16/438,330, filed on Jun. 11, 2019, now Pat. No. 11,263,247.

(60) Provisional application No. 62/865,797, filed on Jun. 24, 2019, provisional application No. 62/684,498, filed on Jun. 13, 2018, provisional application No. 62/749,001, filed on Oct. 22, 2018.

(51) Int. Cl.
*G06F 16/00* (2019.01)
*G06F 16/903* (2019.01)
*G06F 16/242* (2019.01)
*G06F 16/951* (2019.01)

(52) U.S. Cl.
CPC ...... *G06F 16/90344* (2019.01); *G06F 16/242* (2019.01); *G06F 16/951* (2019.01)

(58) Field of Classification Search
None
See application file for complete search history.

(56) References Cited

U.S. PATENT DOCUMENTS 6,373,971 B1   4/2002  Floratos et al.
7,389,530 B2 * 6/2008  Raghunath ......... G07C 9/00309
                                                          726/2

(Continued)

FOREIGN PATENT DOCUMENTS

WO   2015012812   1/2015

OTHER PUBLICATIONS

Generating regular expression signatures for network traffic classification in trusted network management, Wang et al., (Year: 2011).*

(Continued)

*Primary Examiner* — Jean M Corrielus
(74) *Attorney, Agent, or Firm* — Kilpatrick Townsend & Stockton LLP

(57) ABSTRACT

Techniques for generated regular expressions are disclosed. In some embodiments, a regular expression generator may receive input data comprising one or more character sequences. The regular expression generator may convert character sequences into a sets of regular expression codes and/or span data structures. The regular expression generator may identify a longest common subsequence shared by the sets of regular expression codes and/or spans, and may generate a regular expression based upon the longest common subsequence. Alignment of span data structures may be performed when generating the regular expression.

18 Claims, 56 Drawing Sheets

(56) References Cited

U.S. PATENT DOCUMENTS

| | | | |
|---|---|---|---|
| 7,540,025 B2* | 5/2009 | Tzadikario | H04L 63/1425 726/25 |
| 7,680,867 B2 | 3/2010 | Green et al. | |
| 7,792,814 B2 | 9/2010 | Cohen | |
| 7,814,111 B2* | 10/2010 | Levin | G06N 5/025 726/22 |
| 7,818,311 B2 | 10/2010 | Michailov | |
| 8,484,238 B2 | 7/2013 | Loeser et al. | |
| 8,577,817 B1 | 11/2013 | Keralapura et al. | |
| 8,843,508 B2* | 9/2014 | Thorup | G06F 7/02 707/769 |
| 8,862,603 B1* | 10/2014 | Watson | G06F 16/90344 707/804 |
| 8,892,580 B2 | 11/2014 | Syrowitz et al. | |
| 9,959,265 B1 | 5/2018 | Vagell et al. | |
| 10,474,707 B2 | 11/2019 | Atasu | |
| 11,263,247 B2 | 3/2022 | Malak et al. | |
| 11,347,779 B2 | 5/2022 | Malak et al. | |
| 11,354,305 B2 | 6/2022 | Malak et al. | |
| 2002/0143780 A1 | 10/2002 | Gorman | |
| 2005/0055365 A1 | 3/2005 | Ramakrishnan et al. | |
| 2005/0273450 A1* | 12/2005 | McMillen | G06V 10/94 |
| 2005/0278175 A1* | 12/2005 | Hyvonen | G06F 16/90344 704/242 |
| 2006/0062468 A1* | 3/2006 | Xu | G06V 30/1423 382/186 |
| 2007/0013968 A1 | 1/2007 | Ebaugh et al. | |
| 2007/0198565 A1 | 8/2007 | Ivanov et al. | |
| 2009/0070327 A1 | 3/2009 | Loeser et al. | |
| 2010/0174678 A1* | 7/2010 | Massand | G06F 40/18 707/610 |
| 2011/0307874 A1* | 12/2011 | Messerly | G06F 40/18 717/140 |
| 2012/0124064 A1* | 5/2012 | Syrowitz | G06F 16/90344 707/754 |
| 2014/0040313 A1* | 2/2014 | Shami | G06F 16/215 707/780 |
| 2014/0122932 A1 | 5/2014 | Chen et al. | |
| 2014/0164376 A1 | 6/2014 | Yang et al. | |
| 2014/0258189 A1 | 9/2014 | Schmidt | |
| 2014/0359574 A1 | 12/2014 | Beckwith et al. | |
| 2014/0372854 A1 | 12/2014 | Otero et al. | |
| 2015/0074507 A1 | 3/2015 | Riediger et al. | |
| 2015/0278355 A1 | 10/2015 | Hassanpour et al. | |
| 2015/0286346 A1 | 10/2015 | Liu et al. | |
| 2015/0378977 A1 | 12/2015 | Moharir et al. | |
| 2016/0026730 A1 | 1/2016 | Hasan | |
| 2016/0092090 A1 | 3/2016 | Stojanovic et al. | |
| 2016/0117387 A1 | 4/2016 | Hernandez et al. | |
| 2016/0125007 A1 | 5/2016 | Salisbury | |
| 2016/0224531 A1 | 8/2016 | Robichaud et al. | |
| 2017/0083613 A1 | 3/2017 | Atasu | |
| 2017/0090874 A1 | 3/2017 | Blumenau | |
| 2017/0091190 A1 | 3/2017 | Attias et al. | |
| 2017/0116238 A1 | 4/2017 | Ent et al. | |
| 2017/0161631 A1 | 6/2017 | Rogers et al. | |
| 2017/0220543 A1* | 8/2017 | Canton | G06F 40/111 |
| 2018/0113894 A1 | 4/2018 | Raza et al. | |
| 2018/0276393 A1 | 9/2018 | Allen et al. | |
| 2018/0322218 A1* | 11/2018 | Kou | G06F 16/90344 |
| 2018/0367699 A1 | 12/2018 | Sato | |
| 2019/0026437 A1 | 1/2019 | Syeda-Mahmood | |
| 2019/0095439 A1* | 3/2019 | Cai | G06F 16/353 |

OTHER PUBLICATIONS

Regular Expression constrained sequence alignment, Abdullah N. Arslan (Year: 2007).*

Romano Roni, Lior Rokanch and Oded Maimon, "Automatic discovery of regular expression patterns representing negated findings in medical narrative reports", international workshop on next generation information technologies and system Springer, Belin Heidelberg (Year: 2006).*

Multiple Sequence Alignment Using ClustalW and ClustalX (Thompson et al.,) (Year: 2002).*

"eyePatterns: Software for Identifying Patterns and Similarities Across Fixation Sequences" (West et al.,) (Year: 2008).*

U.S. Appl. No. 16/438,327, Non-Final Office Action dated Sep. 17, 2020, 20 pages.

Arslan, Regular Expression Constrained Sequence Alignment, Journal of Discrete Algorithms, vol. 5, No. 4, Oct. 18, 2007, pp. 647-661.

Hanafi et al., SEER: Auto-Generating Information Extraction Rules from User-Specified Examples, CHI '17: Proceedings of the 2017 CHI Conference on Human Factors in Computing Systems, May 2017, pp. 6672-6682.

International Application No. PCT/US2020/038431, International Search Report and Written Opinion dated Sep. 15, 2020, 16 pages.

International Application No. PCT/US2020/038432, International Search Report and Written Opinion dated Sep. 16, 2020, 14 pages.

International Application No. PCT/US2020/038429, International Search Report and Written Opinion dated Sep. 28, 2020, 15 pages.

Wang et al., Generating Regular Expression Signatures for Network Traffic Classification in Trusted Network Management, Journal of Network and Computer Applications, vol. 35, No. 3, May 2012, pp. 992-1000.

Dash, et al. Parallel Algorithm for Longest Common Subsequence in a String. Proceedings of National Conference on AIRES-2012. 4 pages, Jun. 2012.

Hirschberg; Daniel, Algorithms for the Longest Common Subsequence Problem, Journal of the Association for computing Machinery, vol. 24, No. 4, pp. 664-675, Oct. 1977.

Iliopoulos, et al. A New Efficient Algorithmfor Computing the Longest Common Subsequence, Theory of Computing Systems, vol. 45, 23 pages, Jan. 2009.

Iliopoulos, et al. Algorithms for Computing Variants of the Longest Common Subsequence Problem, Theoretical Computer Science, vol. 395, Issue 2-3, pp. 257-267, May 2008.

Kawade et al. *An Analysis on Computation of Longest Common Subsequence Algorithm*, IEEE Proceedings of the International Conference on Intelligent Sustainable Systems, pp. 982-987, Dec. 2017.

Ozsoy, et al. *Fast Longest Common Subsequence with General Integer Scoring Support on GPUs*, PMAM'14: Proceedings of Programming Models and Applications on Multicores and Manycores, 11 pages, Feb. 2014.

Tsai, *The Constrained Longest Common Subsequence Problem*, Information Processing Letters, vol. 88, No. 4, pp. 173-176, Nov. 2003.

U.S. Appl. No. 16/483,330 received a First Action Interview Pilot Program Pre-Interview Communication dated Jun. 15, 2021, 7 pages.

U.S. Appl. No. 16/483,327 received a Non-Final Office Action dated Jul. 8, 2021, 24 pages.

"Adjacency Matrix", Wikipedia, Available online at: https://en.wikipedia.org/wiki/Adjacency_matrix, Accessed from Internet on Jun. 19, 2018, pp. 1-7.

"Alternation with the Vertical Bar or Pipe Symbol", Regex Tutorial, Available Online at: https://www.regular-expressions.info/alternation.html, Accessed from Internet on Jun. 19, 2018, pp. 1-2.

"Big Data Preparation", Online Product Page, ORACLE Cloud, Available Online at: https://web.archive.org/web/20160414153654/https://cloud.oracle.com/bigdatapreparation, Jul. 24, 2019, 5 pages.

"Character Classes or Character Sets", Regexp Tutorial, Available Online at: https://www.regular-expressions.info/charclass.html, Accessed from Internet on Jun. 19, 2018, pp. 1-2.

Class Pattern, Java™ Platform Standard Ed 8, Available Online at: https://docs.oracle.com/javase/8/docs/api/java/util/regex/Pattern.html#matcher-java.lang.CharSequence-, Accessed from Internet on Sep. 25, 2018, 17 pages.

"Depth-First Search", Wikipedia, Available Online at: https://en.wikipedia.org/wiki/Depth-first_search, Accessed from Internet on Jun. 19, 2018, pp. 1-7.

"Explore Suggestions", TRIFACTA, Available online at: https://docs.trifacta.com/display/SS/Explore+Suggestions, Accessed from Internet on Jul. 24, 2019, 4 pages.

(56) References Cited

OTHER PUBLICATIONS

"Longest Common Subsequence Problem", Wikipedia, Available online at: https://en.wikipedia.org/wiki/Longest_common_subsequence_problem, Accessed from Internet on Jun. 19, 2018, pp. 1-14.
"Lookahead and Lookbehind Zero-Length Assertions", Regex Tutorial, Available online at: https://www.regular-expressions.info/lookaround.html, Accessed from Internet on Jun. 19, 2018, pp. 1-3.
"Packages", Scala Standard Library, 2.12.0, Available Online at: https://www.scala-lang.org/api/2.12.0/scala/Int.html#to(end:Int,step:Int):scala.collection.immutable.Range.Inclusive, Accessed from Internet on Jun. 21, 2019, pp. 1-115.
"Parentheses for Grouping and Capturing", Regex Tutorial, Available Online at: https://www.regularexpressions.info/brackets.html, Accessed from Internet on Jun. 19, 2018, 1 page.
"Reading COBOL Layouts, Part 1", COBOL Basics, Tech Talk, COBOL Tutorials, Available Online at: http://www.3480-3590-dataconversion.com/article-reading-cobol-layouts-1.html, Jul. 26, 2019, 6 pages.
"Regex", Scala Standard Library2.12.3, Available online at: https://www.scala-lang.org/api/2.12.3/scala/util/matching/Regex.html#pattern:java.util.regex.Pattern, Accessed from Internet on Sep. 25, 2018, 9 pages.
"Regex Generator++", Machine Learning Lab, Available Online at: http://regex.inginf.units.it/, Accessed from Internet on Sep. 21, 2018, 2 pages.
"Repetition with Star and Plus", Regex Tutorial, Available Online at: https://www.regular-expressions.info/repeat.html, Accessed from Internet on Jun. 19, 2018, pp. 1-2.
"StringOps", Scala Standard Library2.12.3, Available online at: https://www.scala-lang.org/api/2.12.3/scala/collection/immutable/StringOps.html#head:A, Accessed from Internet on Sep. 21, 2018, 75 pages.
"Unicode Characters and Properties", Regex Tutorial, Available Online at: https://www.regular-expressions.info/unicode.html, Accessed from Internet on Jun. 19, 2018, pp. 1-6.
Barsky et al., "Shortest Path Approaches for the Longest Common Subsequence of a Set of Strings", IEEE 7th International Symposium on BioInformatics and BioEngineering, Oct. 14-17, 2007, 7 pages.
Bartoli et al., "Active Learning of Regular Expressions for Entity Extraction", IEEE Transactions on Cybernetics, vol. 48, No. 3, Mar. 2018, pp. 1067-1080.
Bartoli et al., "Inference of Regular Expressions for Text Extraction from Examples", IEEE Transactions on Knowledge and Data Engineering, vol. 28, No. 5, Available online at: http://www.human-competitive.org/sites/default/files/bartoli-delorenzo-medvet-tarlao-tkde-paper.pdf, May 2016, pp. 1217-1230.
Bergroth et al., "A Survey of Longest Common Subsequence Algorithms", Proceedings Seventh International Symposium on String Processing and Information Retrieval, Sep. 27-29, 2000, pp. 39-48.
Brauer et al., "Enabling Information Extraction by Inference of Regular Expressions from Sample Entities", CIKM '11 Proceedings of the 20th ACM International Conference on Information and Knowledge Management, Available Online at: http://vi.ikt.ui.sav.sk/@api/deki/files/2113/=p1285-brauer.pdf, Oct. 24-28, 2011, pp. 1285-1294.
Collins; Dave, "Designing Object-Oriented User Interfaces", Benjamin-Cummings Publishing Co., Inc., 1995, relevant pp. 270-271, 590 pages.
Denning; Peter, "Thrashing: Its Causes and Prevention", American Federation of Information Processing Societies, vol. 1, Available Online at: https://cs.uwaterloo.ca/~brecht/courses/702/Possible-Readings/vm-and-gc/thrashing-denning-afips-1968.pdf, Dec. 9-11, 1968, pp. 915-922.
Li et al., "Regular Expression Learning for Information Extraction", Proceedings of the 2008 Conference on Empirical Methods in Natural Language Processing, Oct. 2008, pp. 21-30.

Miller; Heather. "Style Guide, Method Invocation", Infix Notation, Available online at: https://docs.scala-lang.org/style/method-invocation.html#infix-notation, Accessed from Internet on Sep. 25, 2018, pp. 1-4.
Prim et al., "Shortest Connection Networks and Some Generalizations", The Bell System Technical Journal, vol. 36, No. 6, Available online at: https://ia801407.us.archive.org/14/items/bstj36-6-1389/bstj36-6-1389.pdf, Nov. 1957, pp. 1389-1401.
Rokach et al., "A Decision Tree Framework for Semi-Automatic Extraction of Product Attributes from the Web", Advances in Web Intelligence and Data Mining, vol. 23, Available online at: https://link.springer.com/chapter/10.1007%2F3-540-33880-2_21, 2006, pp. 201-210.
Sisto; Matt, CSS "Ripple/Wave" Checkbox and Radio Button, Available Online at: https://codepen.io/msisto/pen/ICofE/, Accessed from Internet on Jun. 24, 2019, 1 page.
Smetanin; Nikita, "Fuzzy String Search", Nikita's blog, Available Online at: http://ntz-develop.blogspot.com/, Mar. 24, 2011, 7 pages.
Wagner et al., "The String-to-String Correction Problem", Journal of the Association for Computing Machinery, vol. 21, No. 1, Available online at: http://www.inrg.csie.ntu.edu.tw/algorithm2014/homework/Wagner-74.pdf, Jan. 1974, pp. 168-173.
Wu et al., "A Supervised Learning Algorithm for Information Extraction from Textual Data", Available Online at: https://pdfs.semanticscholar.org/162c/d8d8dfea1d58c0da2433806b9db9f79e095b.pdf, 2003, 12 pages.
International Application No. PCT/US2019/036815, International Search Report and Written Opinion dated Aug. 21, 2019, 15 pages.
International Application No. PCT/US2019/036824, International Search Report and Written Opinion dated Aug. 21, 2019, 17 pages.
International Application No. PCT/US2019/036829, International Search Report and Written Opinion dated Aug. 23, 2019, 15 pages.
International Application No. PCT/US2019/036834, International Search Report and Written Opinion dated Aug. 27, 2019, 13 pages.
Kaur, *Usage of Regular Expressions in NLP*, International Journal of Research in Engineering and Technology—IJERT, vol. 3, No. 1, Jan. 2014, pp. 168-174.
Romano et al., *Automatic Discovery of Regular Expression Patterns Representing Negated findings in Medical Narrative Reports*, NGITS'06: Proceedings of the 6th international conference on Next Generation Information Technologies and Systems, Jul. 2006, pp. 300-311.
U.S. Appl. No. 16/438,313, Notice of Allowance dated Oct. 29, 2021, 18 pages.
U.S. Appl. No. 16/438,316, Non-Final Office Action dated Sep. 9, 2021, 26 pages.
U.S. Appl. No. 16/904,273, Non-Final Office Action dated Sep. 2, 2021, 31 pages.
U.S. Appl. No. 16/438,330, Notice of Allowance dated Sep. 8, 2021, 20 pages.
U.S. Appl. No. 16/438,316, Final Office Action dated Feb. 15, 2022, 34 pages.
U.S. Appl. No. 16/904,273, Notice of Allowance dated Feb. 16, 2022, 5 pages.
U.S. Appl. No. 16/438,321, Notice of Allowance dated Jan. 5, 2022, 9 pages.
U.S. Appl. No. 16/438,325, First Action Interview Pilot Program Pre-Interview Communication dated Dec. 24, 2021, 15 pages.
U.S. Appl. No. 16/904,298, First Action Interview Pilot Program Pre-Interview Communication dated Dec. 8, 2021, 14 pages.
U.S. Appl. No. 16/438,325, "Final Office Action", dated Aug. 16, 2022, 15 pages.
U.S. Appl. No. 16/904,298, "Final Office Action", dated Aug. 17, 2022, 14 pages.
International Application No. EP19737323.6, "Office Action", dated May 24, 2022, 11 pages.
International Application No. IN202047048906, "First Examination Report", dated Aug. 1, 2022, 7 pages.
International Application No. IN202047052875, "First Examination Report", dated Jul. 22, 2022, 7 pages.
International Application No. IN202047053332, "First Examination Report", dated Aug. 1, 2022, 7 pages.

* cited by examiner

REGULAR EXPRESSION GENERATION USING SPAN HIGHLIGHTING ALIGNMENT

CROSS REFERENCE TO RELATED APPLICATIONS

The present application is a continuation in-part of U.S. patent application Ser. No. 16/438,330, filed Jun. 11, 2019, entitled, "REGULAR EXPRESSION GENERATION USING LONGEST COMMON SUBSEQUENCE ALGORITHM ON SPANS," which claims priority under 35 U.S.C. § 119(e) to U.S. Provisional Patent Application No. 62/684,498, filed Jun. 13, 2018, entitled "AUTOMATED GENERATION OF REGULAR EXPRESSIONS," and also claims priority under 35 U.S.C. § 119(e) to U.S. Provisional Patent Application No. 62/749,001, filed Oct. 22, 2018, entitled "AUTOMATED GENERATION OF REGULAR EXPRESSIONS." The present application also claims priority under 35 U.S.C. § 119(e) to U.S. Provisional Patent Application No. 62/865,797, filed Jun. 24, 2019, entitled "AUTOMATED GENERATION OF REGULAR EXPRESSIONS." The entire contents of which are incorporated herein by reference for all purposes.

BACKGROUND

Big data analytics systems can be used for predictive analytics, user behavior analytics, and other advanced data analytics. However, before any data analysis may be performed effectively to provide useful results, the initial data set may need to be formatted into clean and curated data sets. This data onboarding often presents challenges for cloud-based data repositories and other big data systems, where data from various different data sources and/or data streams may be compiled into a single data repository. Such data may include structured data in multiple different formats, semi-structured data in accordance with different data models, and even unstructured data. Repositories of such data often include data representations within various different formats and structures, and also may include duplicate data and erroneous data. When these data repositories are analyzed for reporting, predictive modeling, and other analytics tasks, a poor signal-to-noise ratio of the initial data set may lead to results that are inaccurate or not useful.

Many current solutions to the problems of data formatting and preprocessing include manual and ad hoc processes to clean and curate the data, in order to manipulate the data into a common format before performing a data analysis. While these manual processes can be effective for certain smaller data sets, such processes may be inefficient and impractical when attempting to preprocess and format large-scale data sets.

BRIEF SUMMARY

Aspects described herein provide various techniques for generating regular expressions. As used herein, a "regular expression" may refer to a sequence of characters defining a pattern, which may be used to search for matches within longer input text strings. In some embodiments, regular expressions may be composed using a symbolic wildcard-matching language, and the patterns defined by regular expressions may be used to match character strings and/or extract information from character strings provided as input. In various embodiments described herein, a regular expression generator implemented as data processing system may be used to receive and display input text data, receive selections via a client user interface of specific character subsets of the input text, and then generate one or more regular expressions based on the selected character subsets. After generating one or more regular expressions, a regular expression engine may be used to match the pattern of the regular expression against one or more data sets. In various embodiments, data matching the regular expression may be extracted, reformatted, or modified, etc. In some cases, additional columns, tables, or other data sets may be created based on the data matching the regular expression.

According to certain aspects described herein, a regular expression generator implemented via a data processing system may generate regular expressions based upon a determined longest common subsequence (LCS) that is shared by different sets of one or more regular expression codes. Regular expression codes (which also may be referred to as category codes) may include, for example, L for letters of the English alphabet, N for numbers, Z for white spaces, P for punctuation marks, and S for other symbols. Each set of one or more regular expression codes may be converted from a different sequence of one or more characters received as input data through a user interface. Regular expression codes excluded from the LCS may be represented as optional and/or alternatives. In some embodiments, a regular expression code may be associated with a minimum number of occurrences of the regular expression code. Additionally or alternatively, the regular expression code may be associated with a maximum number of occurrences of the regular expression code. For example, a set of category codes may comprise L<0,1> to indicate that a particular portion of an LCS includes a letter at most once if at all. As discussed in more detail below, generalizing the input data as intermediate regular expression codes (IRECs) may provide various technical advantages, including, using very little input data, enabling near-instantaneous generation of regular expressions that do not succumb to false positive matches or false negative matches in yet-to-be-seen data.

According to additional aspects described herein, a regular expression may be generated based on input data comprising three or more character sequences. When three or more character sequences are identified as input data, a regular expression generator that identifies the LCS of the character sequences may result in an exponential increase in runtime. In order to identify the LCS of all character sequences in a performant manner, the regular expression generator may perform an LCS algorithm on each distinct combination of two character sequences. A fully-connected graph may be generated based on the results of the LCS algorithms, where each graph node represents a different character sequence and the length of each graph edge corresponds to the LCS of the nodes defining the graph edge. The order for selecting character sequences then may be determined by performing a depth-first traversal of a minimum spanning tree for the fully-connected graph.

Further aspects described herein relate to generating regular expressions based on input including both positive character sequence examples and negative character sequence examples. A positive example may refer to sequence of characters that are to match the regular expression to be generated, while a negative example may refer to a sequence of characters that are not to match the regular expression to be generated. In some embodiments, when both positive and negative examples are received, the regular expression generator may identify a discriminator, or shortest subsequence of one or more characters that distinguish the positive example(s) from the negative example(s). The selected discriminator may be a shortest sequence (e.g., expressed in category codes), and may either be positive or negative, so that the positive examples will match and the negative examples will not. The discriminator then may be hard-coded into the regular expression that is generated by the regular expression generator. In some cases, the shortest subsequence may be included in a prefix or suffix portion of the negative example(s).

Additional aspects described herein relate to one or more user interfaces through which input data may be provided to generate regular expressions. In some embodiments, a user interface may be displayed at a client device communicatively coupled to the regular expression generator server. The user interface may be generated programmatically by the server, by the client device, or by a combination of software components executing at the server and the client. Input data received via the user interface may correspond to user selections of one or more character sequences, which may represent positive or negative examples. In some cases, the user interface may support input data that includes a selection of a first character sequence within a second character sequence. For instance, a user may highlight one or more characters within a larger previously highlighted character sequence, and the second user selection may provide context for the larger first user selection. This enables input data to be provided to the regular expression generator with greater specificity, and to provide the regular expression generator with "context" so that it can generate regular expressions that avoid false positives. In response to a user selection of a character sequence via the user interface, the regular expression generator may generate and display a regular expression. For example, when a user highlights a first sequence of characters, the regular expression generator may generate and display a regular expression matching the first sequence of characters, as well as other similar character sequences (e.g., aligning with the intentions of the user for matching sequences). When the user highlights a second sequence of characters, the regular expression generator may generate an updated regular expression which encompasses both the first and second sequences of characters. Then, when the user highlights a third sequence of characters (e.g., within either the first or second sequence) the regular expression generator may update the regular expression again, and so on.

In accordance with additional aspects described herein, regular expressions may be generated based on the longest common subsequence from one or more input sequence examples, but also may handle characters that are present in only some of the examples. To handle characters that are present in only some input examples, spans may be defined in which both a minimum and maximum number of occurrences of a regular expression code are tracked. In cases when a span might not present at all of the given input examples, the minimum number of occurrences may be set to zero. These minimum and maximum numbers can then be mapped to the regular expression multiplicity syntax. A longest common subsequence (LCS) algorithm may be run on the spans of characters derived from the input examples, including "optional" spans (e.g., minimum length of zero) which do not appear in every input example. As discussed below, consecutive spans may be merged during the execution of the LCS algorithm. In such cases, when extra optional spans that are being carried along end up appearing consecutively, the LCS algorithm may be run recursively on those optional spans as well.

Further aspects described herein relate to a combinatoric search, in which the LCS algorithm executed by the regular expression generator may be run multiple times to generate a "correct" regular expression (e.g., a regular expression that properly matches all given positive examples and properly excludes all given negative examples), and/or to generate multiple correct regular expressions from which a most desirable or optimal regular expression may be selected. In some embodiments, an LCS algorithm may generally be executed right-to-left on the input examples to generate a regular expression. However, for comparison purposes and to find alternative regular expressions, the LCS algorithm may be separately executed backward (e.g., in the left-to-right direction) on the input examples. For example, the example character sequences received as user input may be reversed before they are run through the LCS algorithm, and the results from the LCS algorithm then may be reversed back (including the original text fragments). Further, in some embodiments, the LCS algorithm may be run multiple times by the regular expression generator, both in the usual character sequence order and the reverse order, with anchoring at the beginning of the line, anchoring at the end of the line, and no anchoring at the beginning or end the line. Thus, in some cases, the LCS algorithm may be execute at least these six times, and the shortest successful regular expression may be selected from these executions.

BRIEF DESCRIPTION OF THE DRAWINGS

FIG. 17 is another example user interface screen illustrating the generation of a regular expression and capture group based on selection of data from a tabular display, according to one or more embodiments described herein.

FIGS. 25A and 25B illustrate a user interface for implementing a split command, in accordance with some example embodiments.

FIG. 26 illustrates a user interface displaying the results of a split command on a data set, in accordance with some example embodiments.

FIG. 28 illustrates a user interface for implementing a delete command, in accordance with some example embodiments.

FIG. 29 illustrates a user interface displaying the results of a delete command on a data set, in accordance with some example embodiments.

FIGS. 34 and 35 illustrate a user interface for implementing a replace command, in accordance with some example embodiments.

FIG. 36 illustrates a user interface displaying the results of the replace command on a data set, in accordance with some example embodiments.

FIG. 40 illustrates a user interface displaying the results of the filter rows command on a data set, in accordance with some example embodiments.

FIG. 46 illustrates a user interface displaying an updated generated regex, in accordance with some example embodiments.

FIG. 47 illustrates a user interface displaying alternative data highlighting, in accordance with some example embodiments.

DETAILED DESCRIPTION

Figure 1:
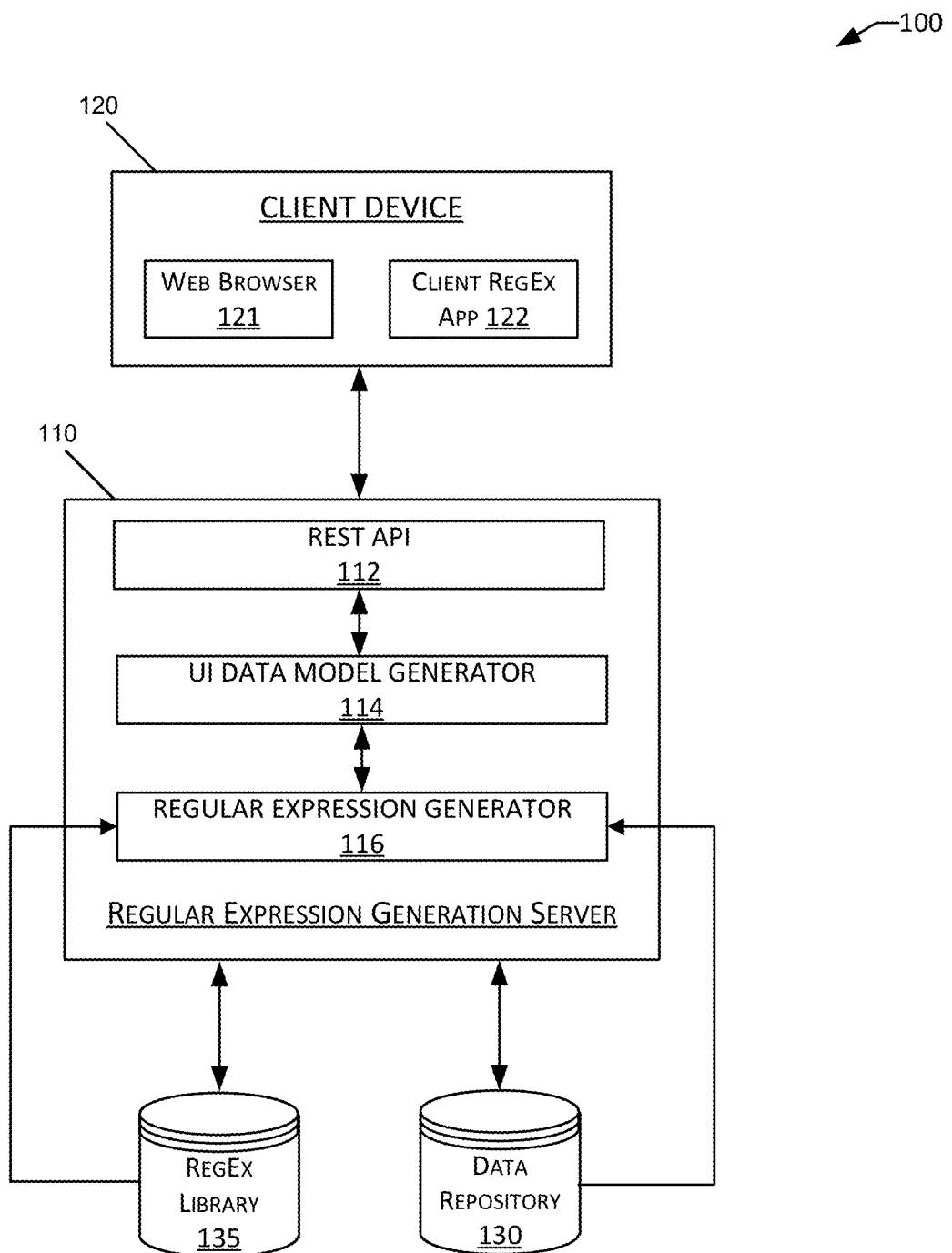
FIG. 1 is a block diagram illustrating components of an exemplary distributed system for generating regular expressions, in which various embodiments may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to non-transitory media such as portable or fixed storage devices, optical storage devices, and various other mediums capable of storing, containing or carrying instruction(s) and/or data. A code segment or computer-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various techniques (e.g., methods, systems, non-transitory computer-readable storage memory storing a plurality of instructions executable by one or more processors, etc.) are described herein for generating regular expressions corresponding to patterns identified within one or more input data examples. In certain embodiments, in response to receiving selections of input data, one or more patterns in the input data are automatically identified and a regular expression (or "regex" for short) may be automatically and efficiently generated to represent the identified patterns. Such patterns may be based upon sequences of characters (e.g., sequences of letters, numbers, spaces, punctuation marks, symbols, etc.). Various embodiments are described herein, including methods, systems, non-transitory computer-readable storage media storing programs, code, or instructions executable by one or more processors, and the like.

In some embodiments, regular expressions may be composed using a symbolic wildcard-matching language, in order to match character strings and/or extract information from character strings provided as input. For instance, a first example regular expression [A-Za-z] {3} \d?\d, \d\d\d\d may match certain dates (e.g., Apr. 3, 2018), and a second example regular expression [A-Za-z] {3} \d?\d, (\d\d\d\d) may be used to extract the year from matching dates. Input data received by a regular expression generator system may include, for example, one more "positive" data examples, and/or one or more "negative" data examples. As used herein, a positive example may refer to a character sequence received as input that is to be matched by a regular expression generated based on the input. In contrast, a negative example may refer to an input character sequence that is not to be matched by a regular expression generated based on the input.

A number of technical advantages may be realized within the various embodiments and examples described herein. For example, certain techniques described in this disclosure may improve speed and efficiency of regular expression generation processes (e.g., regex solutions may be generated in less than a second, and user interfaces may be suitable for interactive real-time use). Various techniques described herein also may be deterministic, may require no training data, may produce a solution without requiring any initial regular expression input, and may be completely automated (e.g., generating regular expressions within requiring any human intervention). Furthermore, various techniques described herein need not be limited regarding the types of data inputs that may be handled effectively, and such techniques may improve human readability of the resulting regular expressions.

Certain embodiments described herein include one or more executions of a Longest Common Subsequence (LCS) algorithm. LCS algorithms may be used in some contexts as difference engines (e.g., the engine behind the Unix "diff" utility) which are configured to determine and show differences between two text files. In some embodiments, input data (e.g., strings and other character sequences) may be converted into abstract tokens, which then may be provided as inputs to an LCS algorithm. Such abstract tokens may be for example, tokens based upon regular expression codes (e.g., Loogle codes or other character class codes) representing regular expression character classes. Various different examples of such codes are possible, and may be referred to herein as "regular expression codes" or "intermediate regular expression codes" (IRECs). For example, an input character sequence "May 3" may be converted to the IREC code "LLLZN," after which the tokenized string may be provided with other tokenized strings to the LCS algorithm. In some embodiments, IRECs (e.g., regular expression codes) that the input character sequences do not have in common, may appear in the final generated regular expression as optional (e.g., an optional span). In certain embodiments, regular expression codes may be category codes based upon the Unicode category codes shown at https://www.regular-expressions.info/unicode.html#category, or the general category property codes at http://unicode.org/reports/tr18/#General Category Property. For instance, the code L may represent letters, the code N may represent numbers, the code Z may represent spaces, the code S may represent symbols, the code P may represent punctuation, and so on. For example, the code L may correspond to Unicode \p{L} and the code N may correspond to Unicode \p{N}. This allows for working one-to-one mappings from the LCS output to regular expressions (e.g. \pN\pN\pZ\pL\pL can match "10 am"), which may provide advantages for human readability. Additionally, these different categories may be disjoint, or mutually exclusive. That is, in this example, the categories L, N, Z, P, and S may be disjointed so that there may be no overlap between members of the categories.

Additional technical advantages may be realized in various embodiments, including more efficient generation of regular expressions based on the use of regular expressions codes (e.g., category codes), spans, etc. By using such codes, computing resources need not be wasted when the LCS algorithm successfully identifies all or substantially all of the characters in the input strings as being different. Further technical advantages provided by the various embodiments herein include improved readability of the generated regular expressions, as well as supporting both positive and negative examples as input data, and providing various advantageous user interface features (e.g., allowing the user to highlight text fragments within a larger character sequence or data cell for extraction).

I. GENERAL OVERVIEW

Various embodiments disclosed herein are related to generation of regular expressions. In some embodiments, a data processing system configured as a regular expression generator may generate a regular expression, by identifying a longest common subsequence (LCS) that is shared by different sets of regular expression codes (e.g., category codes). Each set of regular expression codes may be converted from sequence of characters received as input data through a user interface. Among the technical advantages described herein, abstracting input data as intermediate codes (e.g., regular expression codes, spans, etc.) may enable efficient generation of regular expressions using very little input data.

FIG. 1 is a block diagram illustrating components of an exemplary distributed system for generating regular expressions, in which various embodiments may be implemented. As shown in this example, a client device 120 may communicate with a regular expression generator server 110 (or regular expression generator) and interact with a user interface to retrieve and display tabular data, and generate regular expressions based on the selection of input data (e.g., examples) via the user interface. In some embodiments, a client device 120 may communicate with a regular expression generator 110 via a client web browser 121 and/or a client-side regular expression application 122 (e.g., client-side application that receives/consumes regular expressions generated by a server 110). Within the regular expression generator 110, requests from client devices 120 may be received over various communication networks at an network interface and processed by an application programming interface (API), such as a REST API 112. A user interface data model generator 114 component with the regular expression generator 110 may provide the server-side programming components and logic to generate and render the various user interface features described herein. Such feature may include the functionality to allow users to retrieve and display tabular data from data repositories 130, select input data examples to initiate the generation of regular expressions, and modify and/or extract data based the regular expressions generated. In this example, a regular expression generator component 116 may be implemented to generate regular expressions, including converting input character sequences into regular expression codes and/or spans, executing algorithms (e.g., LCS algorithms) on input data, and generating/simplifying regular expressions. The regular expressions generated by the regular expression generator 116, may be transmitted by the REST service 112 to the client device 120, where Javascript code on the client browser 121 (or corresponding client-side application components 122) may then apply the regular expression against every cell in the spreadsheet column rendered in the browser. In other cases, a separate regular expression engine component may be implemented on the server-side to compare the generated regular expressions with the tabular data displayed on the user interface and/or within other data stored in data repositories 130, in order to identify matching data/non-matching data on the server-side. In various embodiments, the matching/non-matching data may be automatically selected (e.g., highlighted) within the user interface, and may be selected for extraction, modification, deletion, etc. Any data extracted or modified via the user interface, based on the generation of the regular expressions, may be stored in one or more data repositories 130. Additionally, in some embodiments, the regular expressions generated (and/or corresponding inputs to the LCS algorithm) may be stored in a regular expression library 135 for future retrieval and use. In some embodiments, the generated regular expressions need not actually be stored in a "library," but may be incorporated into a "transform script". For examples, as described in more detail in U.S. Pat. No. 10,210,246 (which is incorporated herein by reference for all purposes), such transform scripts may include programs, code, or instructions that may be executable by one or more processing units to transform received data. Other possible examples of transform script actions may include "rename column", "uppercase column data", or "infer gender from first name and create a new column with gender", etc.

Figure 2:
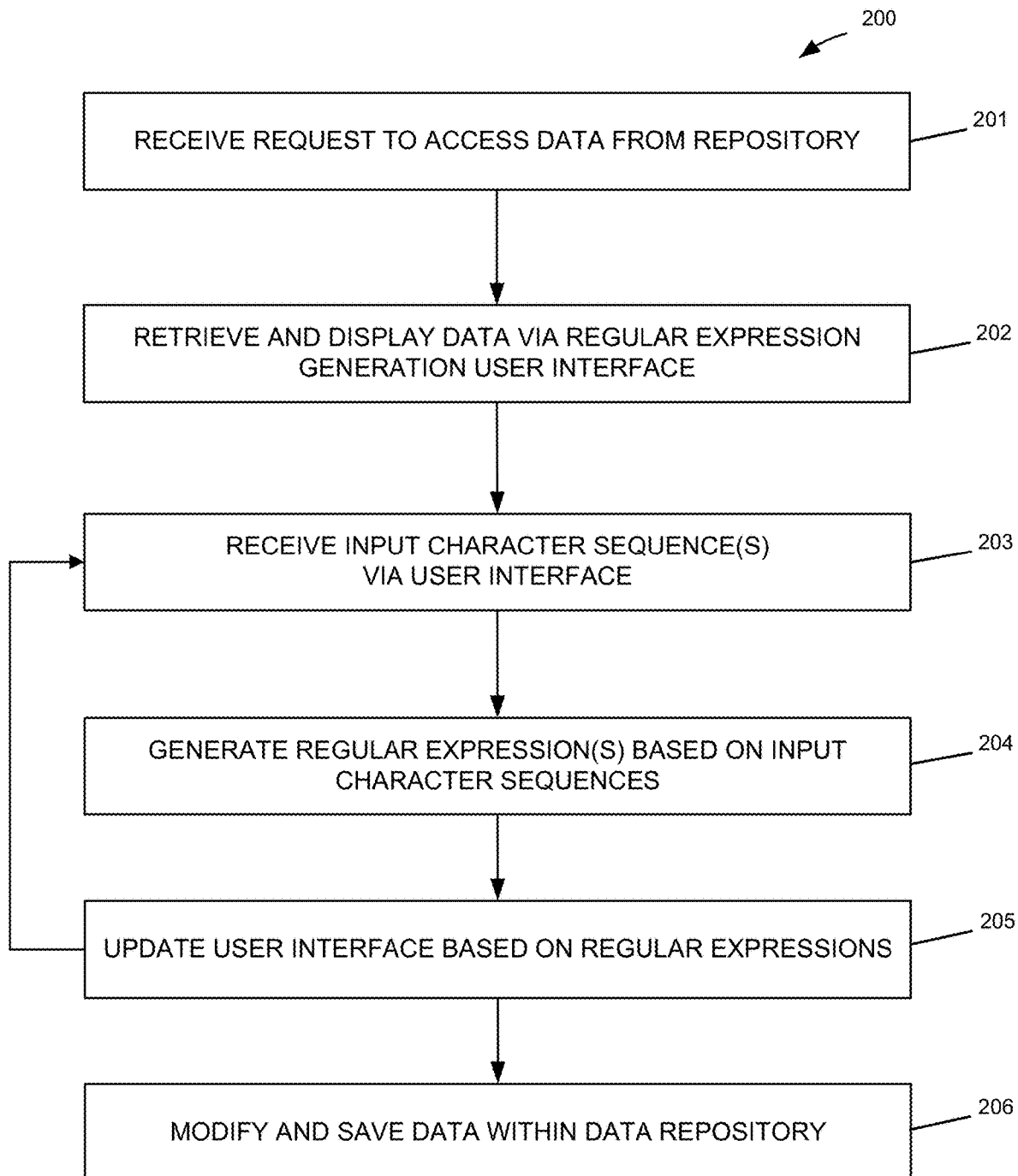
FIG. 2 is a flowchart illustrating a process for generating regular expressions based on input received via a user interface, according to one or more embodiments described herein.

FIG. 2 is a flowchart illustrating a process 200 for generating regular expressions based on input received via a user interface, according to one or more embodiments described herein. In step 201, the regular expression generator 110 may receive a request from a client device 120 to access a regular expression generator user interface, and to view particular data via the user interface. The request in step 201 may be received via the REST API 112, and/or a web server, authentication server, or the like, and the user's request may be parsed and authenticated. For instance, a user within an business or organization may access the regular expression generator 110 to analyze and/or modify transaction data, customer data, performance data, forecast data, and/or any other categories of data that may be stored in the data repositories 130 of the organization. In step 202, the regular expression generator 110 may retrieve and display the requested data via a user interface that supports generation of regular expressions based on selected input data. Various embodiments and examples of such user interfaces are described in detail below.

In step 203, a user may select one or more input character sequences, from the data displayed in the user interface provided by the regular expression generator 110. In some embodiments, the data may be displayed in tabular form within the user interface, including labeled columns with specific data types and/or categories of data. In such cases, the selection of input data in step 203 may correspond to a user selecting a data cell, or selecting (e.g., highlighting) an individual text fragment within a data cell. However, in other embodiments, the regular expression generator 110 may support retrieval and display of semi-structured and unstructured data via the user interface, and users may select input data for regular expression generation by selecting character sequences from the semi-structured or unstructured data. As described below in examples, the user selecting input character sequences from the tabular data displayed is just one example use case. In other examples, a user (e.g., a software developer or power user perhaps trying to compose a regular expression for the Linux command line tools grep, sed, or awk, etc.) may type in examples from scratch rather than picking them off a spreadsheet.

In step 204, the regular expression generator 110 may generate one or more regular expressions based on the input data selected by the user in step 203. In step 205, the regular expression generator 110 may update the user interface, for example, to display the generated regular expression and/or to highlight matching/non-matching data within the displayed data. In step 206, which may be optional in some embodiments, the user interface may support functionality to allow the user to modify the underlying data based on the generated regular expression. For example, the user interface may support features to allow the user to filter, modify, delete, or extract particular data fields from the tabular data, based on whether those fields match or do not match the regular expression. Filtering or modifying data may include modifying the underlying data stored in the repositories 130, and in some cases, extracted data may be stored in a repository 130 as new columns and/or new tables.

Although these steps illustrate a general and high-level overview of an example user interaction with the user interface of the regular expression generator 110, various additional features and functionalities may be supported in other embodiments. For example, in some embodiments, a regular expression code (or category code) may be associated with a minimum number of occurrences of the code. Additionally or alternatively, the regular expression code may be associated with a maximum number of occurrences of the code. As an example, a set of regular expression codes may include the code L<0,1> to indicate that a particular portion of an LCS includes a letter either at least zero times, and at most once.

Additionally, in some embodiments, the input data may include three or more character sequences. In such embodiments, techniques may be used to determine order for performing the LCS algorithms on the three or more character sequences, so that the resulting regular expression may be generated in a performant manner to avoid the exponential increase in runtime caused by the three or more input character sequences. The regular expression generator 110 may instead perform an LCS algorithm on two character sequences at a time, and may determine an order for selecting the pair of character sequences based on a graph. For example, a fully-connected graph may indicate that a first execution of the LCS algorithm (e.g., LCS1) should be performed for Sequence1 and Sequence3, and then a second execution of the LCS algorithm (e.g., LCS2) should be perform for LCS1 and Sequence2, and so on. The graph may be a fully-connected graph, with nodes representing the character sequences, and edges connecting the nodes to represent the length of an LCS shared by the connected nodes. Each node in the graph may be connected to every other node in the graph, and the order for selecting the character sequences may be determined by a performing a depth-first traversal of a minimum spanning tree for the graph.

In further embodiments, input data may be provided via the user interface in a number of different ways. For example, the input data may indicate a first user selection of one or more characters within a second user selection of a set of characters. For instance, a user may highlight a character within a set of previously highlighted characters. Thus, a second user selection may provide context for the first user selection, which may enable input data to be provided to the regular expression generator 110 with greater specificity. In some embodiments, the regular expression generator 110 may generate and display, in near-real-time, a regular expression in response to each user selection. For example, when a user highlights a first range of characters, the regular expression generator 110 may display a regular expression representing the first range of characters. Then, when the user highlights a second range of characters within the first range of characters, the regular expression generator 110 may update the regular expression that is displayed.

Additionally, in some embodiments, the regular expression generator 110 may generate regular expressions based on input comprising both positive and negative examples. As noted above, a positive example may refer to a sequence of characters that are to be encompassed by a regular expression, and a negative example may refer to a sequence of characters that are not to be encompassed by the regular expression. In such cases, the regular expression generator 110 may identify a shortest subsequence of one or more characters, at a particular location, that distinguish the positive example(s) from the negative example(s). The shortest subsequence then may be hard-coded within the regular expression that is generated by the regular expression generator 110. In various examples, the shortest subsequence may be included in a prefix/suffix portion, or mid-span within the negative example(s).

Further examples for automatically generating regular expressions according to certain embodiments are described below. These examples may correspond to various specific possible implementations of the general technique in FIG. 2, and be implemented in software (e.g., code, instructions, programs, etc.) executed by one or more processing units (e.g., processors, cores) of the respective systems, hardware, or combinations thereof. The software may be stored on a non-transitory storage medium (e.g., on a memory device). The further examples described below are intended to be illustrative and non-limiting. Although these examples depict the various processing steps occurring in a particular sequence or order, this is not intended to be limiting. In certain alternative embodiments, the steps may be performed in some different order or some steps may also be performed in parallel.

In some examples, the user inputs received via the user interface (e.g., step 203) may include one or more "positive examples" to be matched by the regular expression output, and zero or more "negative examples" that are not to be matched by the regular expression output. Optionally, one or more of the positive examples may be highlighted to select a particular range (or subsequence) of characters. In some cases, in step 204, the positive examples received via the user interface may be converted to spans of regular expression codes (e.g., character category codes such as Unicode category codes). For each positive example, a sequence of spans may be generated. A graph may be created in some embodiments, where each vertex corresponds to one of the sequences of spans, and the edge weight equals the length of the output from the LCS algorithm executed on those two sequences of spans corresponding to the endpoints of the edge. A minimum spanning tree may be determined for the graph. For example, Prim's algorithm may be used in some embodiments to obtain a minimum spanning tree. A depth-first traversal may be performed on the minimum spanning tree to determine a traversal order, after which the LCS algorithm may be executed on the first two elements of the traversal. Then, one by one, each additional element of the traversal may be merged in order into the current LCS output, by executing the LCS algorithm again on the output of the previous LCS iteration and the next current traversal element. The final output of the LCS algorithm, which may be a sequence of spans, then may be converted into a regular expression. The conversion may be a one-to-one conversion in some embodiments, while certain optional embellishments described herein might not correspond to one-to-one conversions. Finally, the resulting regular expression may be tested against all positive and negative examples received via the user interface in step 203. If any of the tests fail, then the aforementioned process may be repeated using all the positive examples and any negative examples that failed.

II. REGULAR EXPRESSION GENERATION USING LONGEST COMMON SUBSEQUENCE ALGORITHM ON REGULAR EXPRESSION CODES

As noted above, certain aspects described herein relate to generation of regular expressions based upon the calculation of a longest common subsequence (LCS) shared by different sets of regular expression codes corresponding to input data.

Figure 3:
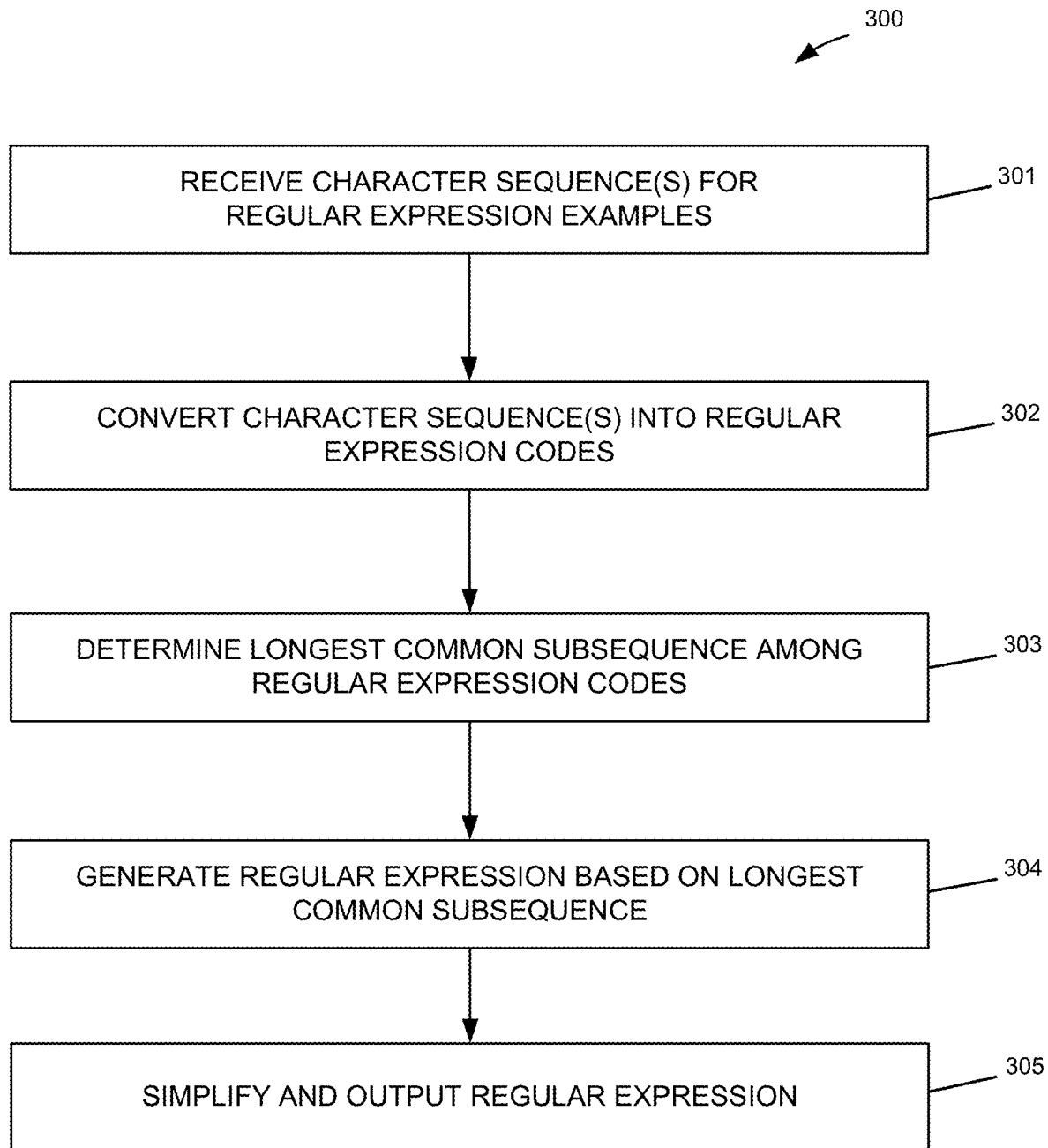
FIG. 3 is a flowchart illustrating a process for generating regular expressions using a longest common subsequence (LCS) algorithm on sets of regular expression codes, according to one or more embodiments described herein.

FIG. 3 is a flowchart illustrating a process 300 for generating regular expressions using an LCS algorithm on sets of regular expression codes, according to one or more embodiments described herein. In step 301, the regular expression generator 110 may receive one or more character sequences as input data. As noted above, in some examples, the input data may correspond to positive example data selected from within the tabular data displayed in the user interface, although it should be understood that the user interface is optional in some embodiments, and the input data may correspond to any character sequence received any other communication channel (e.g., non-user interface) in various examples.

In step 302, each character sequence received in step 301 may be converted into a corresponding regular expression code. In various embodiments, the regular expression codes may be Loogle codes, Unicode category codes, or any other character class codes representing regular expression character classes. For example, an input character sequence "May 3" may be converted to the Loogle code "LLLZN." In some embodiments, regular expression codes may be category codes based upon the Unicode category codes shown at https://www.regular-expressions.info/unicode.html#category. For instance, the code L may represent letters, the code N may represent numbers, the code Z may represent spaces, the code S may represent symbols, the code P may represent punctuation, and so on. For example, the code L may correspond to Unicode \p{L} and the code N may correspond to Unicode \p{N}.

In step 303, a longest common subsequence may be determined from among the sets of regular expression codes generated in step 302. In some embodiments, an LCS algorithm may be executed using two sets of regular expression codes as input. Various different characteristics of the execution of the LCS algorithm (e.g., direction of processing, anchoring, pushing spaces, coalescing low cardinality spans, aligning on common tokens, etc.), may be used in different embodiments. In step 304, a regular expression may be generated based on the output of the LCS algorithm. In some cases, step 304 may include capturing the output of the LCS algorithm in regular expression codes, and converting the regular expression codes into a regular expression. In step 305, the regular expression may be simplified and output, for example, by displaying the regular expression for the user via the user interface.

Figure 4:
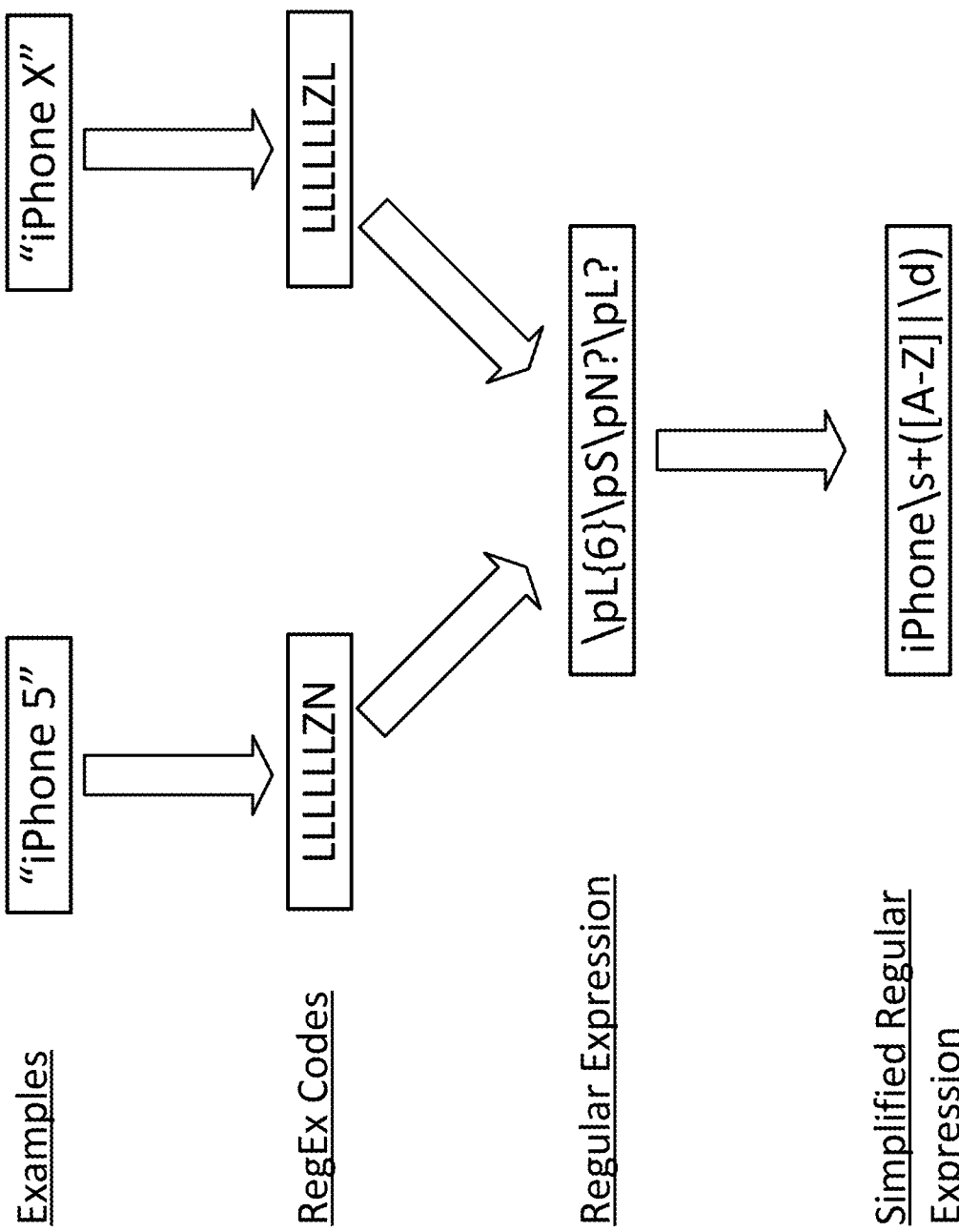
FIG. 4 is an example diagram for generating a regular expression based on two character sequence examples, using a longest common subsequence (LCS) algorithm on sets of regular expression codes, according to one or more embodiments described herein.

FIG. 4 is an example diagram for generating a regular expression based on two character sequence examples, using a longest common subsequence (LCS) algorithm on sets of regular expression codes. Thus, FIG. 4 shows an example of applying the process discussed above in FIG. 3. As shown in FIG. 4, the regular expression in this example is generated based on the two input strings: "iPhone 5" and "iPhone X." Each sequence in this example may be converted into a respective set of regular expression codes. Thus, iPhone 5 may be converted into "LLLLLLZN," and iPhone X may be converted into "LLLLLLZL." As shown in FIG. 4, these category codes are then provided as input to an LCS algorithm, which determines that both sets of IRECs (or category codes) comprise six Ls and one Z. Category codes excluded from the LCS may be represented as optional and/or alternatives. Thus, a regular expression that encompasses both character sequences may be represented as the following: \pL{1}\pZ\pN?\pL? In this example, the regular expression includes Unicode category codes (e.g., \pL for letters, \pZ for spaces, and \pN for numbers). The curly braces containing the number 6 indicates six instances of a letter, and the question marks indicate that a number/letter at the end are optional. Finally, a simplification process may be executed by the regular expression generator, during which the regular expression is simplified by inserting the common text fragment "iPhone" back into the final regular expression, replacing the broader "\pL{6}\" portion of the regular expression.

As shown in this example, the input strings received by the regular expression generator 110 may be converted into "regular expression codes" representing regular expression broad categories (which also may be referred to as "category codes"), and the LCS algorithm may be run on those regular expression codes. In some embodiments, the Unicode category codes may be used for the regular expression codes. For example, an input text string may be converted into codes representing regex Unicode broad categories (e.g., \pL for letters, \pP for punctuation, etc.). This approach, illustrated by FIGS. 3 and 4 may be referred to as the indirect approach. However, in other embodiments, a direct approach may be used, in which the LCS algorithm is run directly on the character sequences received as input.

In some embodiments, the indirect approach may provide additional technical advantages, in that it need not require large amounts of training data, and may generate an effective regular expression with a relatively lower number of input examples. This is because the indirect approach employs heuristics to reduce the uncertainty in the regular expression generation, and to eliminate potential false positives and false negatives. For example, in generating a regular expression based on the input strings "May 3" and "Apr. 11," the direct approach may need at least one example for every month to generate an effective regular expression matching date patterns. Relying on only those two examples, the direct approach may generate a regex of "[Am] [ap] [yr] [13]1?" In contrast, the indirect approach, based on Unicode broad categories, may generate a more effective regular expression of "\pL{3}\d{1,2}". Additionally, as noted above, one of the technical advantages described herein includes efficient generation of regular expressions using very little input data, even potentially from a single example. For instance, regarding generation of a regular expression from the single example "am", a heuristic may determine whether to generate "am" or "\pL\pL" for the regular expression. Either is arguably correct, but so a programmed heuristic may implement user preferences and/or criteria to determine how to generate an optimal regular expression (e.g., whether or not it should match "pm" as well).

Additionally, the indirect approach may further simplify the generated regular expression "\pL{3} \d{1,2}" to "[A-Za-z] {3} \d{1,2}" to make it more human-readable. This may be beneficial in some embodiments, such as when outputting to non-sophisticated regular expression users who might not be familiar with the Unicode expressions for regular expressions.

Further, in some embodiments, instead of treating each character independently when executing the LCS algorithm, sequential and equal regular expression codes may be converted into span data structures (which also may be referred to as spans). In some cases, a span may include a representation of single regular expression code (e.g., Unicode broad category code), along with a repetition count range (e.g., a minimum number and/or a maximum number). Conversion from regular expression codes into spans may facilitates some various additional features described below, such as recognizing alternations (e.g., disjunctions), and also may facilitate merging of adjacent optional spans to further simplify the generated regular expressions.

As noted above, the LCS algorithm may be configured to store and retain the underlying text fragments within the input character sequences, which may potentially be inserted back into the final regular expression, such as the string "iPhone" in FIG. 4. By keeping track of the text fragments that originally gave rise to the category code assigned to that span, such embodiments may allow for literal text (e.g., am and pm) to be included directly in the generated regular expression, which may reduce false positives and make the regular expression output more human readable.

In some embodiments, a heuristic may be used to determine when to output string literals into the generated regular expression, as opposed to broad-matching regular expression codes. As noted above, it may be desirable in some cases for a regular expression to require an exact match for a string fragment. Accordingly, a heuristic may be used in some embodiments to determine whether or not the exact string fragment will be output to the regular expression. For example, a heuristic may determine that if, for a particular span, only one specific string fragment was ever encountered (e.g., "pm"), and if there are two or more examples for that span, then that exact string fragment will be output to the regular expression. In the case of a punctuation span, the heuristic may lower the threshold to just one occurrence for the span (e.g., based on an assumption that punctuation is less likely to change). For example, for both symbols \pS and punctuation \pP, the threshold may be lowered to just one occurrence in order to output a literal string within the regular expression. The heuristic may be modified and/or tuned to be more or less restrictive, based on the threshold number of examples required to output the exact string fragment to the regular expression. Note that if the heuristic errs on being overly restrictive (by outputting the literal string fragment into the regular expression too readily), then a user may compensate by introducing additional positive examples. Similarly, if the heuristic errs on being overly permissive (by too often outputting broad regular expression codes), then a user may compensate by introducing additional negative examples. The heuristic may be initially programmed (and subsequently tuned) based on previous user interactions and experimentation, with an appropriate amount of restrictiveness.

As noted above in reference to FIG. 4, a simplification process may be executed by the regular expression generator 110, during which the regular expression may be simplified using various techniques. In some cases, the simplification may include replacing long-form regular expression repetition codes (e.g., using curly braces) with regular expression shorthand codes (e.g., *, +, and ?). For example, if a span comes from example string fragments representing, for instance, a repetition of between 0 and 3 (minimum and maximum), then the regular expression generator 110 may simplify the expression by outputting a * into the regular expression, instead of {0,3}, to prevent false negatives and to improve readability. Additionally, instead of using the {a,b} syntax as frequently, regular expression generator 110 may instead use the + syntax when a>2 or b>4. This may make the generated regular expression more readable and more likely to avoid false negatives.

In some cases, a bank of pre-defined character ranges may be used. For instance, the regular expression Unicode character category for letters is \pL, which might not be well-known or easily readable for users, as compared to the older character range codes such as [A-Z]. Accordingly, in the case of English language input, the regular expression generator 110 may attempt to substitute [A-Z], [a-z], and [A-Za-z] for \pL, if the given examples can be successfully matched with one of those substitutions.

Additionally, the regular expression generator 110 may be configured to default to maximum permissiveness with respect to whitespace in the regular expression in some embodiments. As describe herein, the regular expression generator 110 may be configured to generate more specific regular expressions, for example, by sometimes preferring literal string fragments over broad-matching codes, and applying minimum and maximum bounds to the repetition output in the curly braces. However, with respect to whitespace, the regular expression generator 110 may be configured to default to maximum permissiveness in some embodiments. That is, for any whitespace (e.g., even a single space appearing between words) the regular expression generator 110 may be configured to keep it as the regular expression category code \s, and may also specify the repetition to be + which means one or more. Such embodiments thus may anticipate and match with extra spaces, or even tabs and carriage returns (e.g., such as in completely unstructured text) being able to be matched correctly.

In some cases, repetition within the generated regular expression may be unrolled into literally repeating regular expression codes. For example, for a year, instead of \d{4}, the regular expression generator 110 may be configured to unroll \d{4}, to \d\d\d\d for ease of readability, and because certain users might not be familiar with the regular expression repetition syntax. For example, the regular expression generator 110 may unroll a repetition if the length of the Unicode category code is two characters (e.g. \d) and the repetition count is four or less, or if the length of the Unicode category code is three characters (e.g. \pP) and the repetition count is three or less, or if the length of the Unicode category is longer than three characters and the repetition count is two or less. Additionally, in some embodiments, if a literal character needs to be output (e.g., a regular expression "special character"), then the regular expression generator 110 may be configured to escape it.

In various additional embodiments, the regular expression generator 110 may be configured to detect various types of paired brackets (e.g., { and }), and to generate regular expressions with negated character classes (e.g., [^}]*). For example, within text highlighted (or otherwise selected) by a user, or positive/negative examples other input into the system, open or close brackets may be detected and matched/paired with the corresponding brackets. In some examples, multiple different types of brackets may be detected within the input texts, including some or all of "("→")", "["→"]", "{"→"}", "<"→">", "'"→"'", "\""→"\"", "\u0060"→"\u00b4", "\u2018"→"\u2019", "\u201c"→"\u201d", "\u00ab"→"\u00bb", "\u3008"→"\u3009". Thus, as an example, for HTML tags, <[^>]*> may be generated instead of something like <[a-z]+(?: [a-z]+=[a-z]+>. When detecting and pairing various types of brackets, the regular expression generator 110 may be configured to properly detect and pair brackets nested inside brackets, and also may be configured to ignore brackets that overlap the highlighted (or otherwise user-selected) portions of the input. Additionally, in some cases, the regular expression generator 110 might not use a new negated character class between brackets if the contents is unique. That is, if the contents are always all the same (e.g., continuing the HTML example, if all the tags being identified are <h1>), then the literal may be output into the generated regular expression instead of the negated square bracket character class (e.g., an output of just <h1> instead of <[^>]*>).

In an example embodiment, collapsing within brackets may be allowed when the highlight is exactly contained by the brackets. This allows extraction of parenthetical remarks. E.g. to extract the Windows NT out of (Windows NT), the generated regex is now \(([^)]*)\) instead of \(([A-Za-z]+[A-Z][A-Z])\) which is more general and would result in fewer false negatives.

III. REGULAR EXPRESSION GENERATION USING LONGEST COMMON SUBSEQUENCE ALGORITHM ON COMBINATIONS OF REGULAR EXPRESSION CODES

Additional aspects described herein relate to the generation of regular expressions based on input data comprising three or more strings (e.g., three or more separate character sequences). When three or more strings are identified as input data, the regular expression generator 110 may use a performance optimization feature in which an optimal order is determined for the sequence of LCS algorithm executions. As discussed below, the performance optimization feature for more than two strings may involve building a graph with a vertex corresponding to each string, and edge lengths/weights which may be based on the size of the LCS output between each string and every other string. A minimum spanning tree then may be derived using those edge weights, and a depth-first traversal may be performed to determine an order of the input strings. Finally, the series of LCS algorithms may be done using the determined order of input strings.

Figure 5:
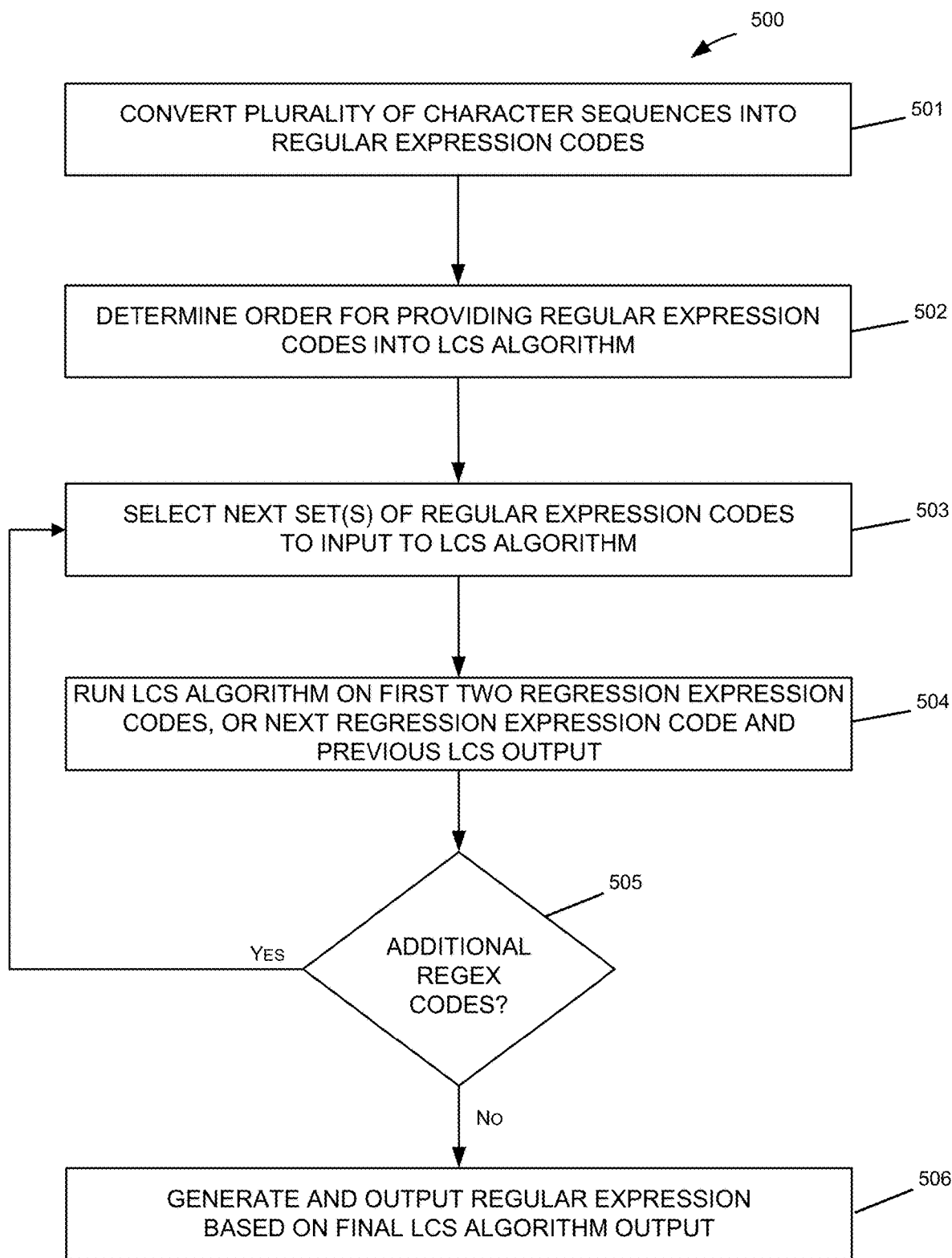
FIG. 5 is a flowchart illustrating a process for generating regular expressions using a longest common subsequence (LCS) algorithm on larger sets of regular expression codes, according to one or more embodiments described herein.

FIG. 5 is a flowchart illustrating a process 500 for generating regular expressions using a longest common subsequence (LCS) algorithm on larger sets (e.g., three or more character sequences) of regular expression codes. Thus, steps 502-505 in this example may correspond to step 303 discussed above in FIG. 3. However, because this example relates to generating regular expressions based on three or more input character sequences, the LCS algorithm may be performed multiple times. For example, in order to avoid an exponential increase in runtime for three or more input strings, the LCS algorithm may be executed multiple times, wherein each execution is performed on only two input strings. For example, the regular expression generator 110 may perform an initial execution of the LCS algorithm on two strings (e.g., two input character sequences or two converted regular expression codes), then may perform a second execution of the LCS algorithm on the output of the first LCS algorithm and a third string, and then may perform a third execution of the LCS algorithm on the output of the second LCS algorithm and a fourth string, and so on.

In order to improve and/or optimize the performance of such embodiments, it may be desirable to determine an optimal order for the input strings (e.g., input character sequences or regular expression codes) to perform the sequence of LCS algorithms. For example, a good order for taking the input strings may affect the readability of the generated regular expression, such as by minimizing the number of optional spans. To keep the generated regex concise, additional strings that are LCS'd into the current regex should preferably already be somewhat similar to the current regex (the intermediate result from LCS'ing the already-seen strings).

Thus, in step 501, the plurality (e.g., 3 or more) input character sequences are converted into regular expression codes. In step 502, an order is determined for processing the regular expression codes using the LCS algorithm. The determination of the order in step 502 is discussed more below in reference to FIG. 7. In step 503, either the first two regular expression codes in the determined order are selected (for the first iteration of step 503), or the next regular expression codes in the determined order is selected (for subsequent iterations of step 503). In step 504, the LCS algorithm is executed on two input strings corresponding to the format of regular expression codes. For the first iteration of step 504, the LCS algorithm is executed on the first two regular expression codes in the determined order, and for subsequent iterations of step 504, the LCS algorithm is executed on the next regular expression code in the determined order and the output of the previous LCS algorithm (which also may be in same format of regular expression codes). In step 505, the regular expression generator 110 determines whether or not there are additional regular expression codes in the determined order that have not yet been provided as input to the LCS algorithm. If so, the process returns to step 503 for another execution of the LCS algorithm. If not, in step 506, a regular expression is generated based on the output of the last execution of the LCS algorithm.

Figure 6:
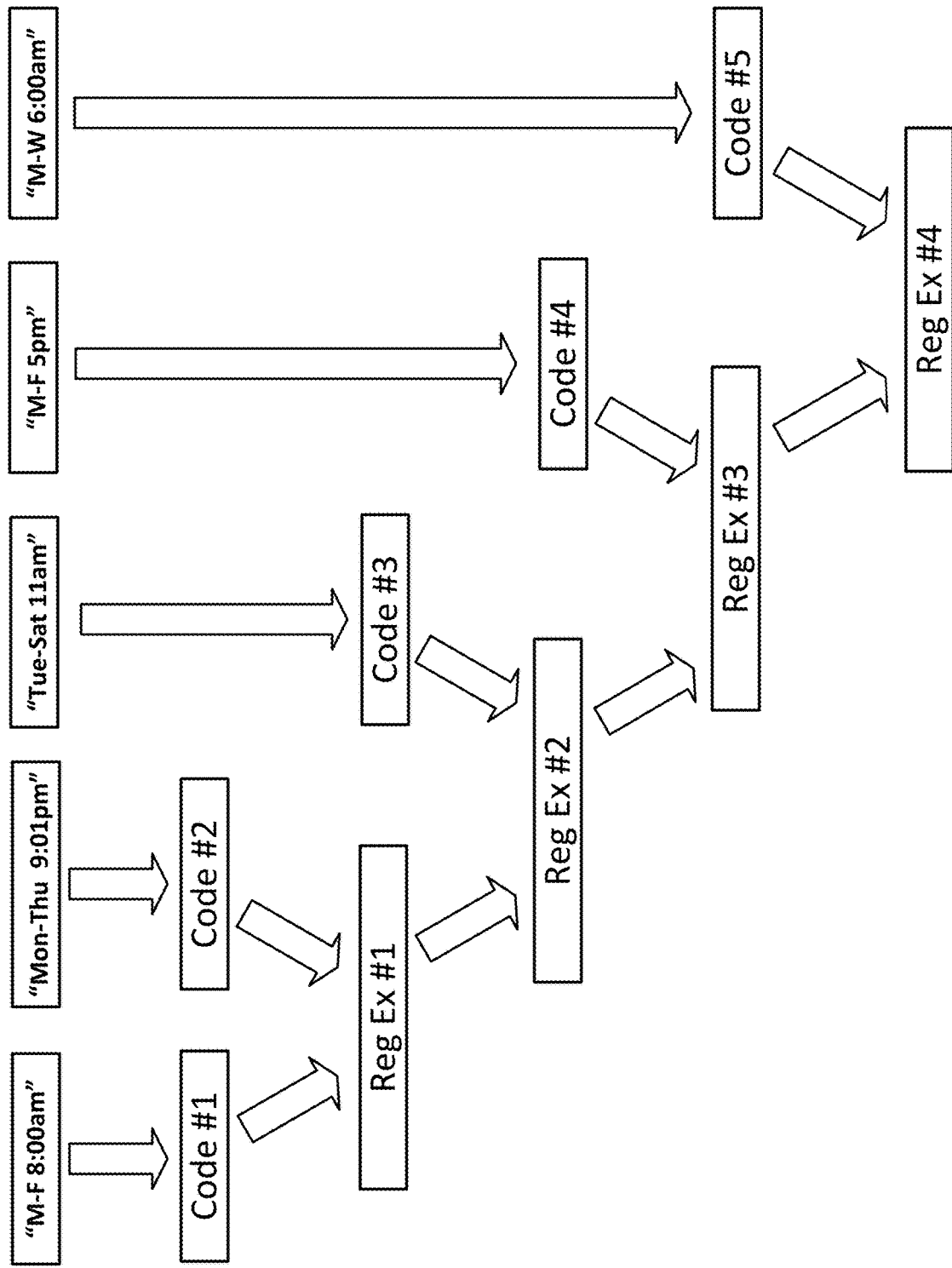
FIG. 6 is an example diagram for generating a regular expression based on five character sequence examples, using a longest common subsequence (LCS) algorithm on sets of regular expression codes, according to one or more embodiments described herein.

FIG. 6 is an example diagram for generating a regular expression based on five input character sequence examples. In this example, each input character sequence is converted to a regular expression code, and then an LCS algorithm is executed repeatedly based on a determined order of the regular expression codes. Thus, FIG. 6 shows one example of applying the process discussed above in FIG. 5. In this example, the determined order for the five regular expression codes is Code #1 to Code #5, and each codes is input to the LCS algorithm in the determined order to generate a regular expression output. The final regular expression output (Reg Ex #4) corresponds to the final regular expression generated based on all five of the input character sequences.

Figure 7:
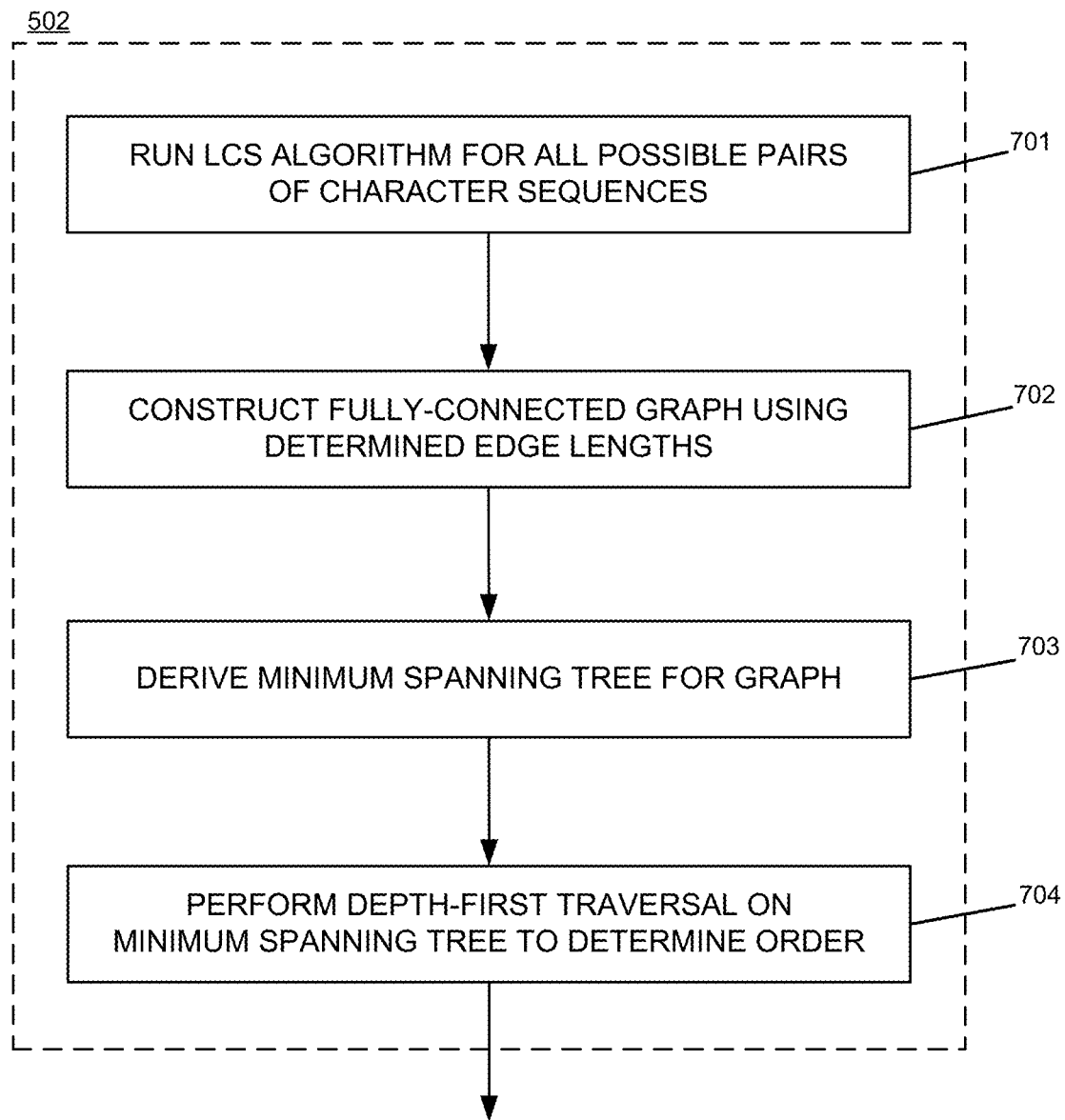
FIG. 7 is a flowchart illustrating a process for determining an order of execution for a longest common subsequence (LCS) algorithm on larger sets of regular expression codes, according to one or more embodiments described herein.

FIG. 7 is a flowchart illustrating a process for determining an order of execution for a longest common subsequence (LCS) algorithm on larger sets (e.g., three or more) of regular expression codes. Thus, as shown in this example, steps 701-704 may correspond to the order determination in step 502, discussed above. In step 701, the LCS algorithm may be run on each unique pair of regular expression codes corresponding to the input data, and the resulting output LCS may be stored for each execution. Thus, for k number of input data, this may represent all (k(k−1))/2 possible pairings of strings to be run through the LCS algorithm, or k(k−1) in some embodiments. For example, if k=3 input character sequences are received, LCS algorithm may be run three times in step 701; if k=4 input character sequences are received, the LCS algorithm may be run six times in step 701; if k=5 input character sequences are received, the LCS algorithm may be run ten times in step 701, and so on. In step 702, a fully-connected graph may be constructed of k nodes representing the strings with the edge weight of the (k(k−1))/2 edges being the length of the raw LCS output between the two nodes. In step 703, a minimum spanning tree may be derived from the fully-connected graph in step 702. In step 704, a depth-first traversal may be performed on the minimum spanning tree. The output of this traversal may correspond to the order in which regular expression codes will be input into the sequence of LCS algorithm executions.

Figure 8B:
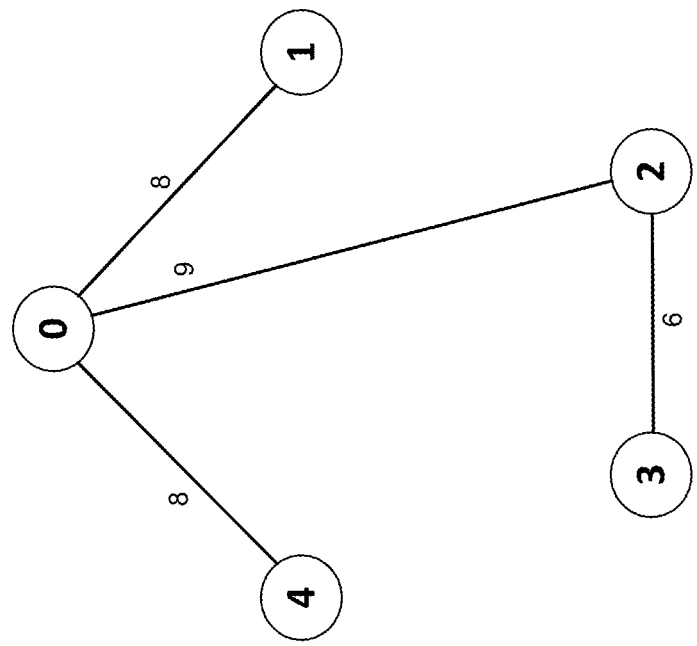
FIGS. 8A and 8B show a fully-connected graph and a minimum spanning tree representation of the fully-connected graph, used for determining an order of execution for a longest common subsequence (LCS) algorithm on larger sets of regular expression codes, according to one or more embodiments described herein.
Figure 8A:
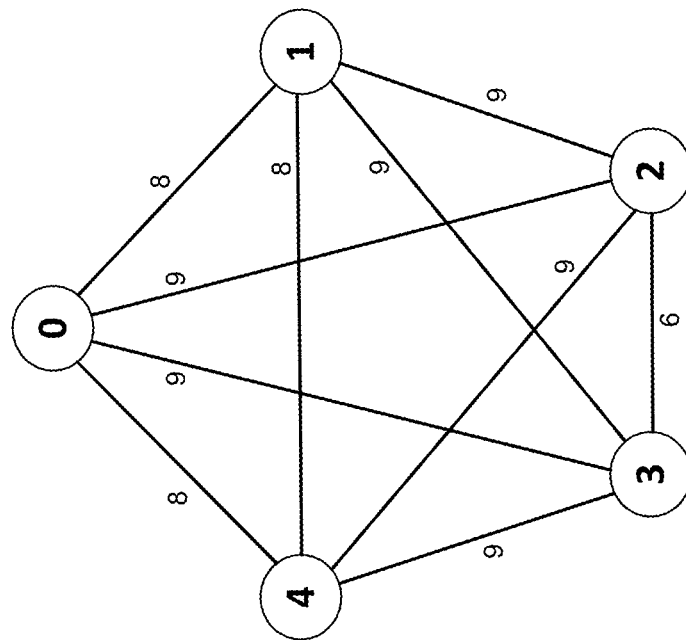

Referring briefly to FIGS. 8A and 8B, an example of a fully-connected graph is shown in FIG. 5, generated based on k=5 input character sequences received, and in FIG. 8B a minimum spanning tree representation is shown for the fully-connected graph.

In some embodiments, the approach described in FIGS. 5-8B may provide additional technical advantages with respect to performance. For example, certain conventional implementations of the LCS algorithm may exhibit a run-time performance of $O(n^2)$ where n is the length of the strings. Extending such implementations to k strings instead of only 2, may results in an exponential run-time performance $O(n^k)$, because the LCS algorithm may be required to search a k-dimensional space. Such conventional implementations of the LCS algorithm might not be performant or sufficiently suitable for real-time on-line user experiences.

As noted above, the LCS algorithm may be executed (k(k−1))/2 times, where sometimes the duplicates are the very same as have been seen before, because the LCS algorithm may when the raw input examples from the user have been converted to regex category codes. Thus, memorization may be implemented in some cases, in which a cache can be used to map previously-seen LCS problems to the previously worked LCS solution.

An example embodiment also provides an effective method of controlling cache size when a cache table is too large. A portion of the cache may be deleted. For example, a hash map table can be used which can be truncated. The hash map table can be truncated arbitrarily.

IV. REGULAR EXPRESSION GENERATION BASED ON POSITIVE AND NEGATIVE PATTERN MATCHING EXAMPLES

Additional aspects described herein relate to generating regular expressions based on input data corresponding to both positive and negative examples. As noted above, a positive example may refer to an input data character sequence that is designated as an example string that should match the regular expression that will be generated by the regular expression generator. In contrast, a negative example may refer to an input data character sequence that is designated as an example string that should not match the regular expression that will be generated by the regular expression generator. As discussed below, in some embodiments, the regular expression generator 110 may be configured to identify a location and a shortest subsequence of characters at the location that distinguish the positive examples from the negative examples. The shortest subsequence then may be hard-coded into the generated regular expression, so that the positive examples will match the regular expression and the negative examples will be excluded by (e.g., will not match) the regular expression.

Figure 9:
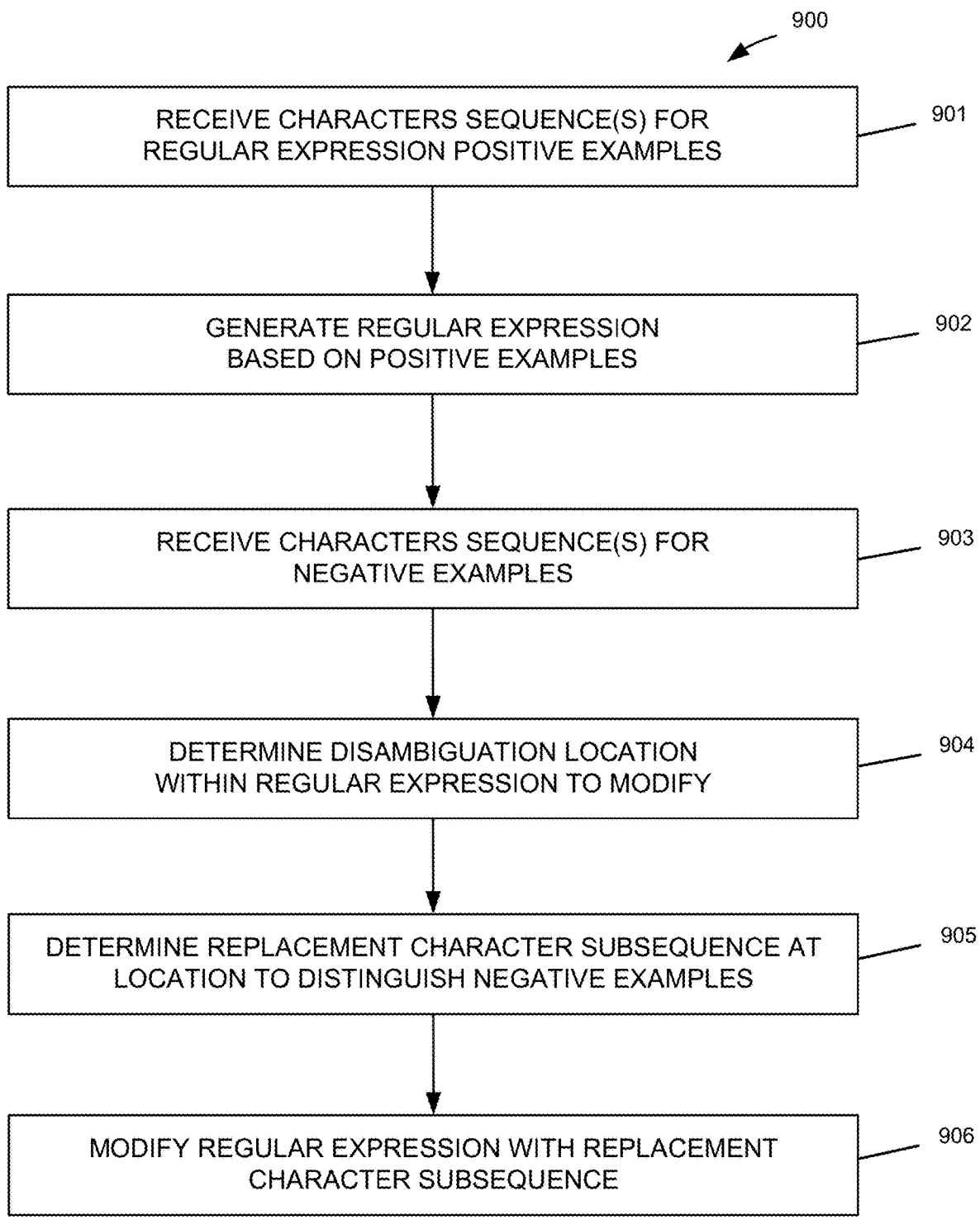
FIG. 9 is a flowchart illustrating a process for generating a regular expression based on positive and negative character sequence examples, according to one or more embodiments described herein.

FIG. 9 is a flowchart illustrating a process 900 for generating a regular expression based on positive and negative character sequence examples. In step 901, the regular expression generator 110 may receive one or more input data character sequences corresponding to positive examples. In step 902, the regular expression generator 110 may generate a regular expression based on the received positive examples. Thus, steps 901-902 may include some or all of the steps performed in FIG. 3 or FIG. 5, discussed above, to generate a regular expression based on input data character sequences.

In step 903, the regular expression generator 110 may receive one additional input data character sequences corresponding to negative examples. Thus, the negative examples are specifically designated so as not the match the regular expression generated in step 902. In some embodiments, the negative examples received in step 903 may be initially tested against the regular expression generated in step 902, and if it is determined that the negative examples do not match the regular expression, then no further action is taken. However, in this example it may be assumed that at least one of the negative examples received in step 903 matches the regular expression generated in step 902. Thus, in step 904, a disambiguation location may be determined within the regular expression generated in step 902. In some embodiments, the disambiguation location may be selected as either the prefix location (e.g., at the beginning of the regular expression) or the suffix location (e.g., at the end of the regular expression). For instance, the regular expression generator 110 may determine a first number of characters that would be needed at the prefix to distinguish the positive examples from the negative examples, and second number of characters that would be needed at the suffix to distinguish the positive examples from the negative examples. The regular expression generator 110 may then select the suffix or prefix based on the shortest number of replacement characters needed. In some cases, using the prefix as the disambiguation location may be preferred (e.g., weighted) for readability purposes. In still other examples, the disambiguation location may be a mid-span location that does not correspond to the prefix or suffix of the regular expression.

In step 905, the regular expression generator 110 may determine a replacement sequence of custom character classes (or more specifically, a sequence of custom 'square-bracket' regular expression character classes) which, when inserted into the regular expression at the determined location, may distinguish the positive examples from the negative examples. In some embodiments, the regular expression generator 110 in step 905 may retrieve text fragments from each of the positive and negative examples, corresponding to the disambiguation location (or replacement location), and then use the text fragments to determine a discriminator to be used as a replacement sequence that distinguishes the positive examples from the negative examples. Additionally, the discriminator replacement sequence determined in step 905 may include multiple different replacement sequences of custom character classes, which may be replaced either at the same location or at different locations within the regular expression.

As noted above, in some cases, the determination of the replacement sequence in step 905 may be performed in conjunction with the determination of the disambiguation location (or replacement location) in step 904. For example, the regular expression generator 110 may determine one or more replacement sequences which, at a first possible replacement location, may distinguish the positive from the negative examples. The regular expression generator 110 also may determine one or more other replacement sequences which, at a second different possible replacement location, may distinguish the positive from the negative examples. In this example, when selecting between the different possible replacement locations and corresponding replacement sequences, the regular expression generator 110 may apply a heuristic formula to perform the selection based on one or more of the sizes in characters of the replacement locations, and the numbers and/or sizes of the corresponding replacement sequences. Finally, in step 906, the regular expression may be modified by inserting the one or more determined replacement sequences into the determined location to replace the previous portion of the regular expression. In some cases, following the modification of the regular expression in step 906, the positive and/or negative examples may be tested against the modified regular expression to confirm that the positive examples match and that the negative examples do not match the regular expression.

Figure 10A:
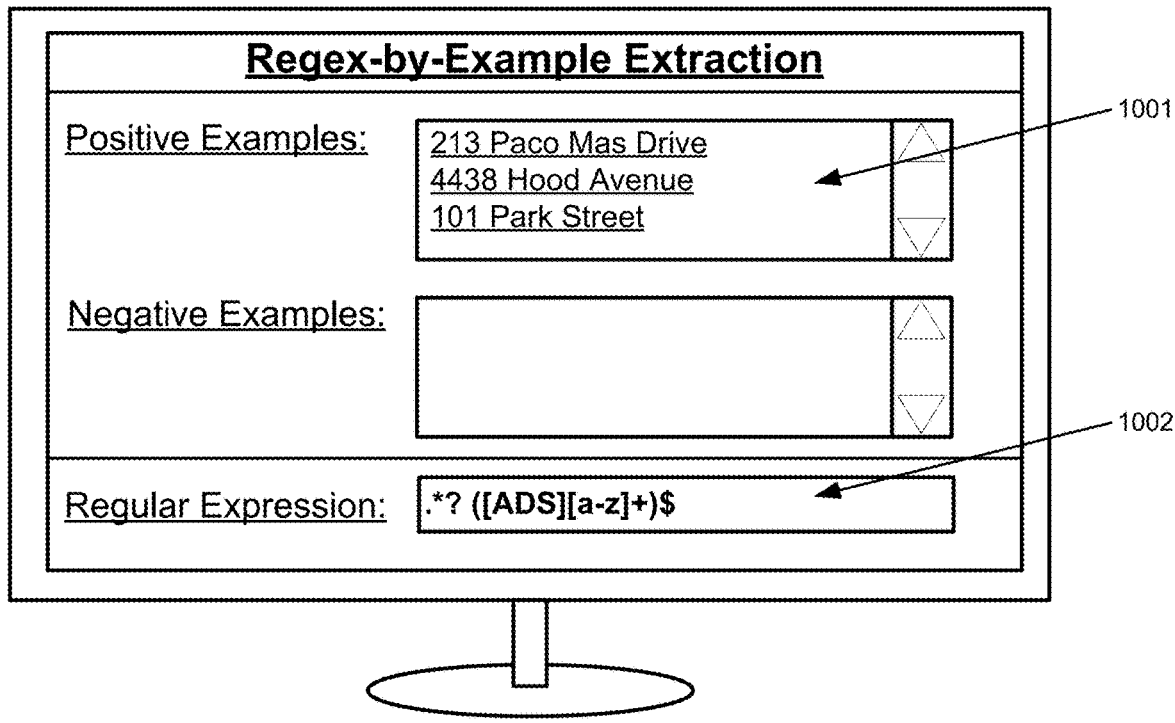
FIGS. 10A and 10B are example user interface screens showing generation of regular expressions based on positive and negative character sequence examples, according to one or more embodiments described herein.
Figure 10B:
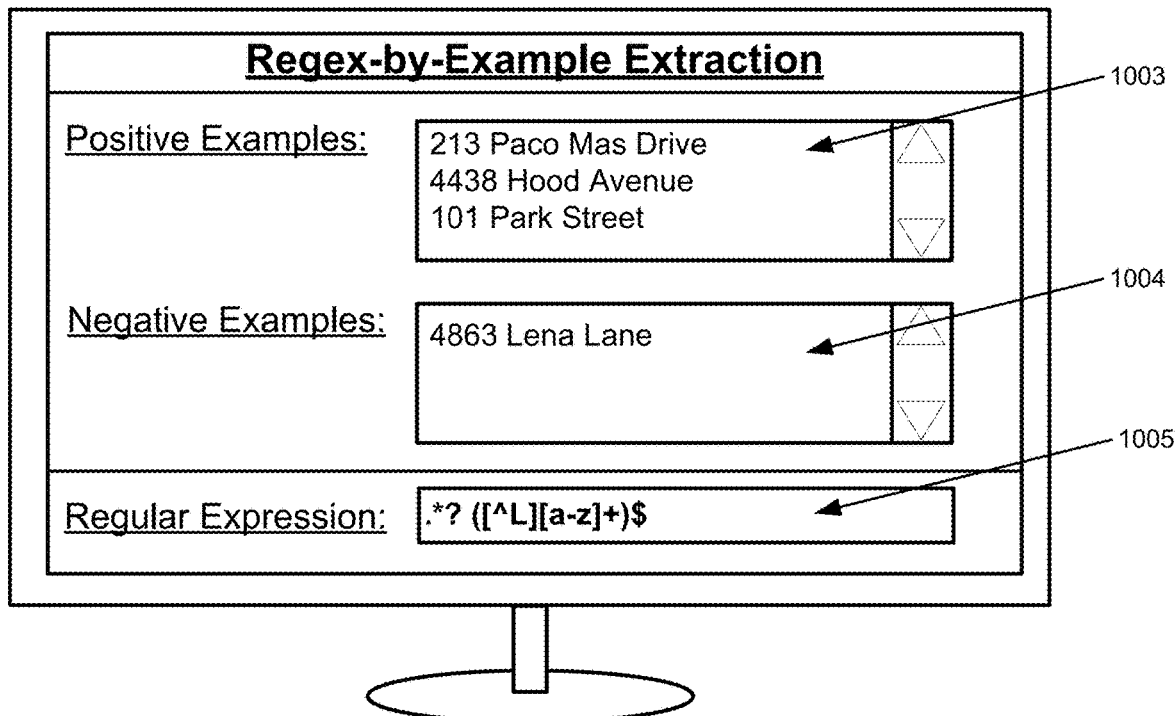

FIGS. 10A and 10B are example user interface screens showing generation of regular expressions based on positive and negative character sequence examples. Thus, the example shown in FIGS. 10A and 10B may correspond to the user interfaces displayed during the execution of the process of FIG. 9 discussed above. In FIG. 10A, the user provides three positive examples of data input character sequences 1001, and the regular expression generator 110 generates a regular expression 1002 that matches each of the positive examples. Then, in FIG. 10B, the user provides one negative example 1004, and the regular expression generator 110 generates a modified regular expression 1005, which is based on both the current sets of positive examples 1003 and negative examples 1004.

As noted above, in some embodiments, when both positive and negative examples are received, the regular expression generator 110 may identify a discriminator, or the shortest subsequence of one or more characters that distinguish the positive example(s) from the negative example(s). The selected discriminator may be a shortest sequence (e.g., expressed in category codes), and may either be positive or negative, so that the positive examples will match and the negative examples will not. In some cases, the discriminator may correspond to a replacement subsequence which then may be hardcoded into the regular expression in step 905. As an example, in "[AL][a-z]+" the [AL] is a positive discriminator that, assuming it is applied to street suffixes, would match with (or allow) "Alley", "Avenue", and "Lane" but would not match with (or disallow) everything else. As another example, in "[BC][o][a-z]+" the [BC][o] is a positive discriminator consisting of a sequence of two character classes that would match with "Boulevard" and "Court". As yet another example, in "[^A][a-z]+" the [^A] may be a negative discriminator that would disallow "Alley" and "Avenue". In some cases, the algorithm may make generate a negative-look-behind to discriminate correctly. For example, (?<!Av)[A-Za-z]+ would exclude "Avenue" but would allow "Alley".

As another example, if the user supplies the positive examples "202-456-7800" and "313-678-8900" and negative examples "404-765-9876" and "515-987-6570", then in certain embodiments, the regular expression generator 110 may generate the regular expression "\d\d\d-\d\d\d-\d\d00". That is, the replacement character subsequence may be identified for the suffix of the regular expression, based on the determination that phone numbers that end in 00 distinguish the positive examples from the negative examples (e.g., assuming that the goal is a regular expression the matches business phone numbers). This is an example of negative example by suffix (or more specifically, an example of accommodating negative examples by using a positive suffix), but various other embodiments may support either replacements at prefixes, suffixes, or mid-span locations. In examples of replacement at mid-span locations, a character offset into the span may be kept track of, and may be split at the mid-span point.

To decide between whether to use a prefix or suffix, in some embodiments, a heuristic is employed where the minimum score is chosen over all combinations of $k_a$ and prefix/suffix:

$$\text{score} = k_a \min^2 \left\{ \frac{|F_p|}{1+|E_p|}, \frac{|F_n|}{1+|E_n|} \right\} + \begin{cases} 0.0 \text{ if prefix} \\ 0.1 \text{ if suffix} \end{cases}$$

Where:

$k_a$=number of characters being considered to disambiguate the affix (prefix or suffix)

$|F_p|$=number of unique text fragments from the positive examples required to disambiguate the affix $|F_n|$=number of unique text fragments from the negative examples required to disambiguate the affix $|E_p|$=number of (complete) positive examples provided by the user $|E_n|$=number of (complete) negative examples provided by the user In the above example, the heuristic is designed to favor shorter disambiguation text fragments over longer ones (e.g., thus the multiplication by $k_a$). The heuristic is also designed to favor the prefix over the suffix (e.g., thus the penalty of 0.1 for suffix), to improve readability. Finally, the heuristic is designed to favor disambiguating (e.g., replacing) a longer prefix or suffix, over disambiguating by using a larger number of string fragments (e.g., thus the squaring of the number of string fragments to be replaced.

As noted above, some embodiments also may support negative mid-span examples as well as negative look-behind examples and negative look-ahead examples.

Once a prefix/suffix and k (the number of characters to disambiguate) have been determined, the regular expression generator 110 still may determine how to represent that disambiguation in the generated regular expression. The generated regular expression may be either permissive for affixes (e.g., prefixes or suffixes) that look like the positive examples, or may exclude affixes that look like the negative examples.

$$usePermissive = \frac{|E_p|}{|F_p|} - \frac{|E_n|}{|F_n|}$$

If usePermissive is greater than zero, then things that look like the positive examples are allowed through by generating regular expressions that allows characters, one by one for (each character position), taken from the positive examples. In other cases, the regular expression generator 110 may take the approach of disallowing things that look like the negative examples by generating a regular expression that disallows characters, one by one (for each character position), taken from the negative examples.

As another example, a generated regular expression for the positive example 8 am and negative example 9 pm might be \d[^p] m. This uses the caret syntax. In some cases, the regular expression generator 110 may be configured to favor a shorter regular expression, which may be not only more readable to the user, but also may be more likely to be correct. The rationale is that a frequently appearing character is more likely to appear again in the future, and so an emphasis should be placed upon frequently appearing characters. If there are fewer unique characters $|F_p|$ (fewer unique because the ones that do appear do so more frequently) then this is rewarded in the heuristic by having it in the denominator.

Referring again to the usePermissive example heuristic above, determining one unique positive affix is no big feat if there was only one positive example from the user. Thus, in this heuristic low $|E_p|$ is penalized by having it in the numerator (i.e. high $|E_p|$ is rewarded in this heuristic).

Additionally, in some embodiments, negative examples may be based on look-behind and/or look-ahead. For example, the user may provide a positive example of "323-1234" and a negative example of "202-754-9876" then that involves use of the regex look-behind syntax (?<!) to exclude phone numbers with area codes.

Negative examples also may be based on optional spans in some cases. For example, the user may provide positive examples of "ab" and "a2b" and a negative example of "a3b". In this case, an example implementation may fail, because it may attempt to discriminate based only on required spans and the "2" digit is in an optional span. In this example, failure may refer to a situation in which the generated regular expression matches all of the positive examples (correctly) and also matches one or more of the negative examples (erroneously). In such cases, the user may alerted to the failure and may be provided the options, via the user interface, to manually repair the generated regular expression and/or to remove some of the negative examples.

V. USER INTERFACE FOR REGULAR EXPRESSION GENERATION

Additional aspect described herein include several different features and functionality within a graphical user interface related to generation of regular expressions. As discussed below, certain of these features may including various options for user selection and highlighting for positive and negative examples, color-coding for positive and negative examples, and multiple overlapping/nested highlighting within a data cell.

Figure 11:
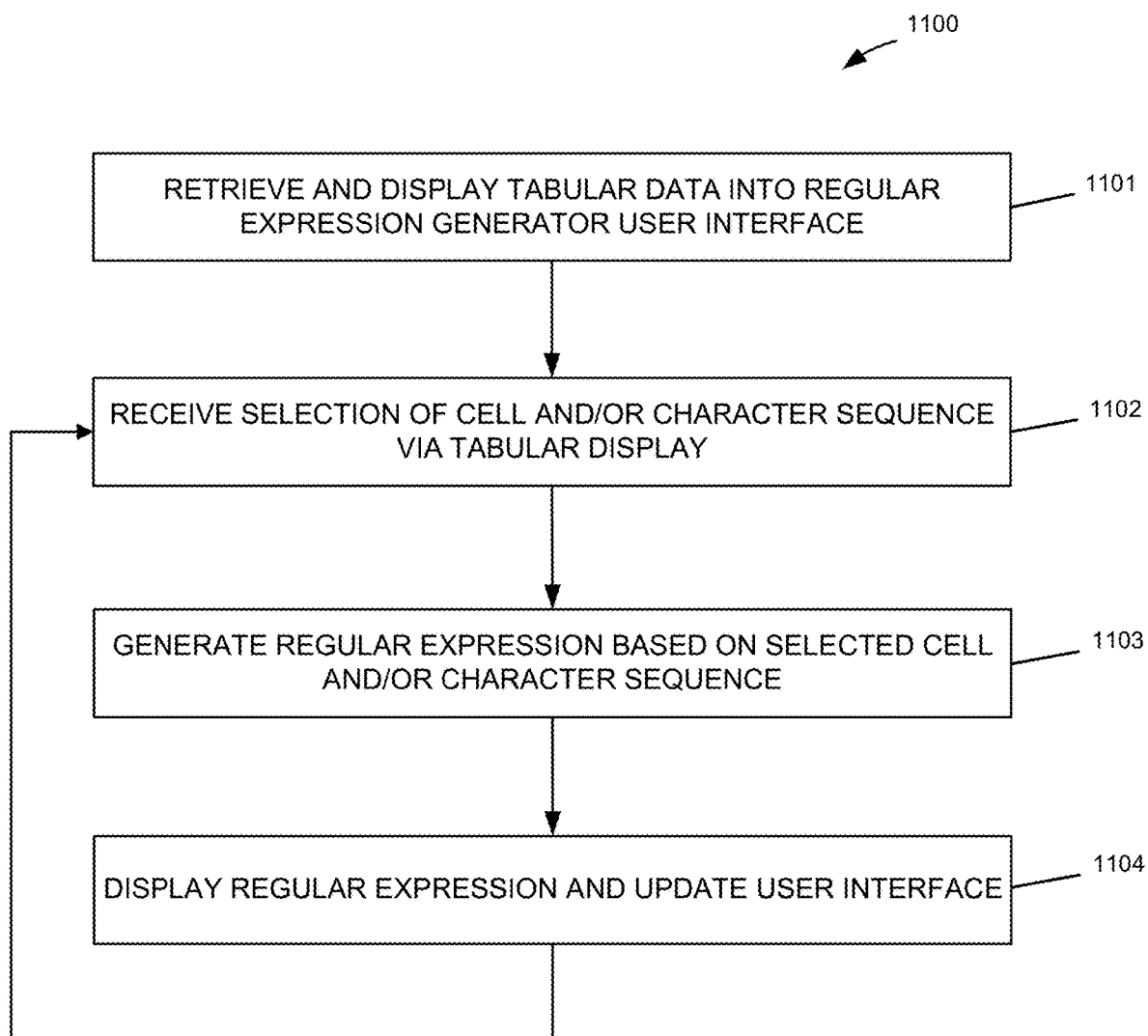
FIG. 11 is a flowchart illustrating a process for generating regular expressions based on user data selections received within a user interface, according to one or more embodiments described herein.

FIG. 11 is a flowchart illustrating a process 1100 for generating regular expressions based on user data selections received within a user interface. The example process in FIG. 11 may correspond to any of the previously discussed examples of generating regular expressions based on input data character sequences. However, FIG. 11 describes the process with respect to the user interface that may be generated and displayed on a client device 120. In step 1101, in response to a request from a user via the user interface, the regular expression generator 110 may retrieve data (e.g., from a data repository 130) and render/display the data in tabular form within a graphical user interface. Although tabular data is used in this example, it should be understood that tabular data need not be used or displayed in other examples. For instance, in some cases a user may type in raw data directly (rather than selecting data from the user interface). Additionally, when data is presented on via the user interface, the data need not be in tabular form, but may be unstructured data (e.g., a document) or semi-structured (e.g., a spreadsheet of unformatted/unstructured data items such as tweets or posts). In various examples, the tabular data may correspond transaction data, customer data, performance data, forecast data, and/or any other categories of data that may be stored in the data repositories 130 for a business or other organization. In step 1102, a user selection of input data may be received via the user interface. The selected input data may, for example, correspond to an entire data cell selected by the user, or a subsequence of characters within a data cell. In step 1103, the regular expression generator 110 may generate a regular expression based on the input data received in step 1102 (e.g., the data cell or portions thereof). In step 1104, the user interface may be updated in response to the generation of the regular expression. In some cases, the user interface may be updated simply to display the generated regular expression to the user, while in other cases the user interface may be updated in various other ways as discussed below. As shown in this example, the user may select multiple different input data character sequences via the user interface, and in response to each new input data received, the regular expression generator 110 may generate an updated regular expression which encompasses both the first and second (positive) examples of character sequences. Then, when the user highlights a third sequence of characters (e.g., outside of both character sequences, or within the first or second character sequence) the regular expression generator 110 may update the regular expression again, and so on. In some embodiments, the regular expression generator 110 may execute the algorithm in real-time (or near real-time) so that an entirely new regular expression may be generated in response to each new keystroke or each new highlighted section made by the user. Additionally, if a user highlights (or otherwise selects) partially over a previous highlight, the old highlight may be deleted and the new one may be added.

Thus, as shown in FIG. 11, in response to user selections of character sequences via the user interface, the regular expression generator 110 may generate and display a regular expression. For example, when a user highlights a first sequence of characters, the regular expression generator may generate and display a regular expression representing the first sequence of characters. When the user highlights a second sequence of characters, the regular expression generator may generate an updated regular expression which encompasses both the first and second sequences of characters. Then, when the user highlights a third sequence of characters (e.g., within either the first or second sequence) the regular expression generator may update the regular expression again, and so on.

Figure 12:
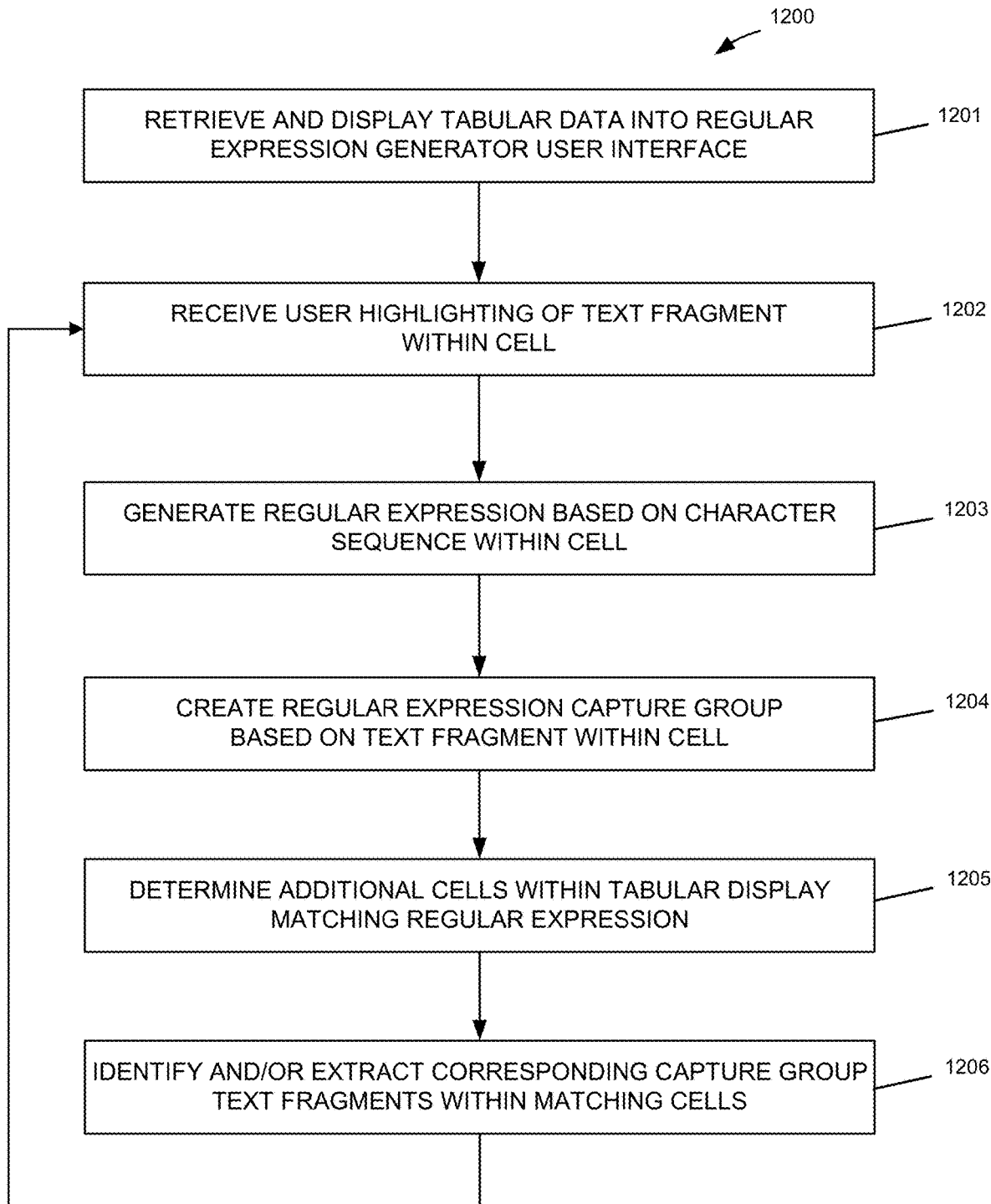
FIG. 12 is a flowchart illustrating a process for generating regular expressions and extracting data based on a capture group, via user data selections received within a user interface, according to one or more embodiments described herein.

FIG. 12 is another flowchart illustrating a process 1200 for generating regular expressions and extracting data based on a capture group, via user data selections received within a user interface. In step 1201, as discussed above in step 1101, the regular expression generator 110 may retrieve data (e.g., from a data repository 130) and render/display the data in tabular form within the graphical user interface. In step 1202, the regular expression generator 110 may receive selection of user highlighting of a text fragment within a particular data cell. In step 1203, the regular expression generator 110 may generate a regular expression based on the positive example of the selected data cell, and in step 1204 may create a regular expression capture group based on the text fragment highlighted within the cell. In step 1205, the regular expression generator 110 may determine one or more additional cells within the displayed tabular data that match the generated regular expression, and in step 1206 the corresponding text fragments within the additional cells that match the generated regular expression may be extracted.

Thus, in addition to supplying the positive examples, the user also may select (e.g., via mouse text highlighting) a text fragment within any of the selected positive examples. In response, the regular expression generator 110 may create a regular expression capture group to extract that text fragment from the example as well as the corresponding fragment from all other matches in the text the regular expression is applied to. Extracting the text fragments from matching data cells also may include deleting and modifying, and may be used in some cases to create a new column of data out of an existing column of semi-structured or unstructured text.

Using an example of a user selecting a positive data example, and if the user highlighted the year, then the regular expression generator 110 may generate the regular expression (?:[A-Z]{3}\s+\d\d,\s+!\d\d/\d\d)(\d\d\d\d). As shown in this example, the regular expression generator 110 has put parentheses around the year, and also converted the old parentheses around the month and day (used for alternation) into a "non-capturing" group by use of the ?: regex syntax. In some embodiments, an extraction/capture group may be required to fall on span boundaries, and in such embodiments the regular expression generator 110 may take the highlighted character range as input and expands it to encompass the nearest anchor span boundaries. However, in other examples, the mid-span extraction/capture may be supported by the user interface.

In some embodiments, the user interface may support input data from uses that includes a selection of a first character sequence within a second character sequence. For instance, a user may highlight one or more characters within a larger previously highlighted character sequence, and the second user selection may provide context for the larger first user selection. Such embodiments may enable input data to be provided to the regular expression generator 110 with greater specificity.

Additionally, in some examples, an operation may be initiated and a dialog may be opened in response to a user selecting (e.g., highlighting text) within the user interface. In some cases, the dialog may be a non-modal dialog, such as a floating toolbox window that does not prevent user interaction with the main screen. The dialog also may change in appearance and/or functionality depending on what major operation the user is performing. Thus, in such cases, the user need not search for a further menu item after highlighting the selected text, in order to initiate the modification, extracting, etc., of the capture group text fragments.

Additionally, in certain embodiments, the user interface provided for generating regular expressions may include three highlight modes: nested-auto, nested-manual, and single-level. Nested-auto can also be known as nested (auto-outer). Nested-manual can also be known as nested (full-control). In these examples, single-level may refer to one level of highlighting (or other form of text selection), which may cause a regular expression to be generated with no capture group. The nested-manual highlight mode allows for identification of two levels of highlighting (or other form of text selection). This causes generation of a regular expression with a capture group. The nested-auto highlight may be identical to the nested-manual highlight mode, except that the outer highlighting (or other form of text selection) may be automatically set to be the contents of the whole text (e.g., the entire spreadsheet cell).

In certain cases, the default mode of operation may be that the entire cell is identified as the highlighted region, and the user may further highlight one or more additional subsequences within the highlighted cell. In other modes, the user may be allowed to manually specify both highlights within a data cell of the tabular data display. In still other modes, the user may be allowed to manually specify an outer highlight with no inner highlight. These other modes may be better suited to "semi-structured" data, for example, a column of data consisting of tweets or other long strings such as browser "user agent" strings. "Semi-structured" data refers to data that may be displayed in tabular form within the user interface, but where a column within the table consists of unstructured text.

In some such embodiments, inner and outer selection (e.g., highlighting) by the user via the user interface may be distinguished by color coding. For example, the outer highlights of a positive example may be shown in a first text/background color combination, and the inner highlight of a positive example may be shown in a different contrasting text/background color combination.

Figure 13:
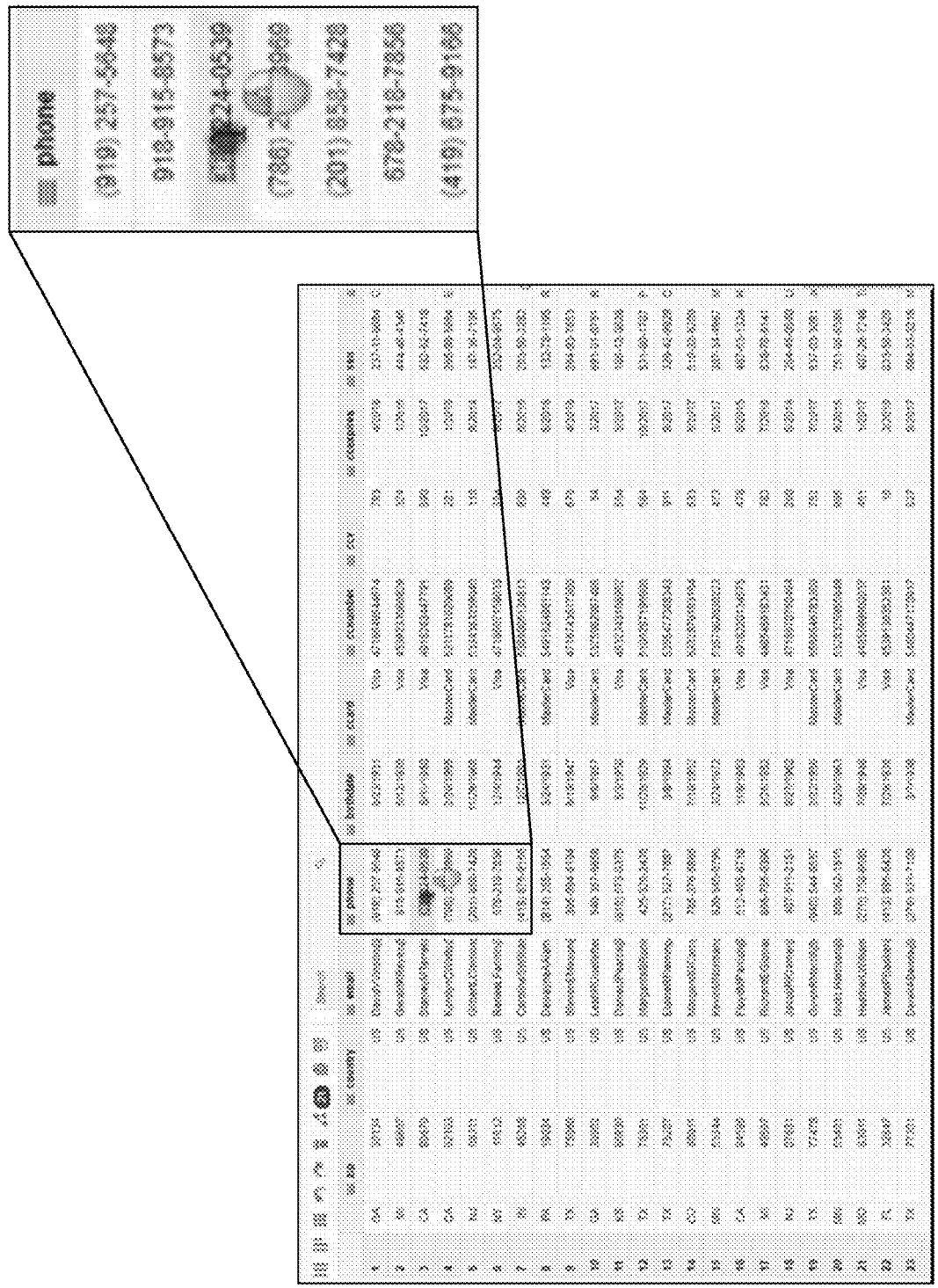
FIG. 13 is an example user interface screen showing a tabular data display, according to one or more embodiments described herein.

As indicated above, a user may specify a selection of a capture group via selection of a character subsequence. The GUI may be used to facilitate user selection via highlighting (or other indications). An example is shown in FIG. 13, in which an example user interface screen is shown with a tabular data display. In this example, FIG. 13 depicts highlighting within a column value, for example, caused by a user dragging a mouse across one or more desired elements of the column value. Note that the "cell" in which the user highlighting is performed may exhibit a color change indicating selection of the column value. This color change may be construed as automated highlighting responsive to the user highlighting.

Figure 14:
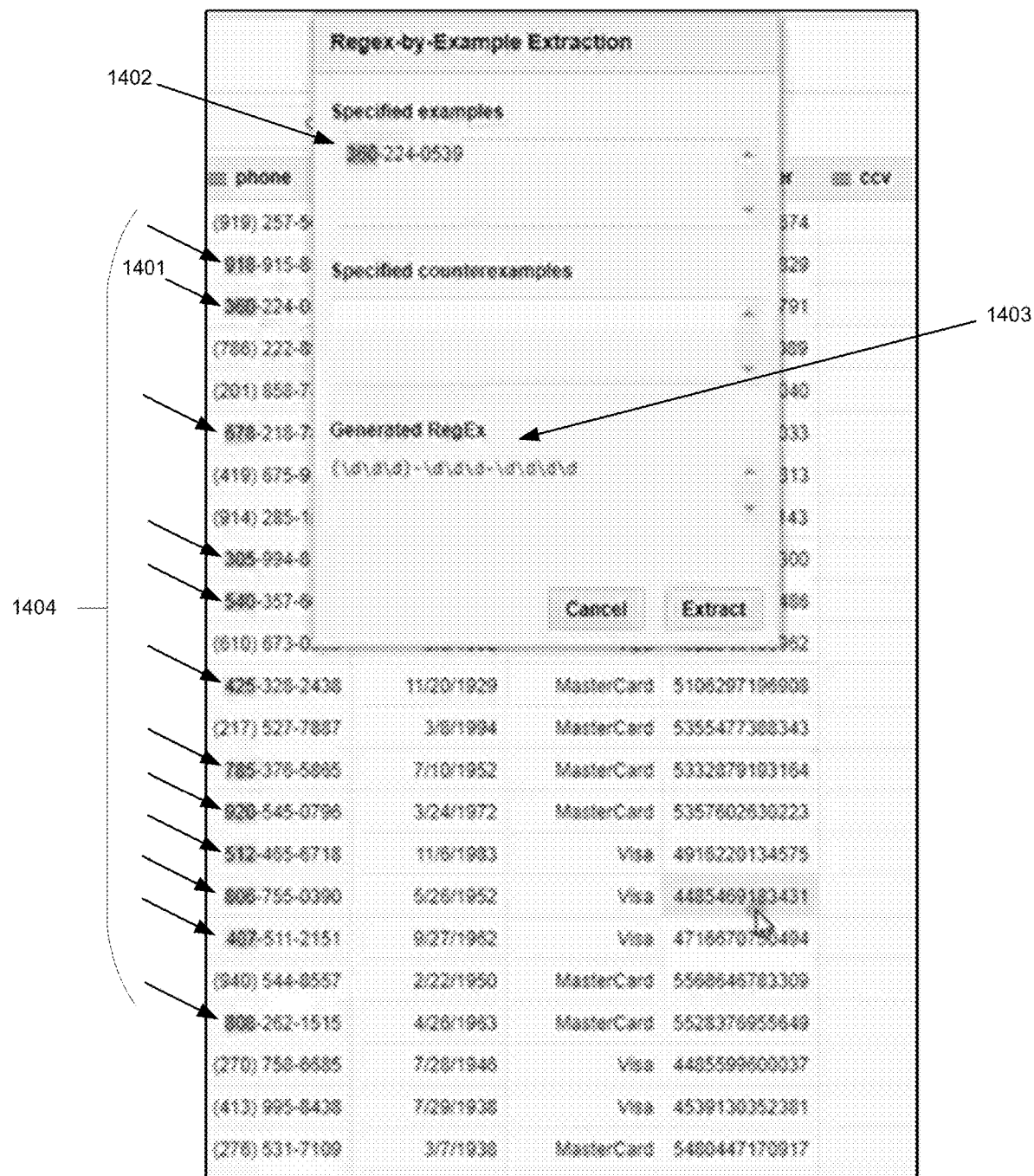
FIGS. 14 and 15 are example user interface screens illustrating the generation of regular expressions and capture groups based on selection of data from a tabular display, according to one or more embodiments described herein.
Figure 15:
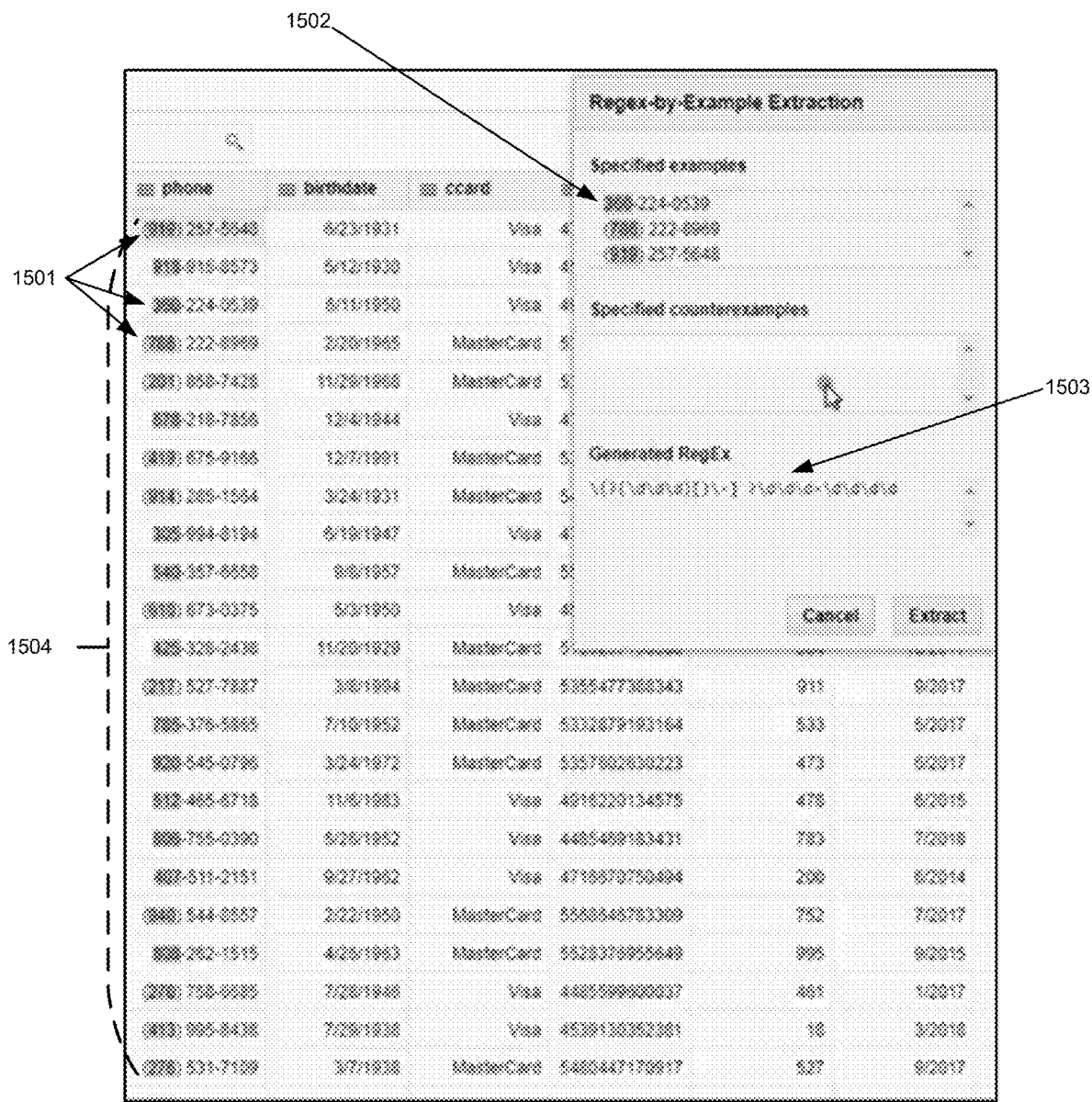

FIGS. 14 and 15 are example user interface screens illustrating the generation of regular expressions and capture groups based on selection of data from a tabular display. In these examples, FIGS. 14 and 15 show an additional user interface window that be displayed automatically detection of user highlighting 1401 within the tabular data display. The window comprises a field 1402 for displaying positive examples, a field for displaying negative examples, and a field for displaying the regular expression that is generated dynamically (and near-instantaneously) in response to the selection of positive examples form the tabular data display. In these example, user highlighting within a column value 1401 may be equivalent to user highlighting within automated highlighting. Thus, user highlighting of the area code causes not only the user-highlighted area code 1401, but also the rest of the phone number to be populated in the positive example field 1402.

However, it should be appreciated that user highlighting is not limited to performance within automated highlighting. For example, user highlighting may alternatively be performed within other user highlighting. As another example, user highlighting may alternatively be performed without any inner highlighting (e.g., further highlighting within highlighted text). These alternative examples are particularly suitable for semi-structured data, such as a column of data comprising "Tweets" or other long strings (e.g., browser "user agent" strings).

Furthermore, upon generation of the corresponding regular expression, other column values 1402 matching the regular expression may be identified based upon additional automated highlighting. In the examples shown in FIGS. 14 and 15, the additional automated highlighting indicates the elements of these other column values that match the capture group of the generated regular expression. The additional automated highlighting may be performed using a color that is different from the one used for the user highlighting.

As shown in FIG. 15, additional user highlighting is shown to indicate user selection of other examples. The additional user highlighting may be performed in a manner similar to that described above. Thus, the user interface in FIG. 15 shows the population of other examples in the field 1502 for displaying positive examples. This may occur responsive to detection of the additional user highlighting. Additionally, the generated regular expression 1503 may be updated dynamically and near-instantaneously, such that it matches all of the positive examples 1502. Responsive to generation of the updated regular expression, automated highlighting of other column values 1504 matching the updated regular expression may also be updated. In some implementations, dynamic color-coding also may be used. For instance, matches may be color-coded using a first color (e.g., blue), while positive examples are color-coded using a second color (e.g., green), and negative examples may be color-coded using a third color (e.g., red). Within the tabular data view (e.g., spreadsheet) or other infinite-scrolling data view (e.g., for semi-structured or unstructured data), as the view is scrolled down to real additional data, the newly visible data may be color-coded.

Figures 16A, 16B:
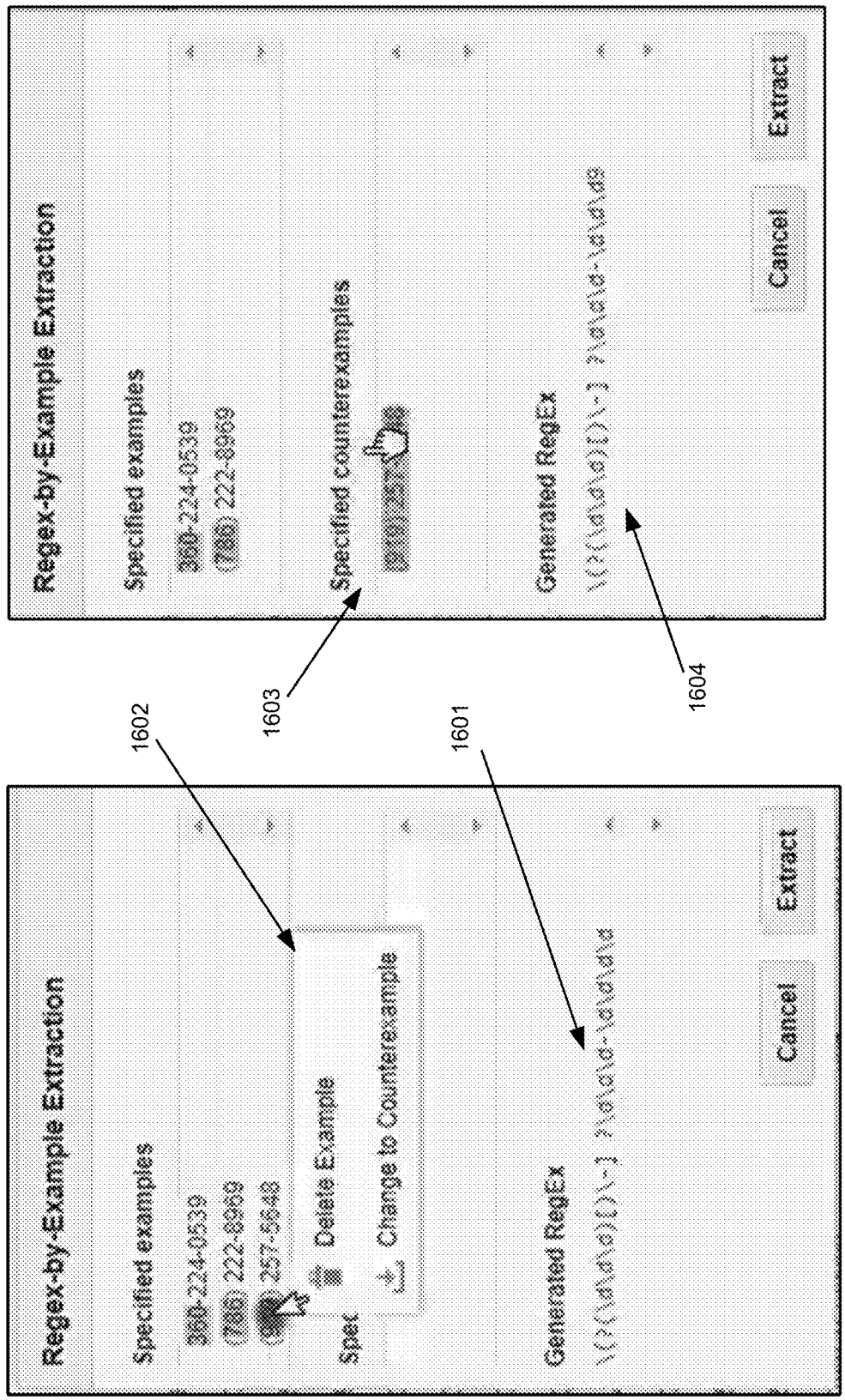
FIGS. 16A and 16B are example user interface screens illustrating the generation of regular expressions based on selection of positive and negative examples from a tabular display, according to one or more embodiments described herein.

FIGS. 16A and 16B are example user interface screens illustrating the generation of regular expressions based on selection of positive and negative examples from the tabular display. In FIGS. 16A-16B, individual examples from the positive examples field 1602 may be removed from the positive examples field 1603, and/or moved to the negative examples field 1603. Within the user interface, this may be performed, for example, by the user clicking (e.g., right-clicking) on one of the examples to selecting it. The selection may cause the user interface to display a menu 1602 comprising a delete option and a change option. Thereafter, clicking on an option may cause performance of the corresponding function.

In the example shown in FIGS. 16A and 16B, the result of the user selection of the change option, is to move the selected example is moved to the negative examples field 1603, causing the regular expression 1601 to be updated to regular expression 1604, which may be generated dynamically and near-instantaneously (e.g., between 30 ms and 9000 ms, or 100 ms median, in certain embodiments). Responsive to generation of the updated regular expression 1604, the automated highlighting of other column values matching the updated regular expression may also be updated within the tabular data display. Furthermore, automated highlighting may be performed on some or all of the negative examples, including any column values corresponding to the negative example, which may be highlighted using a color that is different from any of the colors used above, or otherwise distinguished within the user interface using other visual techniques.

In some embodiments, specifying a negative example via the user interface need not require first specifying the example as a positive example, and then converting it into a negative example as shown in FIGS. 16A and 16B. Rather, a negative example may be specified in a variety of ways. For example, a user may select (e.g., right click) a column value via the user interface (e.g., one of the other column values on which automated highlighting was performed to indicate that it matches the generated regular expression), which may thereby cause display of a menu comprising an option (e.g., "Make New Counterexample") to designate the selected column value as a negative example.

Thus, using the examples shown in FIGS. 16A and 16B, responsive to generation of the updated regular expression 1604, automated highlighting of other column values matching the updated regular expression may also be updated. In these examples, the updated regular expression specifies telephone numbers that end "9".

Returning briefly to FIGS. 14 and 15, when the "Extract" button is clicked or otherwise selected by the user, an operation may be initiated to extract the highlighted text fragments within all of the cells matching the current regular expression 1403 or 1503. Although not shown in FIGS. 14 and 15, in some embodiments the user interface may provide other selectable buttons in addition to or instead of the "Extract" button. For example, a "Replace" button may be presented as an option to replace user-highlighted elements with user-specified elements. Additionally or alternatively, one or more "Delete" buttons may be presented as an option to, in effect, replace user-highlighted elements with nothing. For instance, one or both of a "Delete Fragment" operation and/or a "Delete Row" operation may be implemented, which will delete either the user-highlighted text fragment or the entire row, respectively. Additional operations that may be implemented in various embodiments may include a "Keep Row" operation, a "Split" operation (e.g., highlight comma, then extract the comma-separated components into separate multiple new columns), and an "Obfuscate" operation (e.g., replace highlighted text/capture group with a sequence of "#" or other symbols).

In this example, in response to the selection of the "Extract" button, an extraction operation may be added to a list of transform scripts to be performed by a downstream operation. In some embodiments, the list of transform scripts may be displayed in a portion of the user interface for review/modification by the user. Alternatively, the extraction operation may be performed in situ to generate a new column comprising the contents of the regex capture group (e.g., the elements corresponding to the user-highlighted portions of a positive example). In the examples shown in FIGS. 14 and 15, a new column and/or a new table of area codes may be generated in response to a selection of the "Extract" button.

Figure 17:
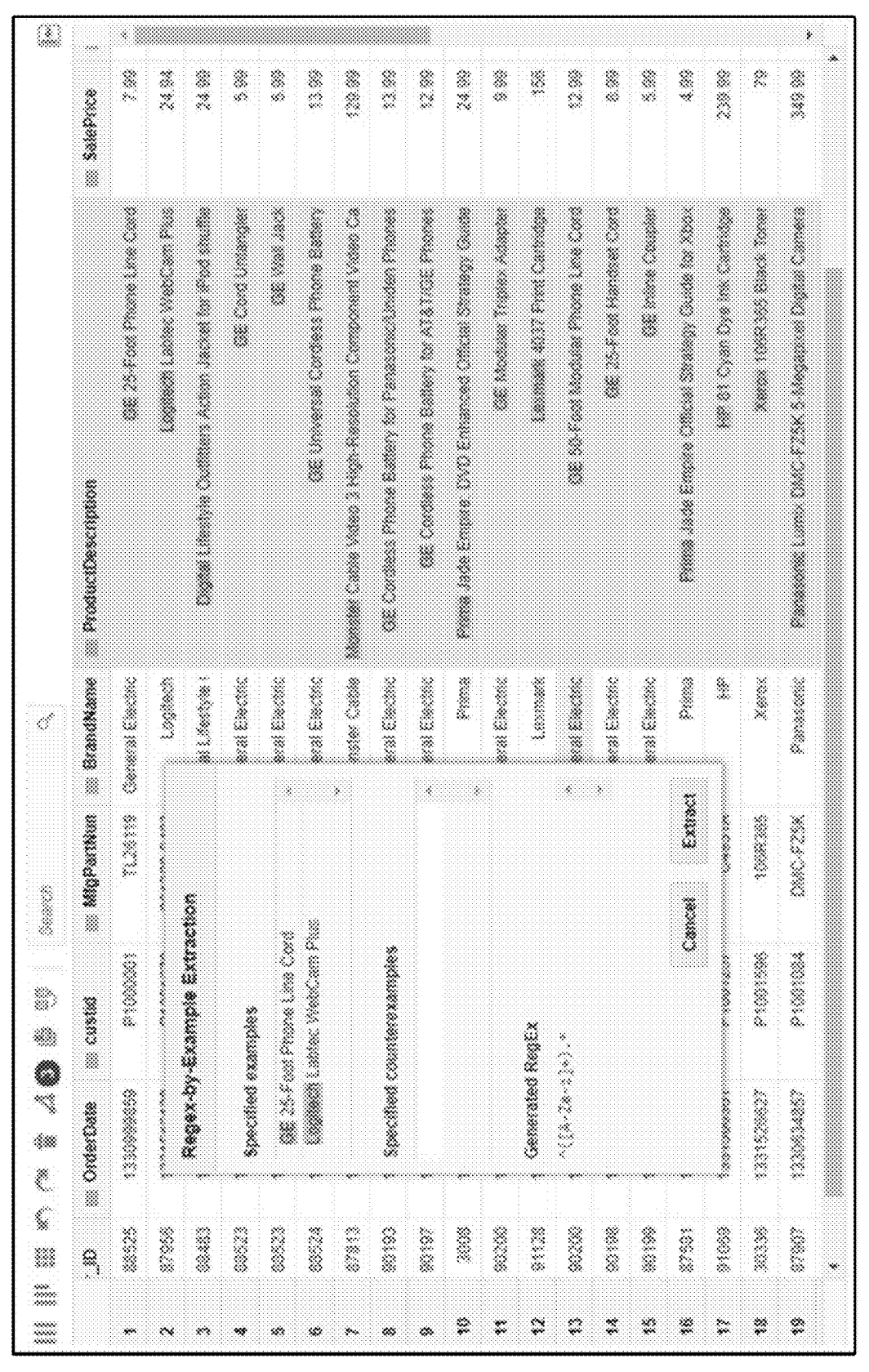

FIG. 17 is another example user interface screen illustrating the generation of a regular expression and capture group based on selection of data from a tabular display, according to one or more embodiments described herein.

A. Multiple Highlights

In some embodiments, the user interface also may support multiple highlights per example. FIGS. 42, 43, 44, 45, 46, 47, and 48 illustrate user interfaces 4200, 4300, 4400, 4500, 4600, 4700, and 4800 for implementing multiple highlighting, in accordance with some example embodiments. Different methods of highlighting are described below. In example embodiments, inner and outer highlights can be distinguished by using different color codes.

Figure 42:
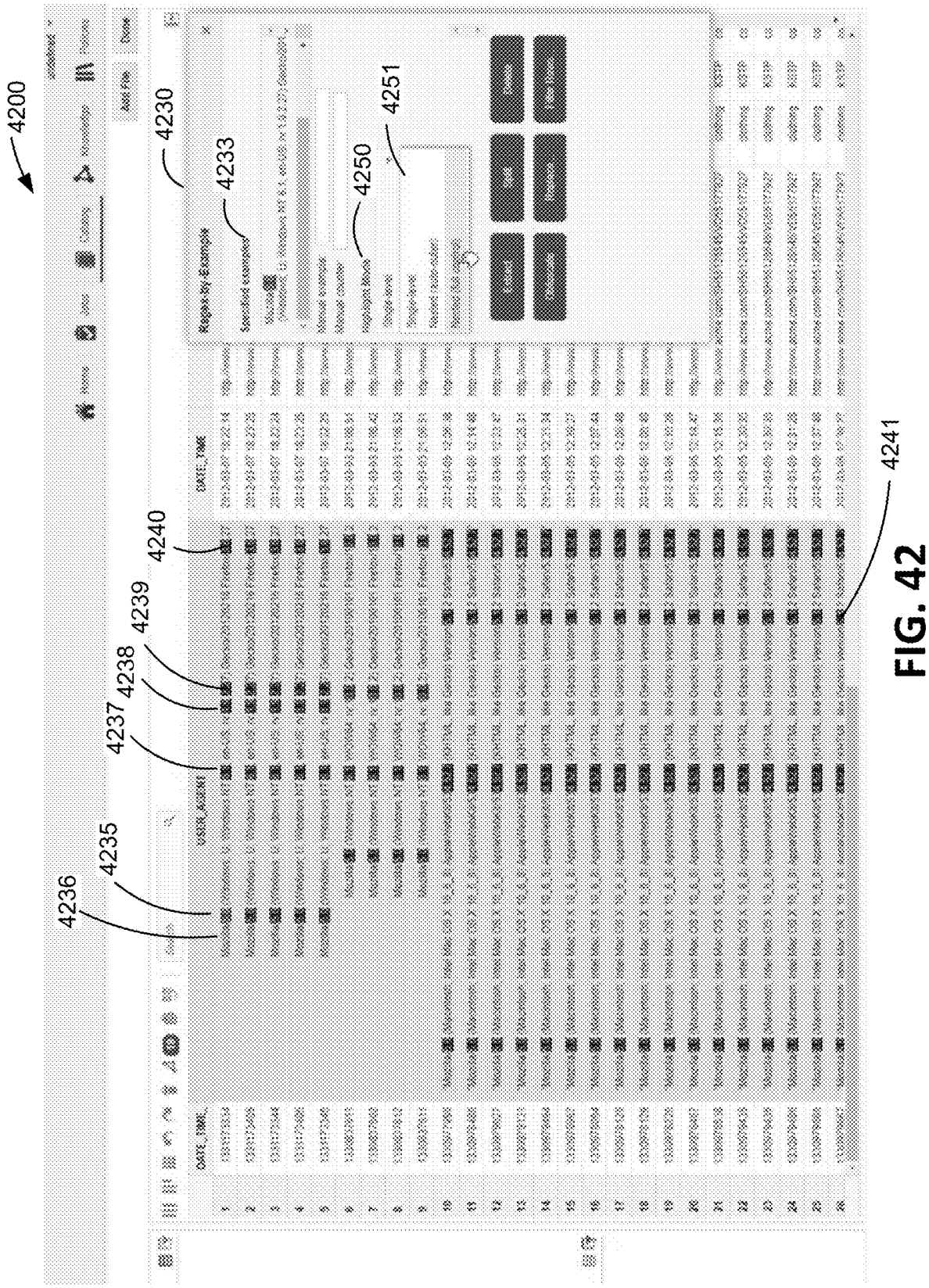
FIG. 42 illustrates a user interface displaying a view of the data set in in a single-level mode, in accordance with some example embodiments.

FIG. 42 illustrates a user interface 4200 displaying a view of the data set in a single-level mode, in accordance with some example embodiments. FIG. 42 illustrates how the highlighting would appear on the user interface while in the single-level highlight mode. In FIG. 42, the user highlights the version number 4235 (e.g., "5.0") for an application 4236 (e.g., Mozilla). In response to the user highlighting the version number 4235, the user interface data model generator highlights version numbers 4237 ("6.1"), 4238 ("1.9"), 4239 ("2.2") and 4240 ("3.6").

Based on the highlighting, a Regex-by-Example dialogue box 4230 can appear. The Regex-by-Example dialogue box 4230 includes the specified examples 4233 that were specified by the user. In this example, the version number "5.0" is specified by the user. Further, the Regex-by-Example dialogue box 4230 indicates that the highlight mode 4250 is at a single-level 4251.

Figure 43:
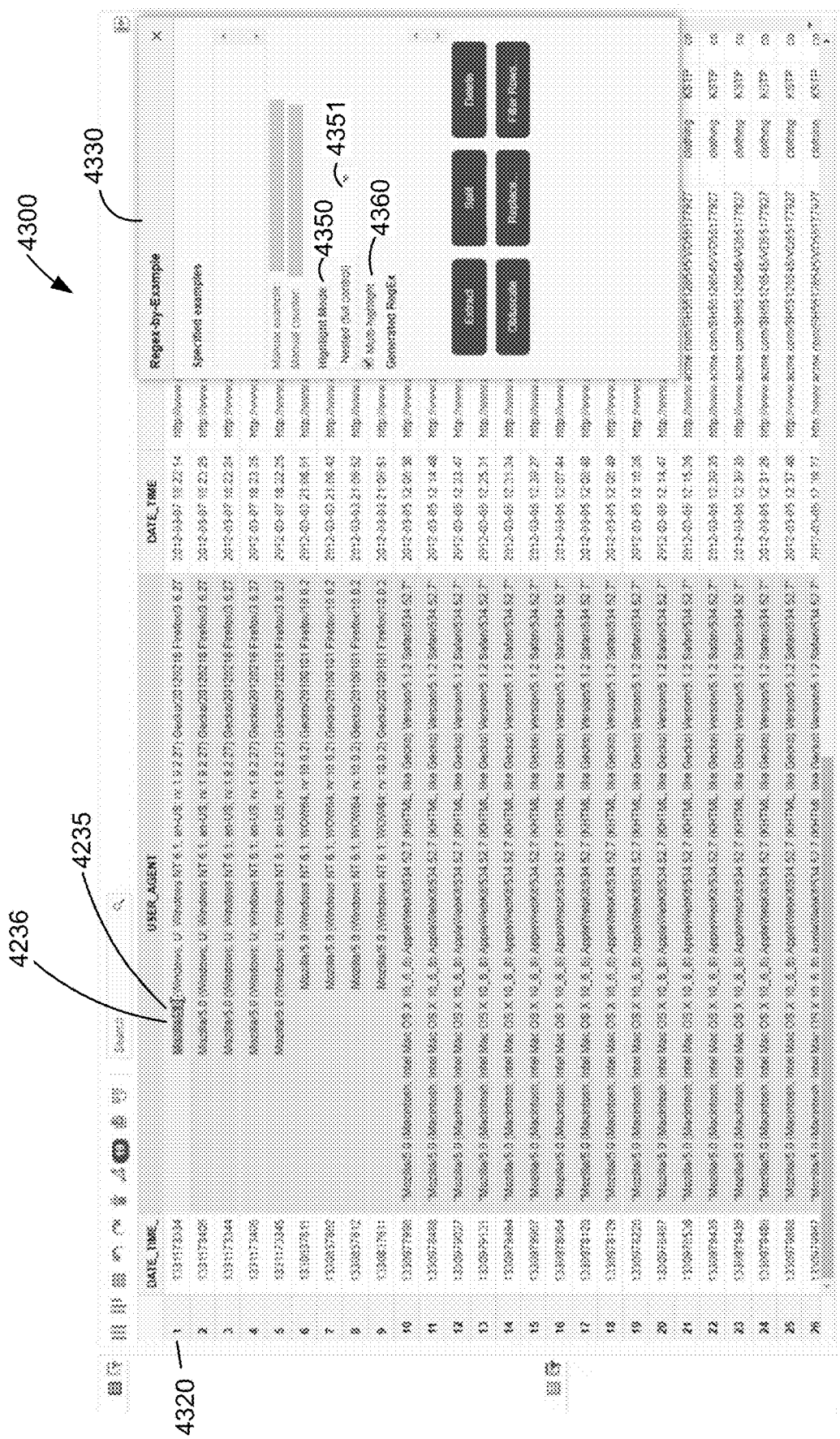
FIG. 43 illustrates a user interface displaying the highlighted data in a nested full control mode, in accordance with some example embodiments.

FIG. 43 illustrates a user interface 4300 displaying the highlighted data in a nested full control mode, in accordance with some example embodiments. In the example shown in FIG. 43, "nested (full control)" 4351 has been selected from the highlight mode panel 4350 in dialogue box 4330. Further, as shown in FIG. 43, the user indicates an outer highlight as the software name 4236 (e.g., "Mozilla") and version number 4235 (e.g., "5.0"). The Regex-by-Example dialogue box 4330 indicates that the highlight mode 4350 is at nested (full control) 4351. Further, the data set is currently in the multi-highlight mode 4360. In the highlighting performed in FIG. 43, the outer-highlight is performed in a nested full-control mode.

In an example embodiment, the outer-highlight-in-progress, that is the outer highlight that is currently being performed can be treated in first class manner with its own color of urgency, such as gold. In example embodiments, the highlighting can appear in different colors which can be used to indicate the urgency, priority, and/or importance of the highlighting.

Figure 44:
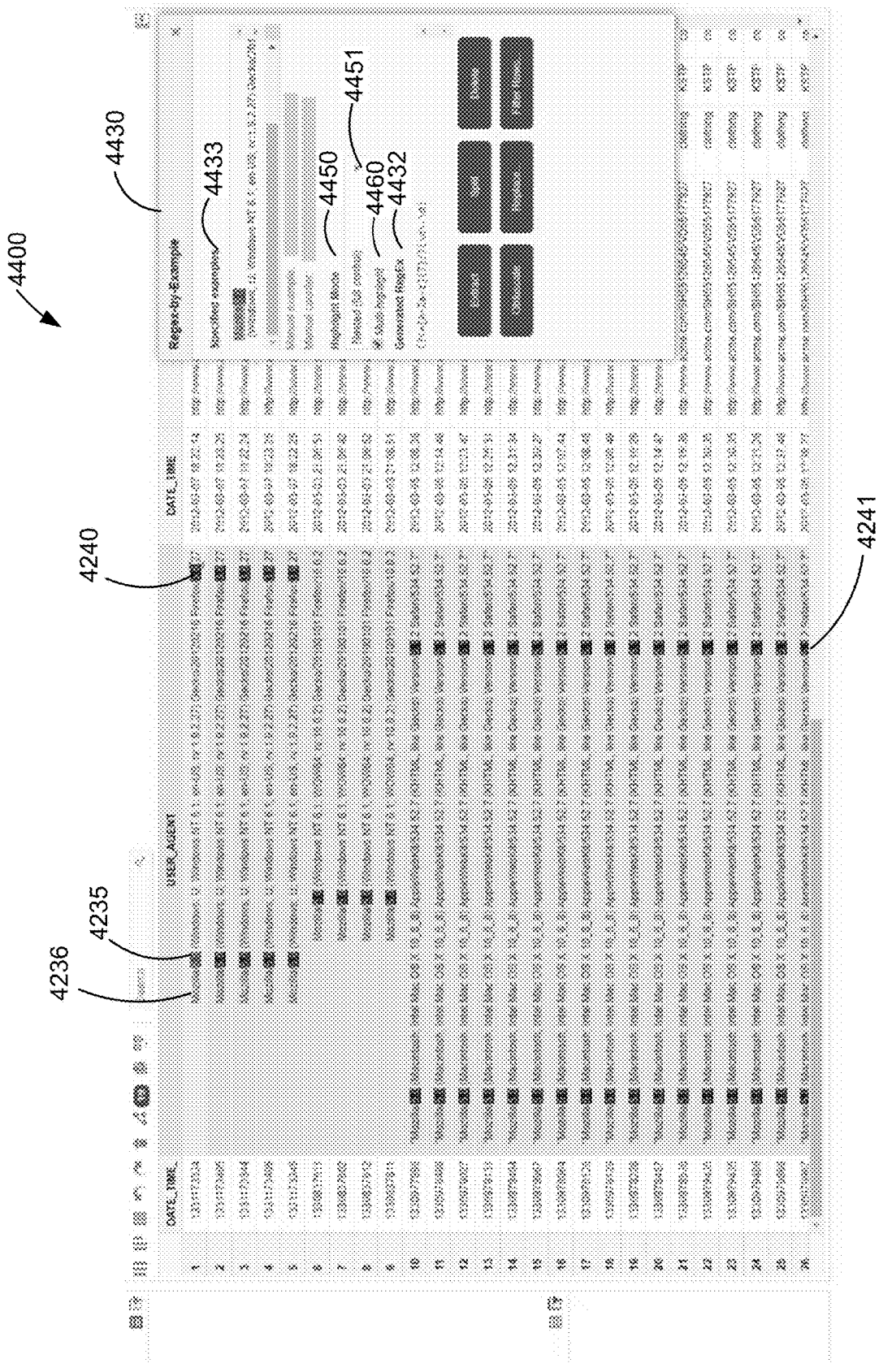
FIG. 44 illustrates a user interface displaying the highlighted data in a nested full control mode, in accordance with some example embodiments.

FIG. 44 illustrates a user interface 4400 displaying the highlighted data in a nested full control mode, in accordance with some example embodiments. As shown in FIG. 44, the multi-highlight mode 4460 is selected. The user has indicated an outer highlight as the software name 4236 and version number 4235. The software name 4236 (e.g., Mozilla) and the version number 4235 (e.g., 5.0), which are selected as the outer highlight, can be highlighted in a first color. After the user has selected the outer highlight, the user can identify an inner highlight. For example, the user can select the version number 4235 (e.g., "5.0") only as the inner highlight. The inner highlight can be highlighted in a second color that is different from the first color. Since the inner highlight and the outer highlight appear in different colors, the outer highlight and the inner highlight can be easily identified. The example shown in FIG. 44, is in a nested—full control mode highlight. Therefore, the highlight mode panel 4450 indicates that the data set is in the nested-full control mode 4451.

In example embodiments, inner and outer highlights can be distinguished by using different colors or color codes. For example, the outer highlights of a positive example can be shown in black text on a light green background, and the inner highlight of a positive example can be shown in light green text on a dark green background.

In FIG. 44, the user has selected the version number "5.0" which is identified as element 4235. When the user selects the version number "5.0" (element 4235), the user interface data model generator can automatically select the version number "3.6" (element 4240) and "5.1" (element 4241). Since the user interface data model generator highlighted version numbers in addition to the version number selected by the user, the user can provide additional examples if the additional version numbers identified by the user interface data model generator are not desired by the user. Alternatively, if the user agrees with the additional highlighting performed by the user interface data model generator, the user can proceed with applying commands to the highlighted data.

The Regex-by-Example dialogue box 4430 displays the specified examples 4433. Further, the Regex-by-Example dialogue box 4430 indicates that the highlight mode 4450 is nested (full control) 4451. Further, the Regex-by-Example dialogue box 4430 indicates that the data set is in a multi-highlight mode 4460. The generated regular expression 4432 is also identified in the Regex-by-Example dialogue box 4430.

Figure 45:
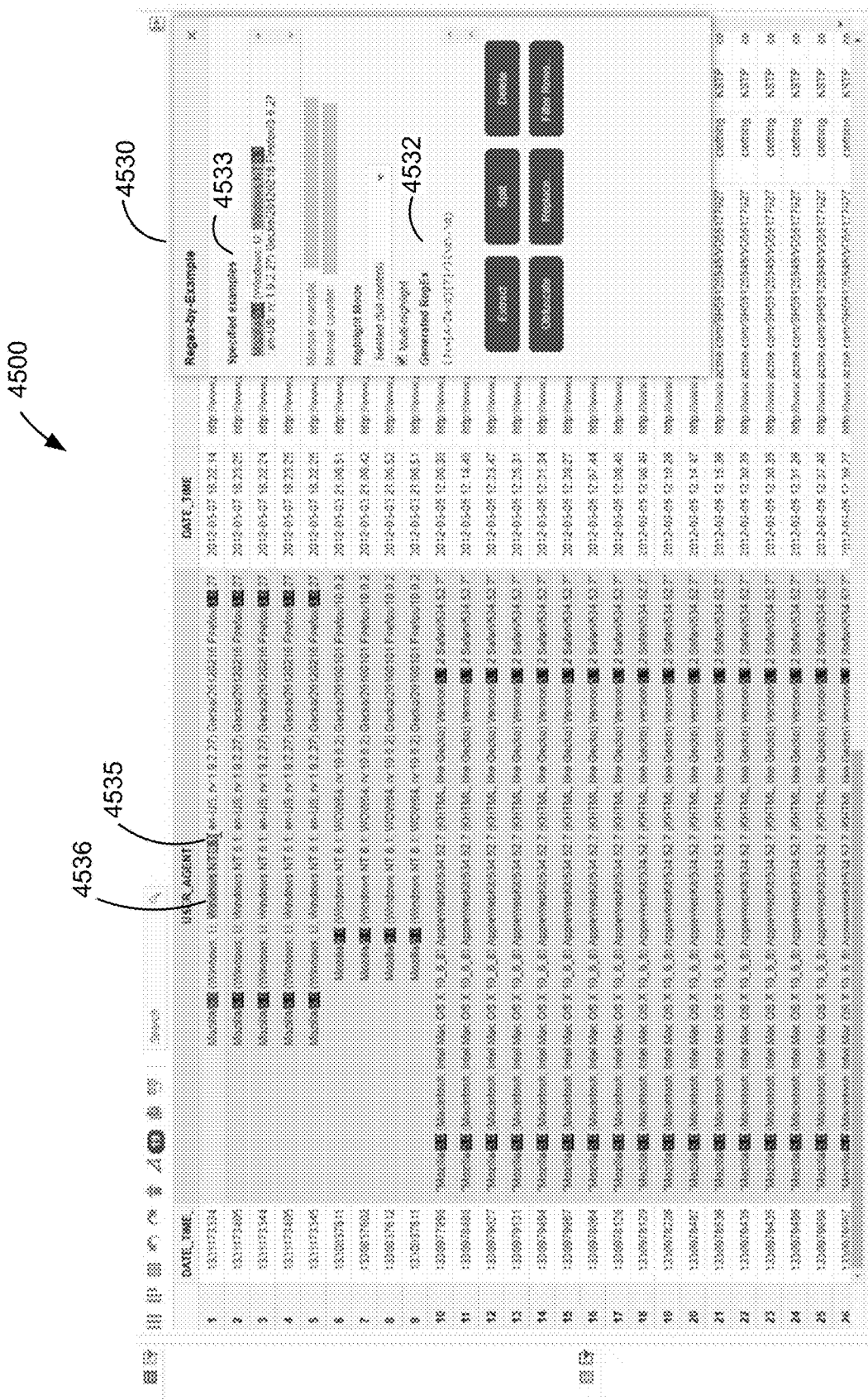
FIG. 45 illustrates a user interface for providing examples, in accordance with some example embodiments.
Figure 46:
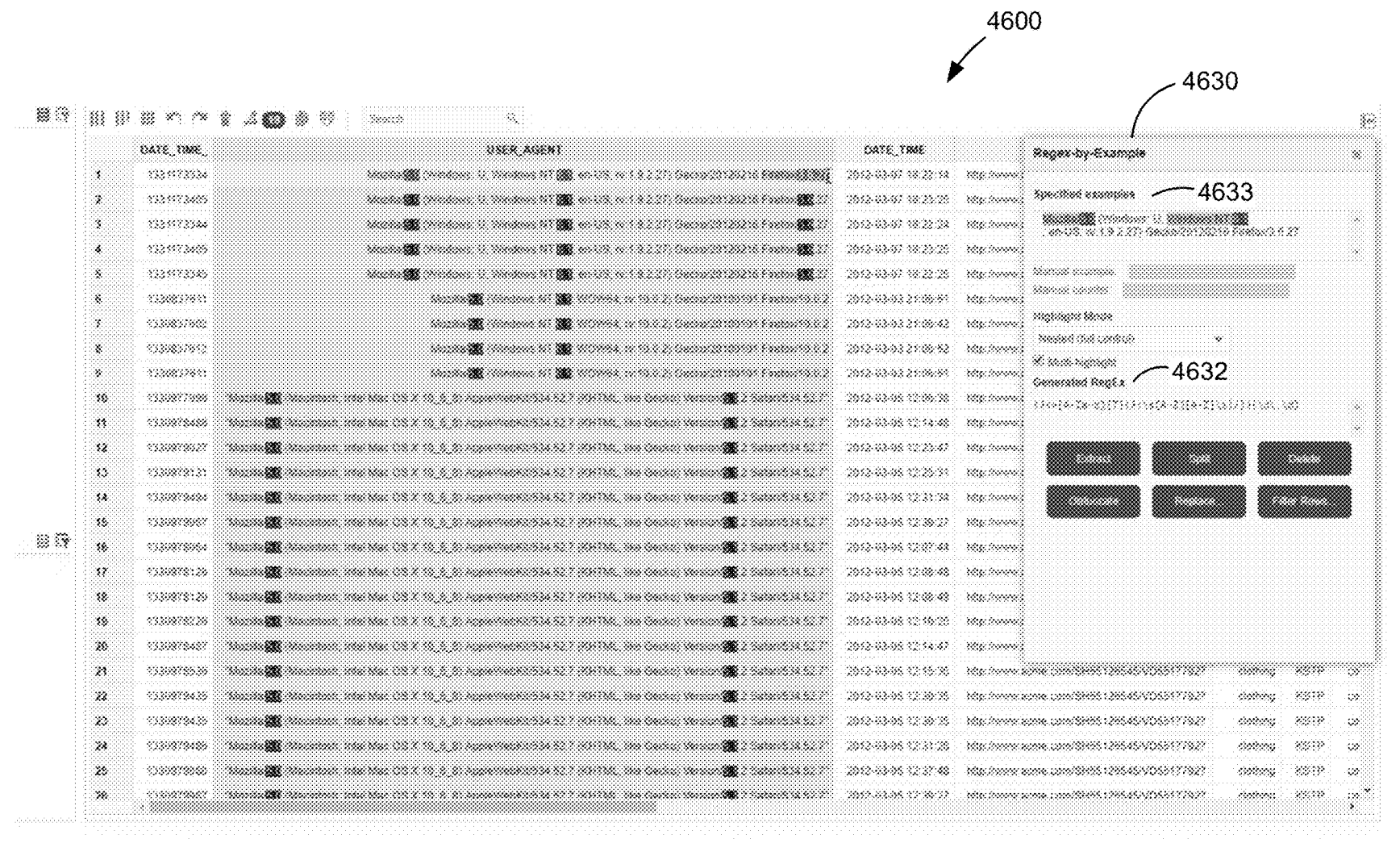
Figure 47:
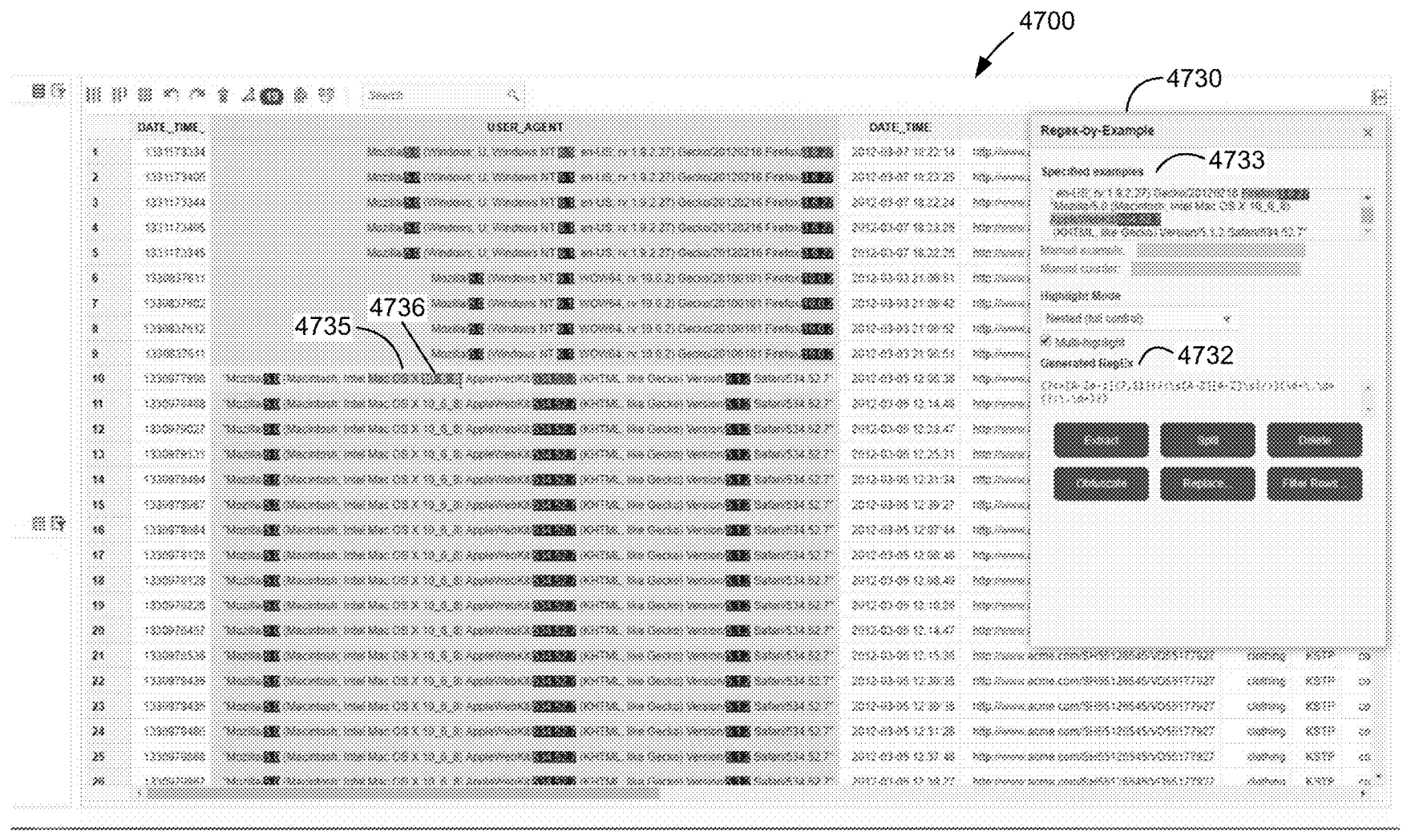

As shown in FIGS. 45, 46 and 47, the user can provide additional examples. FIG. 45 illustrates a user interface 4500 in which two positive examples are provided, in accordance with some example embodiments. FIG. 46 illustrates a user interface 4600 in which two positive examples are provided, in accordance with some example embodiments. FIG. 47 illustrates a user interface 4500 in which three positive examples are provided, in accordance with some example embodiments.

As shown in FIG. 45, for purposes of providing a positive example, the user can indicate an outer highlight as the software name 4536 and version number 4535. The software name 4536 (e.g., WindowsNT) and the version number 4535 (e.g., 6.1) which are selected as the outer highlight can be highlighted in a first color. After the user has selected the outer highlight, the user can identify an inner highlight. For example, the user can select the version number 4535 (e.g., "6.1") as the inner highlight. The inner highlight can be highlighted in a second color that is different from the first color. A regular expression 4532 can be generated based on the highlighting.

The highlighting examples provided by the user are identified in the specified examples 4533 in the Regex-by-Example dialogue box 4530.

FIG. 46 illustrates user interface 4600 displaying an updated generated regex, in accordance with some example embodiments. As shown in FIG. 46, the generated regex 4632 is updated based on the two specified examples 4633 (e.g., "Mozilla 5.0" and "WindowsNT 6.1"). As additional outer and inner highlights are provided by the user in the specified examples 4633, the generated regex 4632 will also change accordingly. The generated regex 4632 appears in the regex-by-example dialogue box 4630.

FIG. 47 illustrates a user interface 4700 displaying alternative data highlighting, in accordance with some example embodiments. As shown in FIG. 47, version numbers with underscores can be provided as examples for generating the regex.

As shown in FIG. 47, for purposes of providing another positive example, the user can indicate an outer highlight as the software name 4735 and version number 4735. The software name 4735 (e.g., MacOS X) and the version number 4736 (e.g., 10_6_8) which are selected as the outer highlight can be highlighted in a first color. After the user has selected the outer highlight, the user can identify an inner highlight. For example, the user can select the version number 4736 ("e.g., 10_6_8") as the inner highlight. The inner highlight can be highlighted in a second color that is different from the first color.

The highlighting examples provided by the user are identified in the specified examples 4733 in the Regex-by-Example dialogue box 4730. As shown in FIG. 47, the generated regex 4732 is updated based on the three specified examples 4733 (e.g., "Mozilla 5.0," "WindowsNT 6.1" and "MacOS X 10_6_8"). As additional outer and inner highlights are provided by the user in the specified examples 4733, the generated regex 4732 will also change accordingly.

Figure 48:
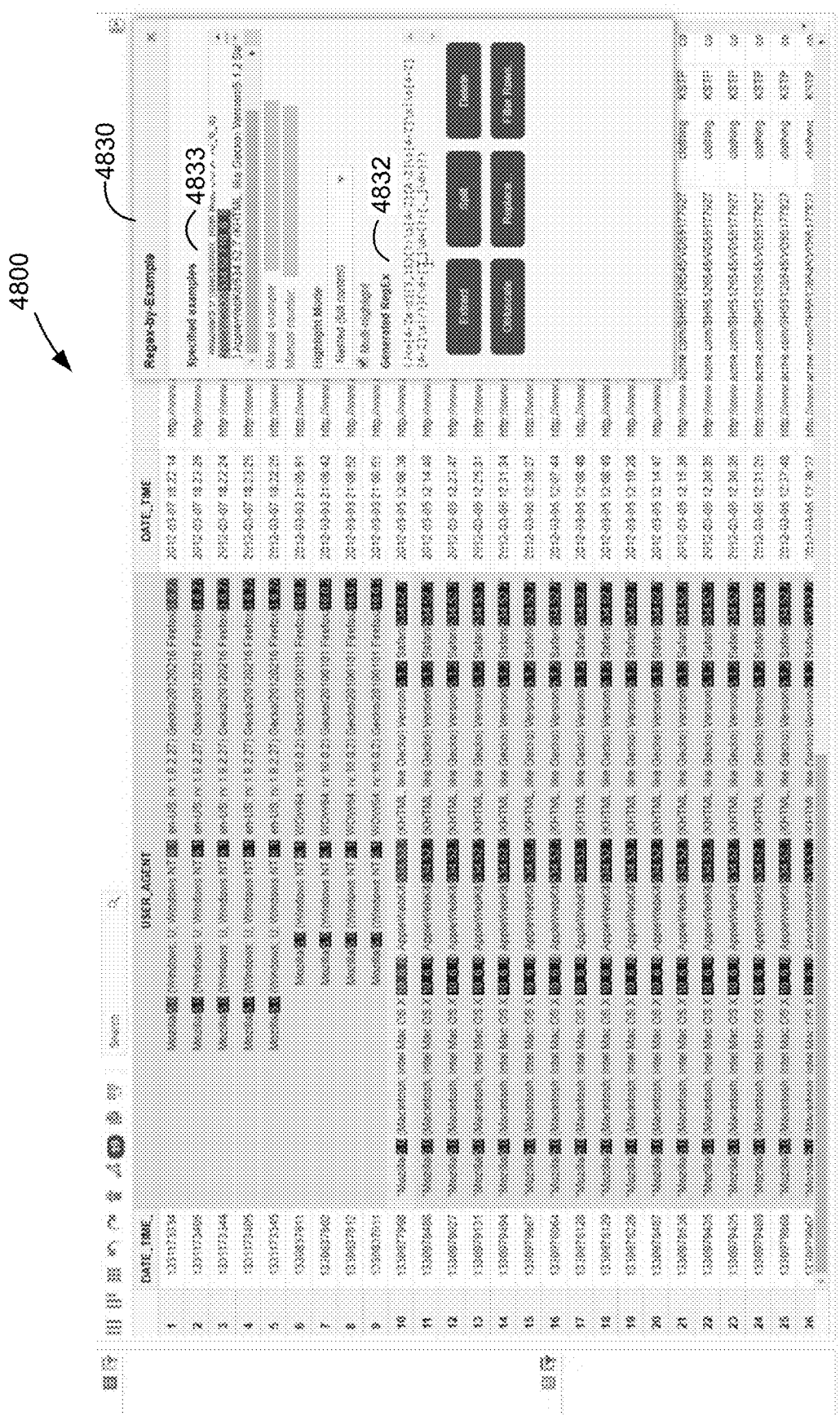
FIG. 48 illustrates a user interface displaying an updated generated regex, in accordance with some example embodiments.

FIG. 48 illustrates a user interface 4800 displaying an updated generated regex, in accordance with some example embodiments. As shown in FIG. 48, in response to the user selecting version numbers with underscores, the generated regex 4832 is updated to include the underscore information.

The generated regex 4832 is updated based on three specified examples 4833 (e.g., "Mozilla 5.0," "WindowsNT 6.1" and "MacOS X 10_6_8"). As additional outer and inner highlights are provided by the user in the specified examples 4833, the generated regex 4832 will also change accordingly. The generated regex 4832 appears in the regex-by-example dialogue box 4830.

Figure 49:
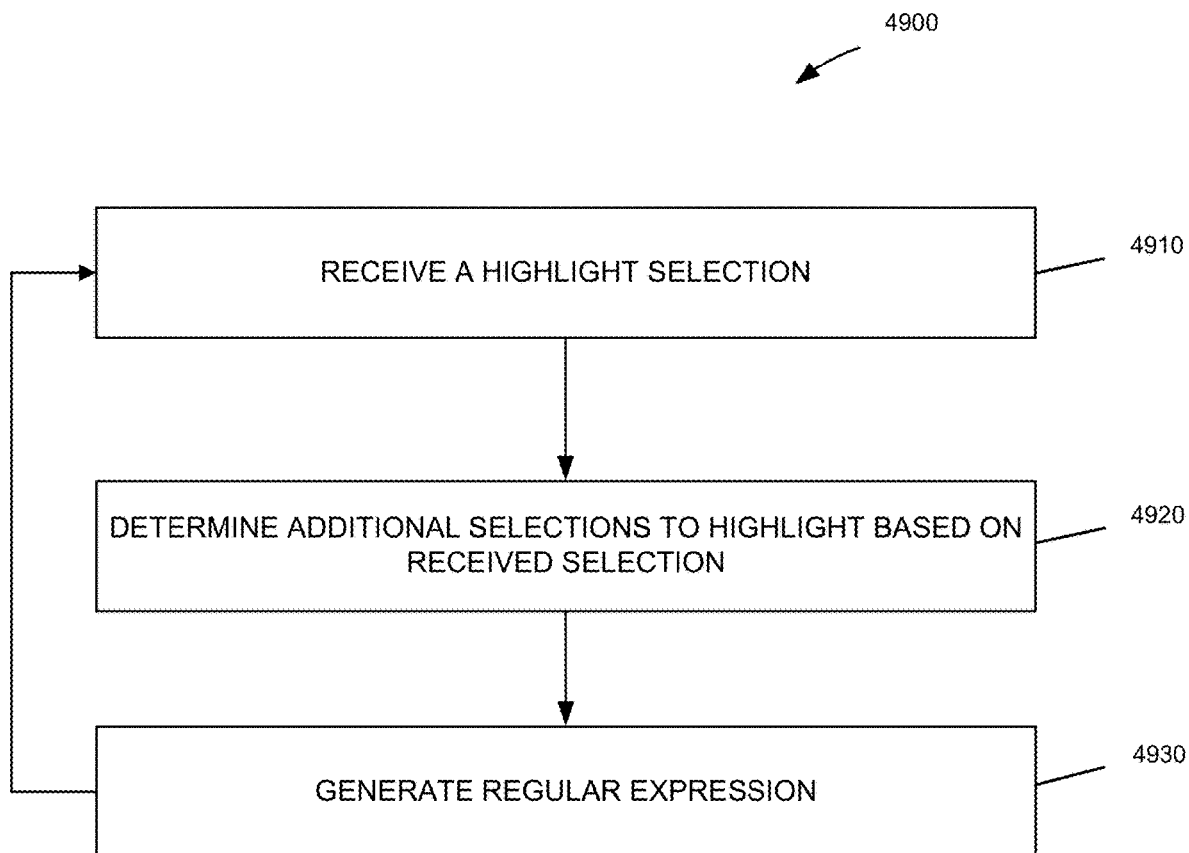
FIG. 49 is a flowchart of a method for performing multiple highlighting, in accordance with some example embodiments.

FIG. 49 is a flowchart of a method 4900 for performing multiple highlighting, in accordance with some example embodiments.

At step 4910, the user can select data (e.g., a data fragment) in the data set. That is, the user can select an outer highlight (e.g., "Mozilla 5.0") and an inner highlight (e.g., "5.0"). The user can perform the outer and inner highlighting in a first data record 4320.

At step 4920, after the user has performed an initial highlighting, the user interface data model generator can automatically highlight data (e.g., data fragments) within the same record and/or other records in the data set that correspond to highlighting performed by the user at step 4910.

At step 4930, a regular expression can be generated. The regular expression is generated based on the highlighting provided by the user at step 4910 and based on the additional highlighting performed by the user interface data model generator at step 4920.

If the user is not satisfied with highlighting results, the user can highlight additional data to provide additional examples. Therefore, steps 4910, 4920 and 4930 can be repeated until the user is satisfied with the final highlighting on the data set. Alternatively, the user can modify the generated regular expression (e.g., 4832) to produce the desired highlighting.

In an example embodiment, for multiple highlights in the nested (auto-outer) mode, a search is performed for the smallest number of surrounding spans required. If the user interface is in nested (auto-outer) mode with multiple highlights, then the back-end algorithm can go into a special mode. The reason for the special mode is that multiple highlights per example tends to imply that the example strings are longer than usual. As the LCS algorithm has exponential run-time, this would take too long to execute with the full length of the outer highlights. In the special mode, the algorithm starts with the inner highlights and gradually grows the outer highlights around them until a satisfactory regex is generated.

Example code for performing the special mode can include some or all of the following code:

```
if (mustUseLookAheadAndBehind && examplesScala.forall(e =>
e.highlights.forall(h => h.outer.start == 0 && h.outer.end == e.s.length-1))) {
    var result = InductResult(false, "", new java.util.ArrayList[Range]( ))
    var reachedMaximal = false
    var numLookAheadAndBehindSpans = 0
    do {
        var numLookBehindSpans = 0
        do {
            val shortenedPosOnly = flaggedPosOnly.map(e => {
                val es = toSpans(e.e.s)
                val highlightSpanRange = highlightSpanRangeForExample(es,
e.e.highlight)
                val expandedSpanRange = Math.max(0, highlightSpanRange.min -
numLookBehindSpans) to Math.min(es.length - 1, highlightSpanRange.max +
numLookAheadAndBehindSpans - numLookBehindSpans)
                def toString(r:Range) = es.slice(r.start,
r.end+1).map(_.orig.head.s).mkString
                val expandedSpanString = toString(expandedSpanRange)
                val lookBehindLength = toString(expandedSpanRange.start until
expandedSpanRange.start + numLookBehindSpans - 1).length
                FlaggedExample(e.useForBothTrainAndTest, NumberedExample(e.e.id,
expandedSpanString, e.e.isPositive, lookBehindLength to lookBehindLength +
toString(highlightSpanRange).length-1))
            })
            result = shortestRegEx(shortenedPosOnly, false, false,
inductParameters.useContext, mustUseLookAheadAndBehind, false).r
            if (!result.isSuccess) {
                val someNeg = numberedExamples.filter(!_.isPositive).map(e =>
FlaggedExample(isMatch(result.r, e.s) && e.s.length > 0, e))
                if (someNeg.count(_.useForBothTrainAndTest) > 0)
                    result = shortestRegEx(shortenedPosOnly ++ someNeg,
inductParameters.isStartAligned, inductParameters.isEndAligned, inductParameters.useContext,
mustUseLookAheadAndBehind, false).r
            }
            numLookBehindSpans += 1
            reachedMaximal = shortenedPosOnly.indices.forall(i =>
```

```
shortenedPosOnly(i).e.s.length == flaggedPosOnly(i).e.s.length)
    }while (!result.isSuccess && !reachedMaximal &&
numLookBehindSpans < numLookAheadAndBehindSpans)
        numLookAheadAndBehindSpans += 1
    }while (!result.isSuccess && !reachedMaximal)
    result
```

Multi-highlight allows a user to easily select data (e.g., data fragment) for which any of the commands (e.g., extract, split, delete, obfuscate, replace, and filter rows) can be applied.

For the capability of multiple-highlights-per-example, individual highlights may be clickable instead of whole rows. In some cases, a checkbox (or other techniques within the user interface) may be used switch between the modes of one-highlight-per-example and multiple-highlights-per-example. Within a mode supporting multiple highlights per example, the user may select multiple different highlighted portions within a single data example (e.g., a spreadsheet cell) to provide multiple different examples from which a regular expression may be generated. In multiple highlights per example, both positive and negative "examples" may be identified and may be shown as color codes in the one list of examples. For instance, in a multi-highlight mode, clicking a highlight now makes only that one sub-example negative. Multiple highlights per example functionality is demonstrated in FIGS. 42-49.

As shown in this sequence of examples, the user successively selects an outer highlighted area, followed by an inner highlighted area, to generate/update the corresponding regular expression. Additionally, as shown in these figures, the user may designate multiple different inner/outer highlighting examples within a single data cell, and the generated regular expression may be updated with each new example highlighted (or otherwise selected by the user) via the user interface.

In some embodiments, special multi-highlight nested-auto-outer search mode may be limited to a diameter of a predetermined number of spans (e.g., 10 spans). In such cases, the condition on the last do-while loop may be:

while (!result.isSuccess && !reachedMaximal && numLookAheadAndBehindSpans<10)

Multi-highlighting may be used when implementing certain commands.

B. Commands

As noted above, the user interface may support additional types of commands besides extraction commands in various embodiments. Elements of the user interface data model generator can be configured to implement the commands.

Figure 24:
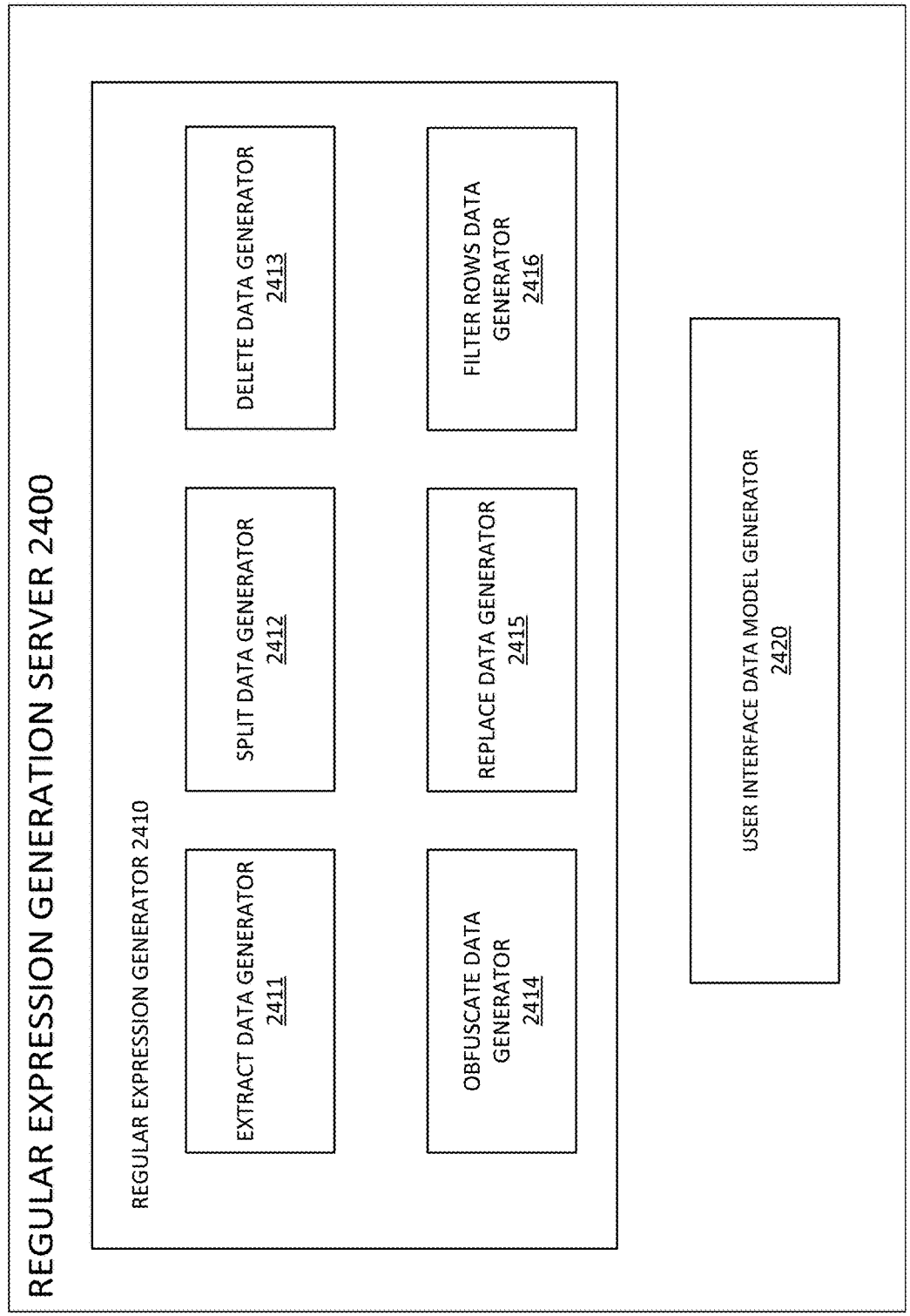
FIG. 24 illustrates a regular expression generator, in accordance with some example embodiments.

FIG. 24 illustrates the regular expression generation server 2400, in accordance with some example embodiments. The regular expression generation server 2400 can correspond to the regular expression generator server 111 shown in FIG. 1. The regular expression generation server 2400 can include a plurality of processors and memories. The regular expression generation server 2400 can include a regular expression generator 2410 and a user interface data model generator 2420. Regular expression generator 2410 can also be referred to as a regex generator. Regular expression generator 2410 can correspond to regular expression generator 116 of FIG. 1. User interface data model generator 2420 can correspond to user interface data model generator 114 of FIG. 1.

The regular expression generator 2420 can perform several different commands including extract, split, delete, obfuscate, replace, and filter rows. Therefore, the regular expression generator 2420 can include an extract data generator 2411, a split data generator 2412, a delete data generator 2413, an obfuscate data generator 2414, a replace data generator 2415 and a filter rows data generator 2416. The components of the regular expression generation server 2400 will be explained in greater detail below.

Although extract, split, delete, obfuscate, replace, and filter rows commands are described, example embodiments can be configured to perform additional commands. Further, the regular expression generator 2410 can include command generators other than those shown in FIG. 24.

1. Extract

As noted above, in an extract command, the pattern matches of a regular expression may be identified and the matching data may be extracted out into a newly created column. The extract functions are described above with respect to FIGS. 14 and 15.

2. Split

Figure 25A:
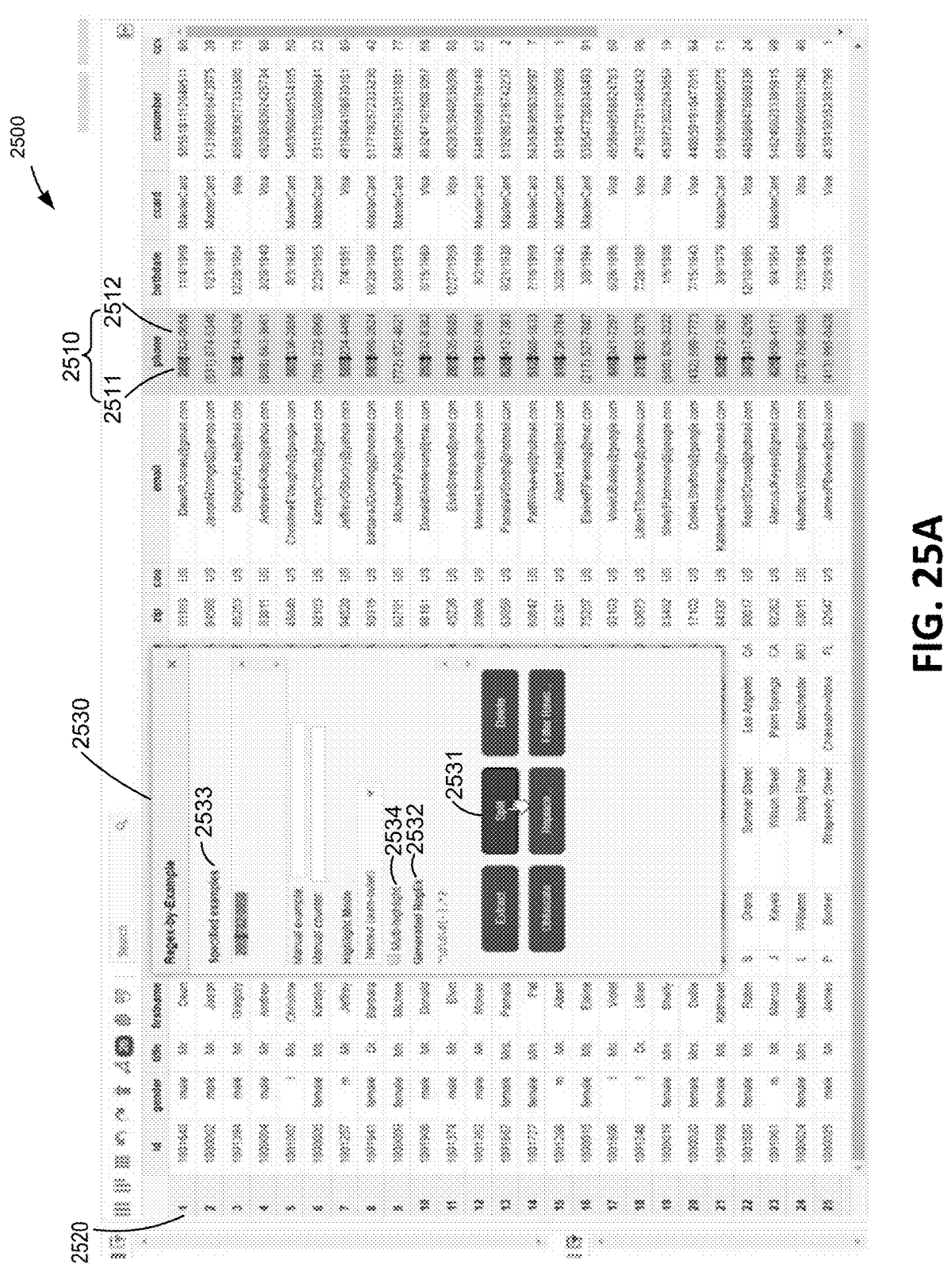
Figure 25B:
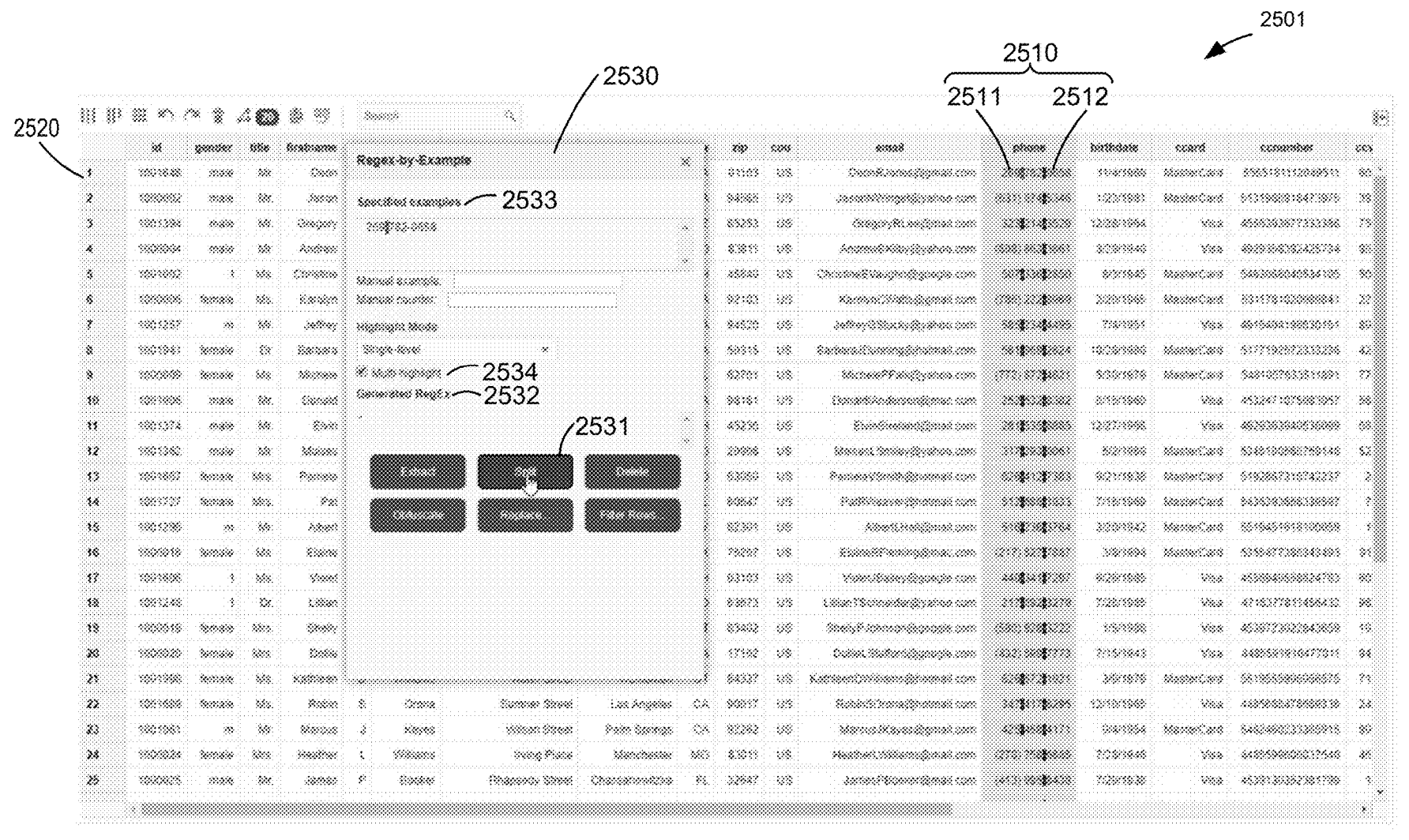
Figure 26:
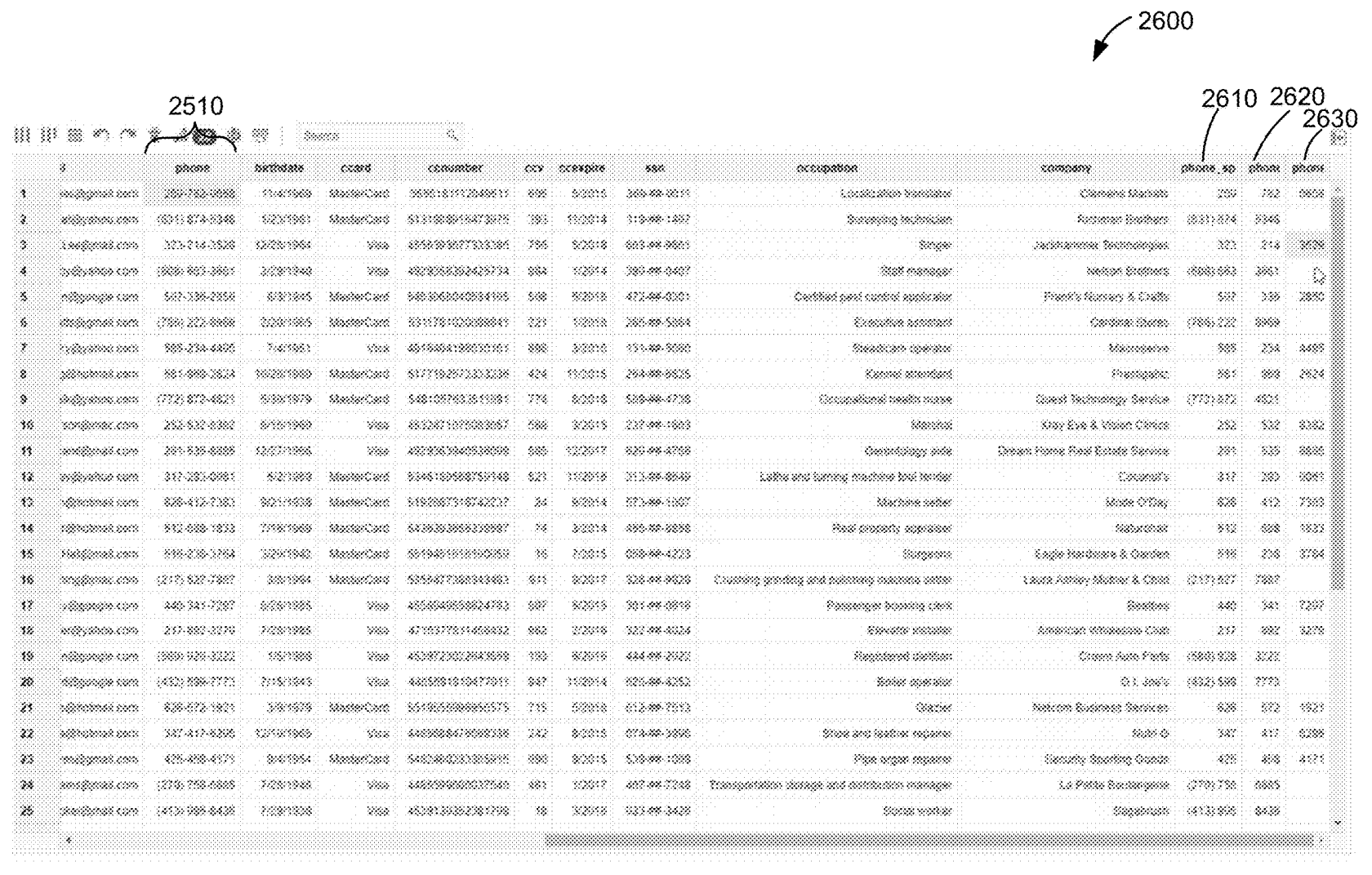

FIGS. 25A, 25B and 26 show an example of a split command implemented via the user interface. FIG. 25A illustrates a user interface 2500 and FIG. 25B illustrate a user interface 2501 for implementing a split command, in accordance with some example embodiments. FIG. 26 illustrates the results of a split command on a data set, in accordance with some example embodiments.

A split command may result in the creation of multiple different columns, based on the presence of particular regular expressions that are used as delimiters. For example, if a comma (",") is provided as a pattern to be matched, then the comma will be used as a delimiter during the extract operation. Each data to be extracted that contains a single comma will be split at the comma and extracted out into two different columns (i.e., the data before the comma and the data after the comma). If a data item to be split includes two commas, then the data will be split into three portions based on the comma and will be extracted out into three new columns. Thus, the split command may perform an extract based on a delimiter (into one or more new columns) rather than an extract which is based on a pattern match (in which matches would be put into a single column).

In other examples, a split command may be performed using braces or brackets at the pattern to be matched (or delimiter), asterisks, "<" or ">" or hyphen and dash characters for certain types of content, and so on. Additional symbols may be used as a delimiter.

As shown in FIG. 25A, a data set is displayed on a user interface 2500. The data set can be a spreadsheet. The data set can include a column 2510 that includes phone numbers. The phone numbers can include a first hyphen 2511 and a second hyphen 2512. If the split command is implemented on the column 2510 of phone numbers, the phone numbers can be split as desired by the user.

Figure 27:
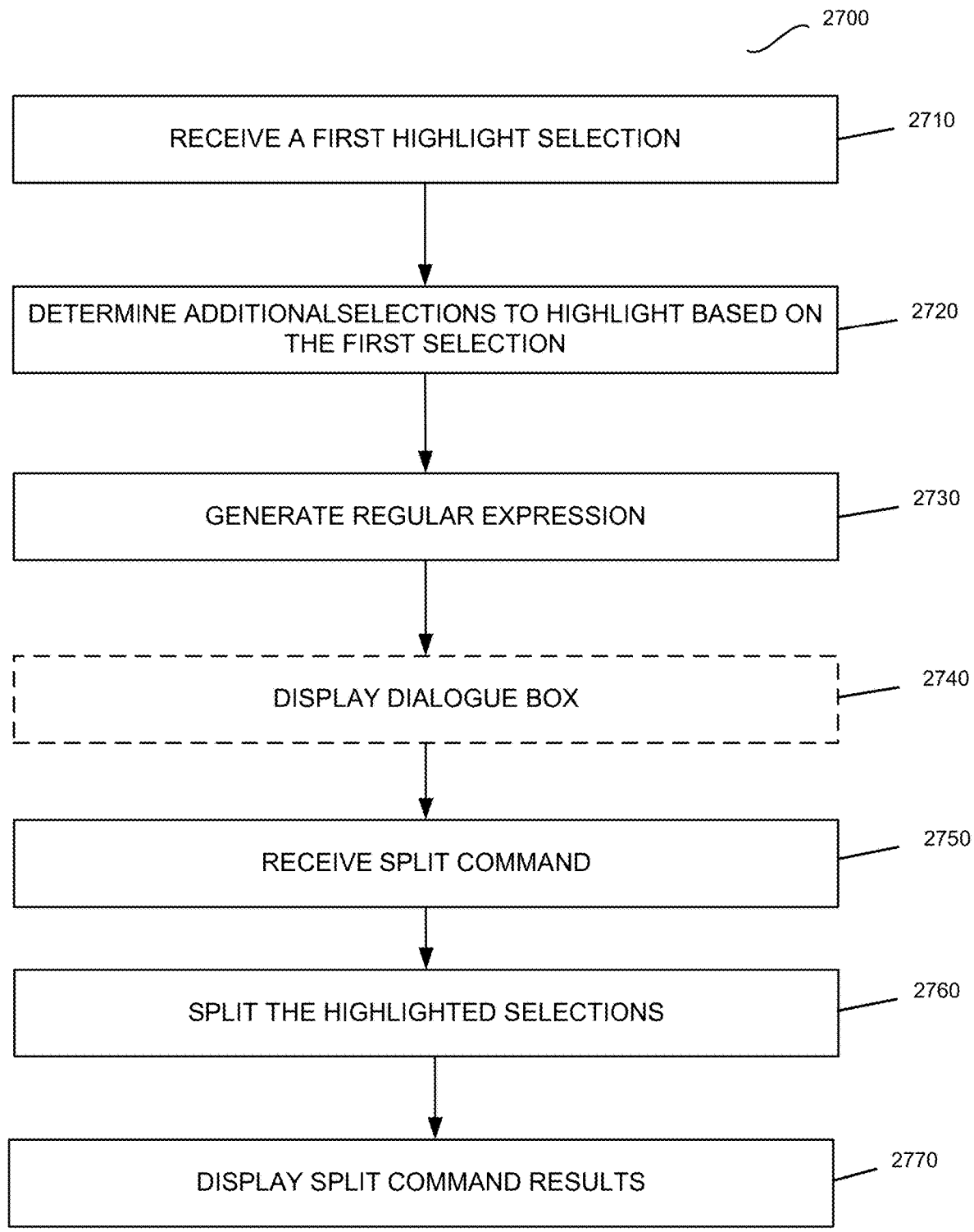
FIG. 27 illustrates a flowchart of a method for performing the split command, in accordance with some example embodiments.

FIG. 27 illustrates a flowchart of a method 2700 for performing the split command, in accordance with some example embodiments. In the example used in FIG. 27, a hyphen "-" character will be used as the delimiter for splitting the data.

At step 2710, the user can select the hyphen ("-") for the first record 2520 within the "phone number" column 2510. The hyphen can be selected by the user highlighting the hyphen using, for example, a mouse or a gesture on a display of the device if the user is on an interactive user interface. In the example shown in FIG. 25A, the user has highlighted a first hyphen 2511 in the first record 2520.

At step 2720, after the user has highlighted the first hyphen in the first record 2520, the user interface data model generator can automatically highlight all of the first hyphens in the phone number column for each of the data records (e.g., records 2-25 as shown in FIG. 25A) that correspond to the selection that was made by the user. That is, the user interface data model generator can determine, based on the highlighting performed by the user for the first record 2520, what highlighting should be performed for the remaining records (e.g., 2-25) in the phone number column. Although 25 records are shown in the drawings, example embodiments can apply the split command to more or less than 25 records. Further, the data set can include a large number of records, such as thousands or several thousands of records. The regular expression can determine, based on an initial highlighting performed by the user, what additional highlighting should be performed within a same record or in additional records.

At step 2730, after the highlighting has been performed, a regular expression can be generated based on the highlighting. FIG. 25A illustrates the generated regex 2532 which is generated based on the highlighting performed by the user and based on the automatic highlighting that is performed by the regular expression generator. The regular expression that is generated will be updated based on the changes in highlighting that is performed by the user.

At step 2740, a "Regex-by-Example" dialogue box 2530 can automatically appear on the screen. Although in the example shown in FIG. 25A, the "Regex-by-Example" dialogue box 2530 appears after the highlighting has been performed for all of the records (e.g., records 1-25) of the phone number column 2510, the "Regex-by-Example" dialogue box 2530 can also appear after an initial input (e.g. highlighting of the first record by the user).

In FIG. 25A, a specified example 2533 is shown, which allows the user to easily highlight or modify the highlighting that is performed on the selected data. The user can modify the highlighting by changing the highlighting in the data in the "phone number" column 2510, by changing the highlighting in the specified example 2533, or by modifying the generated regex 2532. Changes made to the "phone number" column 2510 will be reflected in the regular expression 2532 that is generated.

In an example embodiment, a minimum spanning tree can be used on an example rather on the highlights. Therefore, if there are multiple highlights for each example provided and the highlighting overlaps, only a single copy of the longest common subsequence algorithm needs to be run for the example. If the highlighting for the examples provided do not overlap, the longest common subsequence algorithm can be run for each of the highlights.

In example embodiments, a longest span list is chosen for minimum spanning tree (MST) vertices and is fed first into the LCS queue. An LCS queue comprises spans for which the longest common subsequence algorithm is applied. With multiple highlights per example in which one example representing multiple highlights is being included in the array passed into graphLcs( ), the longest such example is chosen to be the vertex in the graph for the minimum spanning tree that determines the order lists of spans are passed into the LCS queue.

At step 2750, selection of the "Split" command is received. For example, the user can select the "Split" button 2531 on the Regex-by-Example dialogue box 2530. As shown in the Regex-by-Example dialogue box 2530, the multi-highlight checkbox 2534 and the highlight mode drop-down list is disabled when split is selected.

In an example embodiment, a checkbox may be animated to call a user's attention to when the UI automatically checks the box based on the user making a second highlight. An example embodiment provides for animating a checkbox based on a change in state triggered by user interacting elsewhere in the UI. The checkbox is animated when the server system automatically causes the checkbox to change its state based on user interaction elsewhere on the screen.

After selection of the "Split" command is received, at step 2760, the split data generator 2412 of the regular expression generator 2410 can automatically split the phone numbers based on the highlighted delimiters. The example shown in FIG. 25B occurs after the user has selected the "split" command 2531 in FIG. 25A.

As shown in FIG. 25B, the split command will change the highlight settings to multi-highlight. In FIG. 25A, prior to selection of the split command, the multi-highlight mode 2534 is not selected. In FIG. 25B, after selection of the split command, the multi-highlight mode 2534 is now selected. In some embodiments, when a "Split" command is selected, the user interface may enable the multi-highlight checkbox and highlight mode drop-down list. For example, referring to FIG. 25B, when the user clicks the "Split" command, the highlight mode may be automatically changed to single-level, and then the multi-highlight text box may be enabled.

At step 2770, the split command results can be displayed. As shown in the user interface 2600 displayed in FIG. 26, the phone numbers from the phone number column 2510 have now been split into three columns 2610, 2620 and 2630. Column 2610 includes a portion of the phone number that appears before the first hyphen, column 2620 includes the portion of a phone number that appears between the first and second hyphen, and column 2630 includes a portion of a phone number that appears after the second hyphen. Since there are two hyphens, which act as delimiters, the phone numbers are split into three columns. For some numbers, a column can include the area code along with the prefix since the area code appears before the first hyphen. Fields will be populated for a phone number based on the information in the phone number. If a phone number only has one hyphen, then only two columns of information will appear for that number.

The three additional columns are generated within the spreadsheet view as shown in FIG. 26. Since the phone number has been split, the user can more easily identify desired information. For example, the user can more easily identify the area codes in the data records. Additionally, the user can perform additional processing for each of the columns 2610, 2620 and 2630. Therefore, the data can be more easily used by the user. For example, the user can identify a primary area code of their customers.

After the split command is performed, the split command that was performed (e.g., split column_phone) can be added to a transform script for the data set. The transform script indicates the commands that are applied to columns of data. The transform script can be used to apply the same commands to another data set.

Therefore, an example embodiment provides a fast and efficient user interface for splitting data in a data set. Further, the regular expression generator can be configured to identify settings which are more likely to produce results that will be desired by the user.

Although the flow diagram is described with specific steps, the order of the steps can be modified. For example, a regular expression can be generated based on the initial highlighting performed by the user.

3. Delete

Figure 28:
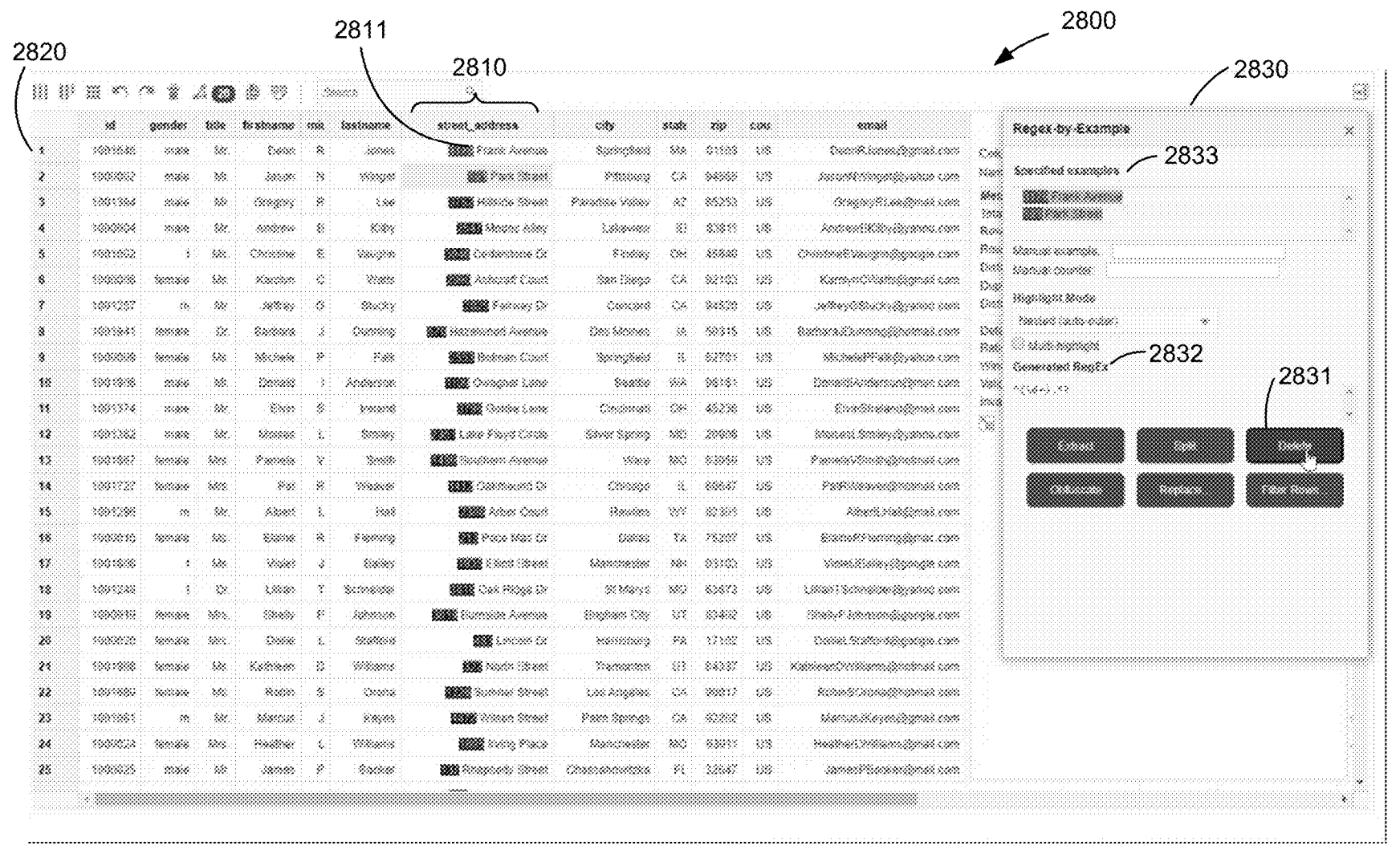
Figure 29:
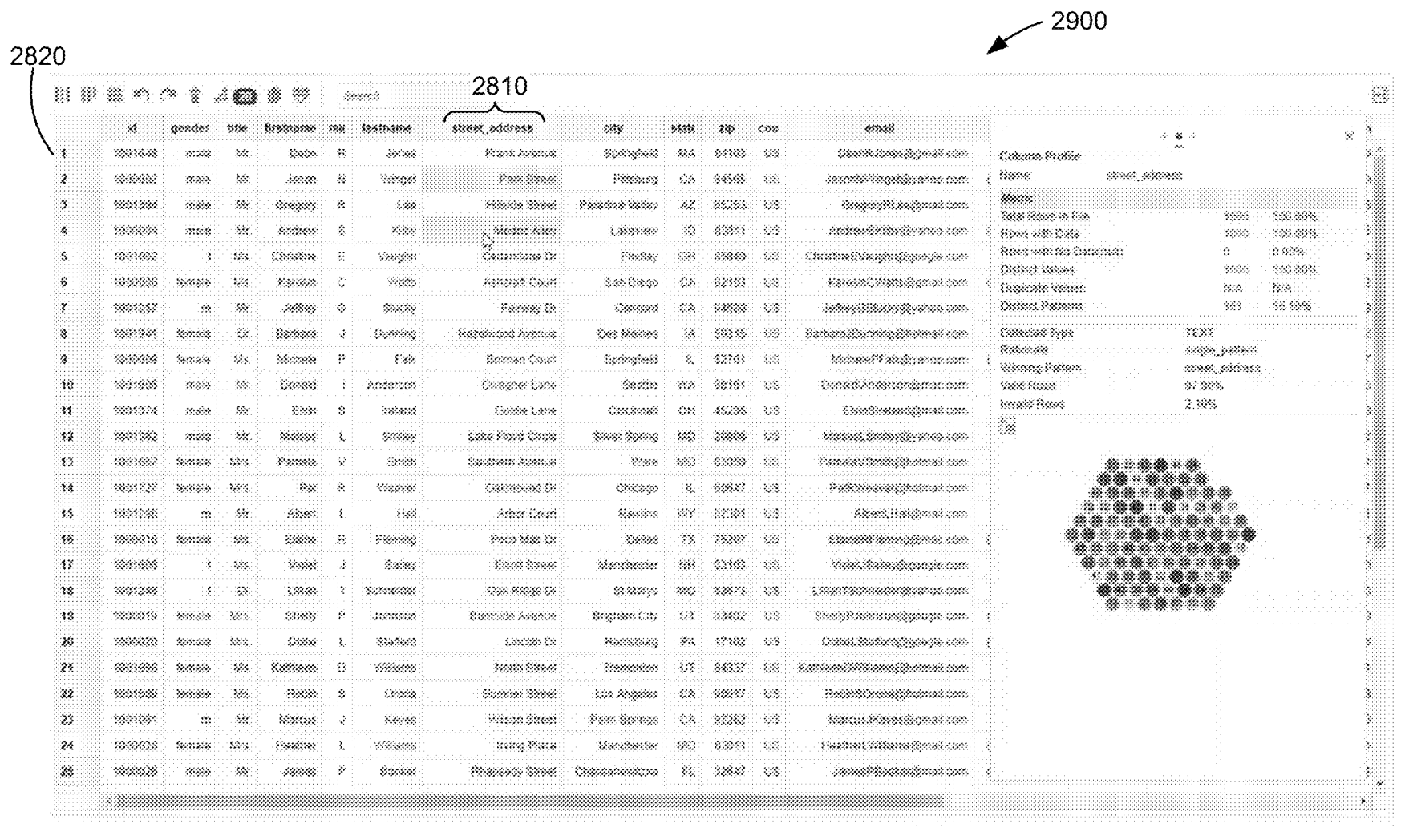

FIG. 28 illustrates a user interface 2800 for implementing a delete command, in accordance with some example embodiments. FIG. 29 illustrates a user interface 2900 displaying the results of a delete command on a data set, in accordance with some example embodiments. In a delete command, the user may highlight (or otherwise select) text examples to generate a regular expression corresponding to a pattern, and then delete the data matching pattern from the spreadsheet or other data view. The delete function replaces data with an empty string (e.g., " "). The delete command can implemented by converting the generated regex into three capture groups.

As shown in FIG. 28, a data set is displayed on a user interface 2800. The data set can include a column 2810 that includes street addresses. In the example shown in FIG. 28, a user desires to delete a street number 2811 from an address. If the delete command is implemented on column 2810 of "street_address" of record 2820, street address information can be deleted as desired by the user. In FIG. 28, the user has selected a number of positive examples to identify the street numbers within the "street_address" column of the spreadsheet. The examples appear as specified examples 2833. The user then clicks the "Delete" button to initiate the delete operation. FIG. 29 displays the resulting spreadsheet with the street numbers deleted. Thus, the delete command is essentially replace with " " (empty string). This may be implemented by converting the generated regex into three capture groups, as discussed below for the "replace" command.

Figure 30:
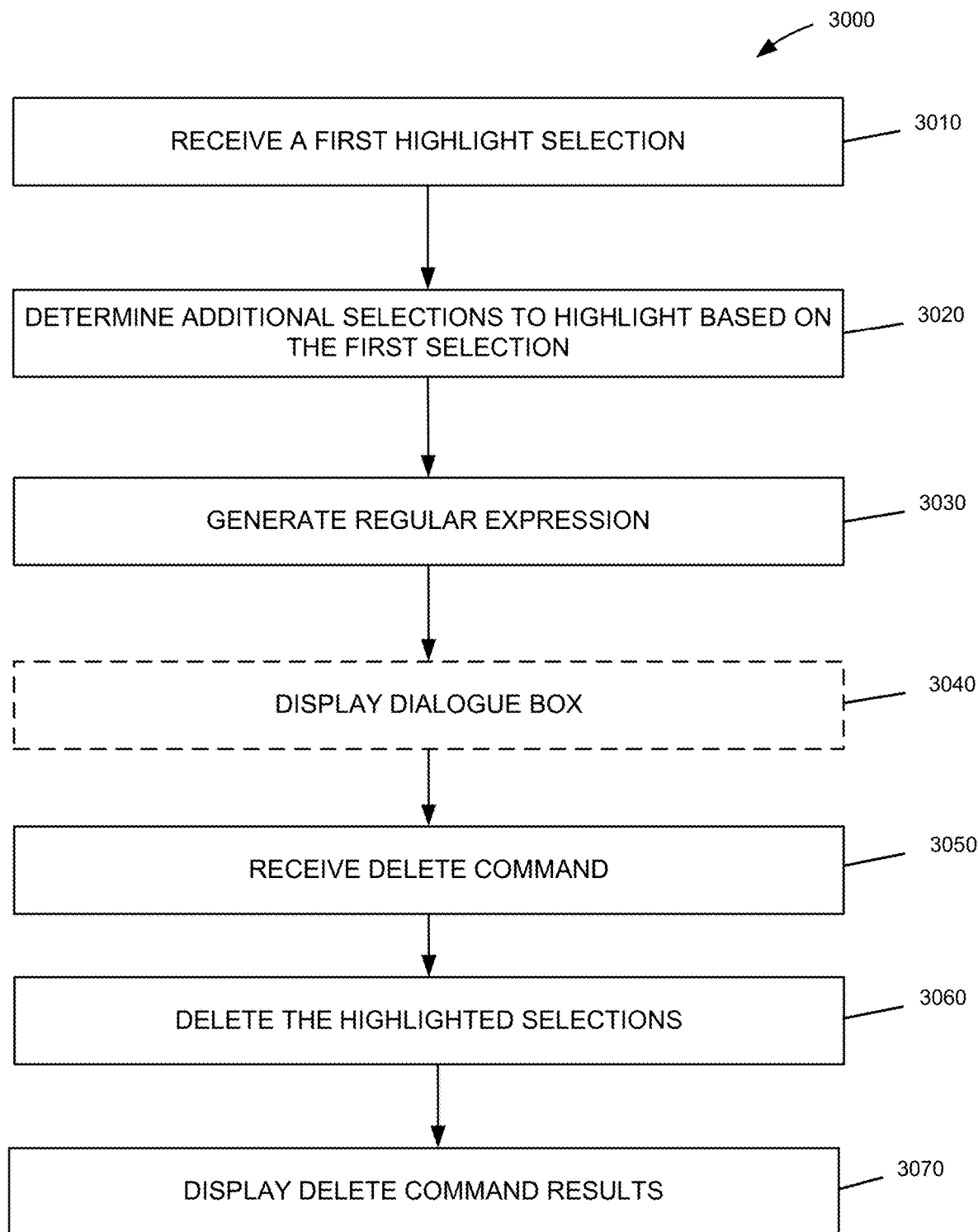
FIG. 30 illustrates a flowchart of a method for performing the delete command, in accordance with some example embodiments.

FIG. 30 illustrates a flowchart of a method 3000 for performing the delete command, in accordance with some example embodiments.

At step 3010, the user can select a portion of the address information for deletion. In the example shown in FIG. 28, the street number portion 2811 of the address information is selected for the first record 2820. The street number portion 2811 of the address information can be selected by the user highlighting the street number portion by using, for example, a mouse or a gesture on a display of the device if the user is on an interactive user interface.

At step 3020, after the user has highlighted the street number portion 2811 in the in the first record 2820, the user interface data model generator can automatically highlight all of the street number portions in the "street_address" column 2810 for each of the data records (e.g., records 2-25 as shown in FIG. 28). That is, the user interface data model generator can determine, based on the highlighting performed for the first record 2820, what highlighting should be performed for the remaining records (e.g., 2-25) in the "street_address" column 2810. Although 25 records are shown in the drawings, example embodiments can apply the delete command to more or less than 25 records. The regular expression can determine, based on an initial highlighting performed by the user, what additional highlighting should be performed.

At step 3030, a regular expression is generated. In FIG. 28, a generated regular expression 2832 is shown. The generated regular expression allows the user to easily highlight which data should be selected. In the case of the delete command, the generated regular expression allows the user to easily highlight which data should be deleted. The generated regular expressions corresponds to the highlighting that is performed by the user and by the regular expression generator. The user can modify the highlighting by changing the highlighting in the data in the "street_address" column 2810 or by changing the highlighting in the regular expression 2832. Changes made to the "street_address" column 2810 will be reflected in the regular expression 2832 that is generated. The regular expression that is generated will be updated based on the changes in highlighting that is performed by the user.

At step 3040, after the highlighting has been performed for all of the street numbers in the "street_address" column 2810, a "Regex-by-Example" dialogue box 2830 can automatically appear on the screen. Although in the example shown in FIG. 28, the "Regex-by-Example" dialogue box 2830 appears after the highlighting has been performed for all of the records (e.g., records 1-25) of the "street_address" column 2810, the "Regex-by-Example" dialogue box 2830 can also appear after an initial input (e.g. highlighting of the first record). The specified examples 2833 identifies the examples provided by the user.

At step 3050, selection of the delete command can be received. For example, the user can select the "Delete" button 2831 on the "Regex-by-Example" dialogue box 2830.

After selection of the delete command is received, at step 3060, the delete data generator 2413 of the regular expression generator 2410 can automatically delete the street numbers based on the highlighting. In the example shown in FIG. 28, all of the "street_address" records include highlighting, therefore, the delete command will be applied to each of the records shown in FIG. 28.

At step 3070, the delete results can be displayed. As shown in the user interface 2900 displayed in FIG. 29, the street numbers from the street addresses in the "street_address" column 2810 have been removed. The street numbers are deleted in place.

After the delete command is performed, the delete command that was performed (e.g., delete_column_street_address) can be added to a transform script for the data set. The transform script indicates the commands that are applied to columns of data. The transform script can be used to apply the same commands to another data set.

Therefore, an example embodiment provides a fast and efficient user interface for deleting data in a data set.

4. Obfuscate

Figure 31:
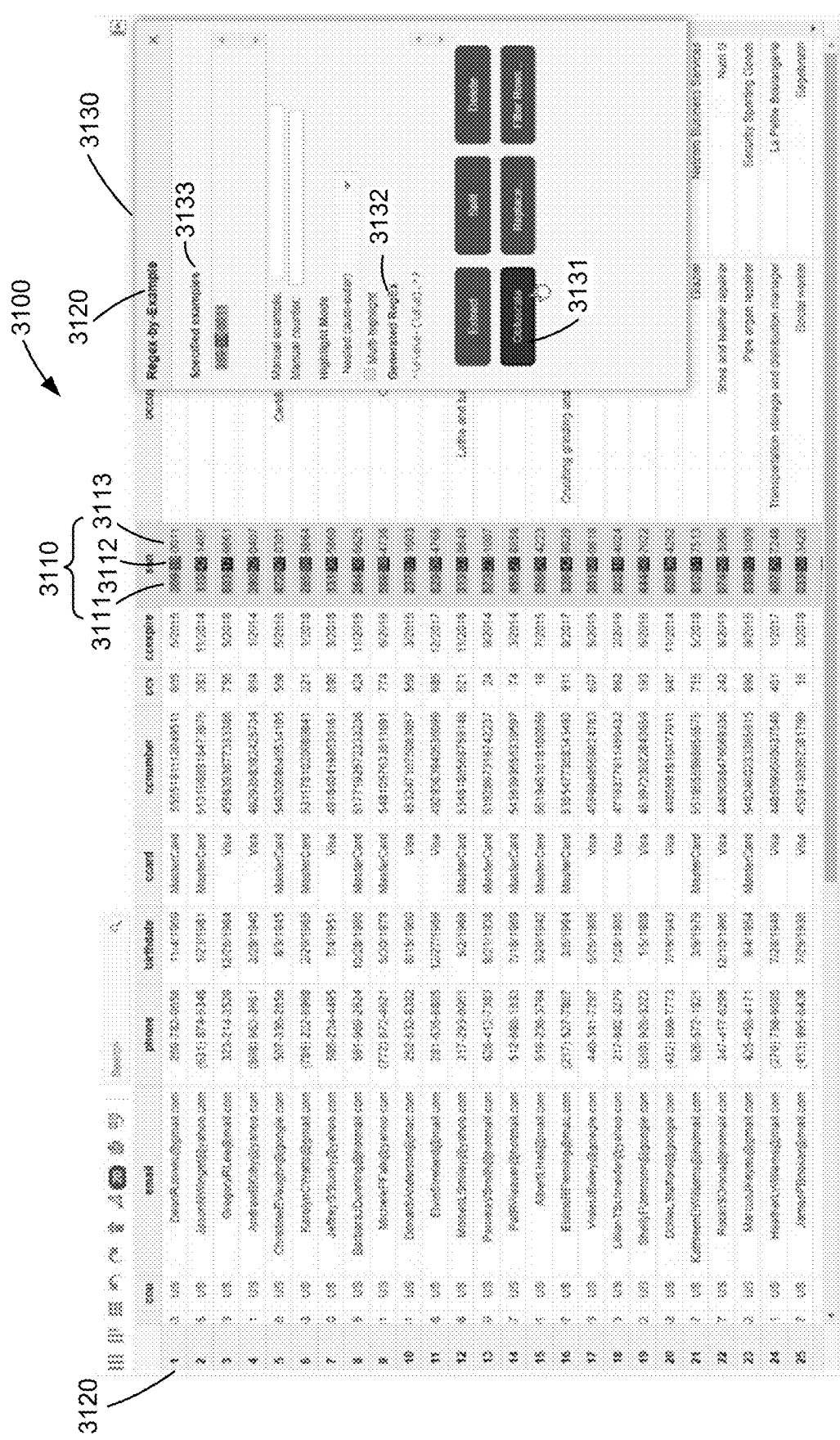
FIG. 31 illustrates a user interface for implementing an obfuscate command, in accordance with some example embodiments.
Figure 32:
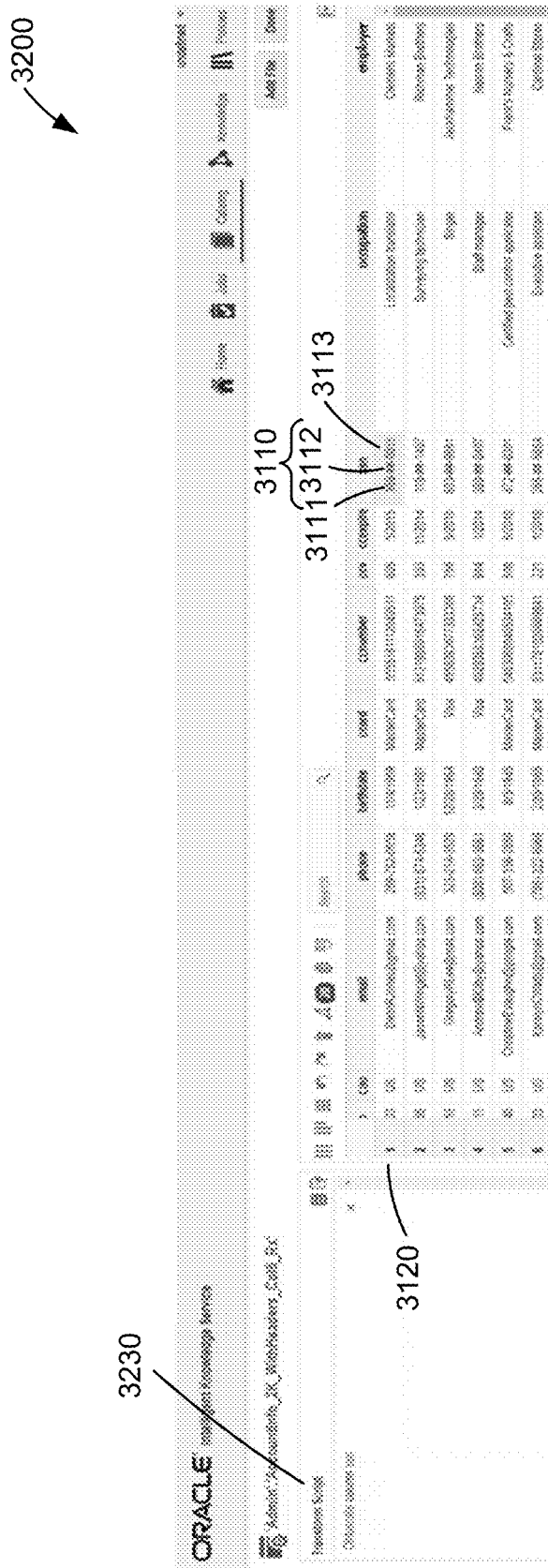
FIG. 32 illustrates a user interface displaying the results of the obfuscate command on a data set, in accordance with some example embodiments.

FIG. 31 illustrates a user interface 3100 for implementing an obfuscate command, in accordance with some example embodiments. FIG. 32 illustrates a user interface 3200 the results of the obfuscate command on a data set, in accordance with some example embodiments.

In an obfuscate command, the user may highlight (or otherwise select) text examples to generate a regular expression corresponding to a pattern, and then obfuscate (e.g., obscure rather than delete) data the matching pattern from the spreadsheet or other data view. Data can be obfuscated to prevent all of the data in a record from being visible. For example, a user may want to obfuscate information for security or privacy reasons.

In FIG. 31, the user has selected the middle two digits 3112 within the "ssn" column 3110 of the spreadsheet. The user then clicks the "Obfuscate" button to initiate the obfuscate operation. FIG. 32 displays the resulting spreadsheet with the middle two digits in the entire "ssn" column replaced with two pound signs.

As shown in FIG. 31, a data set is displayed on the user interface 3100. The data set includes a column 3110 directed to, for example, social security numbers. Although social security numbers are used to illustrate the obfuscate command, any of the data in the columns of data can be obfuscated, as desired by the user. For example, the user may want to obfuscate any kind of sensitive information, such as, credit card information or bank account information.

A social security number can be divided into a first field 3111, a second field 3112 and a third field 3113. The first field 3111 can occur before a first dash, a second field 3112 can be in between dashes, and the third field 3113 can be after the second dash of a social number. In the example shown in FIG. 31, the user would like to obfuscate the second field 3112 of the social security number (e.g., numbers between the first and second dash) so that not all of the social security number is visible. Although the second field is being obfuscated, the user can choose to obfuscate any or all of the fields in the social security number.

Figure 33:
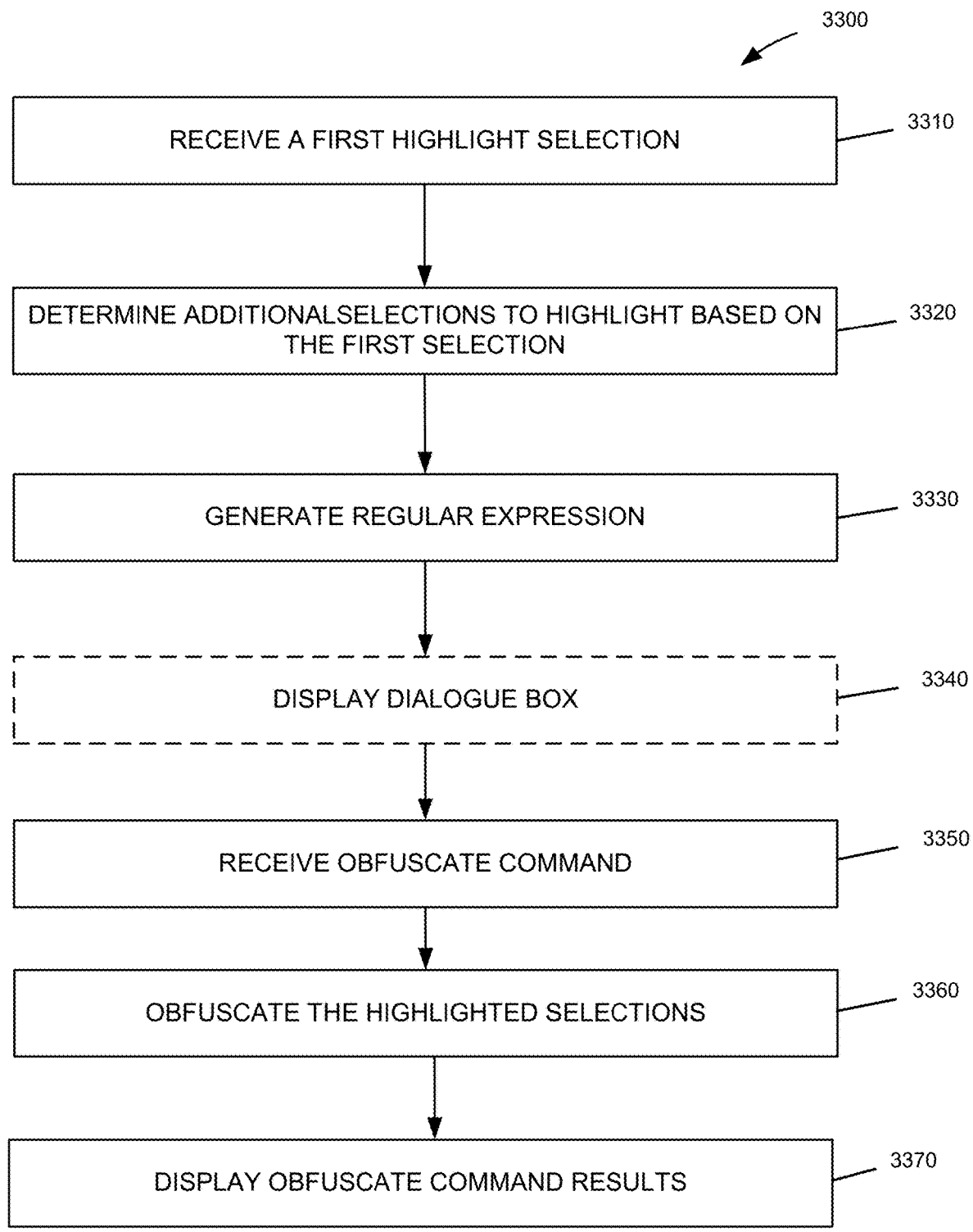
FIG. 33 illustrates a flowchart of a method for performing the obfuscate command, in accordance with some example embodiments.

FIG. 33 illustrates a flowchart of a method 3300 for performing the obfuscate command, in accordance with some example embodiments.

At step 3310, a selection of the second field 3112 within the social security number column 3110 is received. The selected field 3112 is selected for a first record 3120. The second field 3112 can be selected by using, for example, a mouse or a gesture on a display of the device if the user is on an interactive user interface. The second field that is selected by the user can be highlighted in a first color. The selection made by the user is provided as a specified example 3133 in dialogue box 3130.

At step 3320, all of the social security numbers in the social security number column can be highlighted to correspond to the highlighting performed at step 3320. That is, all of the second fields in the social security numbers in column 3110 will be highlighted in the first color and all of the first fields 3111 and third fields 3113 in the social security numbers in column 3110 will be highlighted in a second color. The fields are highlighted in different colors so that the user can easily distinguish the fields that will be modified from the fields that will not be modified.

The user interface data model generator can highlight all of the records (e.g., 2-25) to correspond to the highlighting that was performed by the user for the first record 3120. That is, the user interface data model generator can determine, based on the highlighting performed for the first record 3120, what highlighting should be performed for the remaining records (e.g., 2-25) in the social security number column. Although 25 records are shown in the drawings, example embodiments can apply the obfuscate command to more or less than 25.

At step 3030, a regular expression can be generated. In FIG. 31, a generated regular expression 3132 is shown in the regex-by-example dialogue box 3130. The generated regular expressions allows the user to easily highlight which data should be obfuscated. The user can modify the highlighting by changing the highlighting in the data in the "ssn" column 3110 or by changing the highlighting in the regular expression 3132 that was generated. Changes made to the "ssn" column 3110 will be reflected in the regular expression 3132 that is generated. That is, the regular expression that is generated will be updated based on the changes in highlighting to the data set that is performed by the user.

At step 3340, after the highlighting has been performed for the social security numbers, a "Regex-by-Example" dialogue box 3130 can automatically appear on the screen. Although in the example shown in FIG. 31, the "Regex-by-Example" dialogue box 3130 appears after the highlighting has been performed for all of the records (e.g., records 1-25) of the social security number column 3110, the "Regex-by-Example" dialogue box 3130 can also appear after an initial input (e.g. highlighting of the first record). The "Regex-by-Example" dialogue box 3130 includes the specified examples 3133 that are input by the user. Further, the "Regex-by-Example" dialogue box 3130 includes the generated regular expression 3132.

At step 3350, selection of the "Obfuscate" command is received. For example, the user can select the "Obfuscate" button 3131 on the "Regex-by-Example" dialogue box 3130. As shown in FIG. 31, the user can select the obfuscate button 3131. [0231] At step 3360, after the obfuscate command is received, the obfuscate generator 2414 of the regular expression generation server 2400 can automatically obfuscate all of the second fields of the social security numbers in the "ssn" column 3110.

At step 3370, the obfuscate results can be displayed. FIG. 32 illustrates a user interface 3200 displaying the results of the obfuscate command on a data set, in accordance with some example embodiments. As shown in FIG. 32, the second field 3112, which was selected by the user, is replaced with "##" in place of the highlighted fields to be obfuscated. Therefore, all of the second fields 3112 of the social security numbers in the social security column 3110 have been replaced with "##." That is, the second field 3112 for all of the social security numbers have been obfuscated.

After the obfuscate command is performed, the obfuscate command that was performed (e.g., obfuscate_column_ssn) can be added to a transform script 3230 for the data set. The transform script indicates the commands that are applied to columns of data. The transform script can be used to apply the same commands to another data set.

Therefore, an example embodiment provides a fast and efficient user interface for obfuscating data in a data set and privacy of user information can be maintained.

5. Replace

Figure 34:
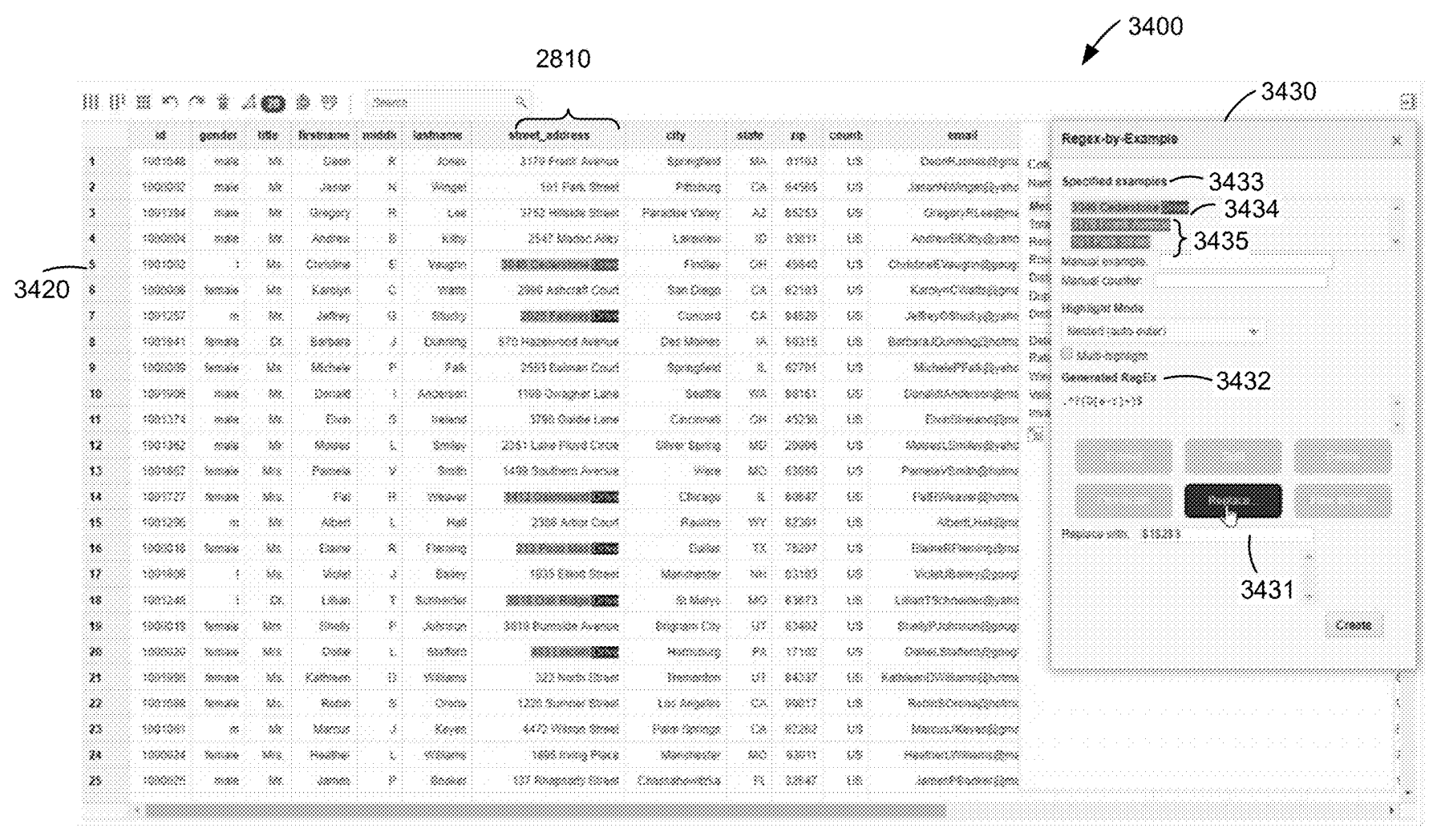
Figure 35:
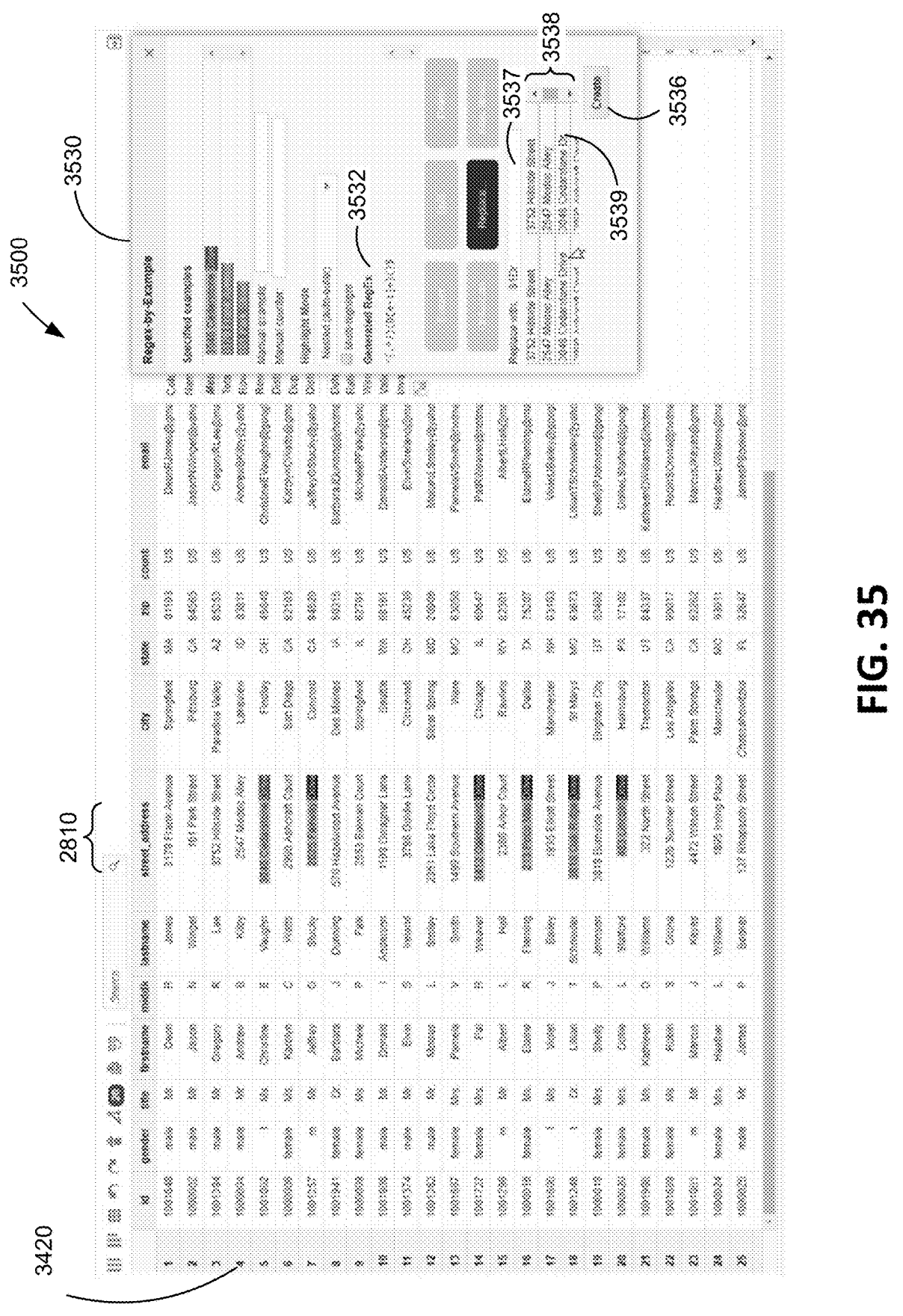

FIG. 34 illustrates a user interface 3400 for implementing a replace command and FIG. 35 illustrates a user interface 3500 for implementing a replace command, in accordance with some example embodiments. In a replace command, the user may highlight (or otherwise select) text examples to generate a regular expression corresponding to a pattern, and then replace the text matching the pattern with other chosen text.

The replace command involves dynamically displaying a two-column table within the dialog that shows before and after examples. To utilize the contents of the capture group in the replace expression, the user may use $1 which is the standard regex replacement syntax from the Java and Javascript regex APIs.

Figure 37:
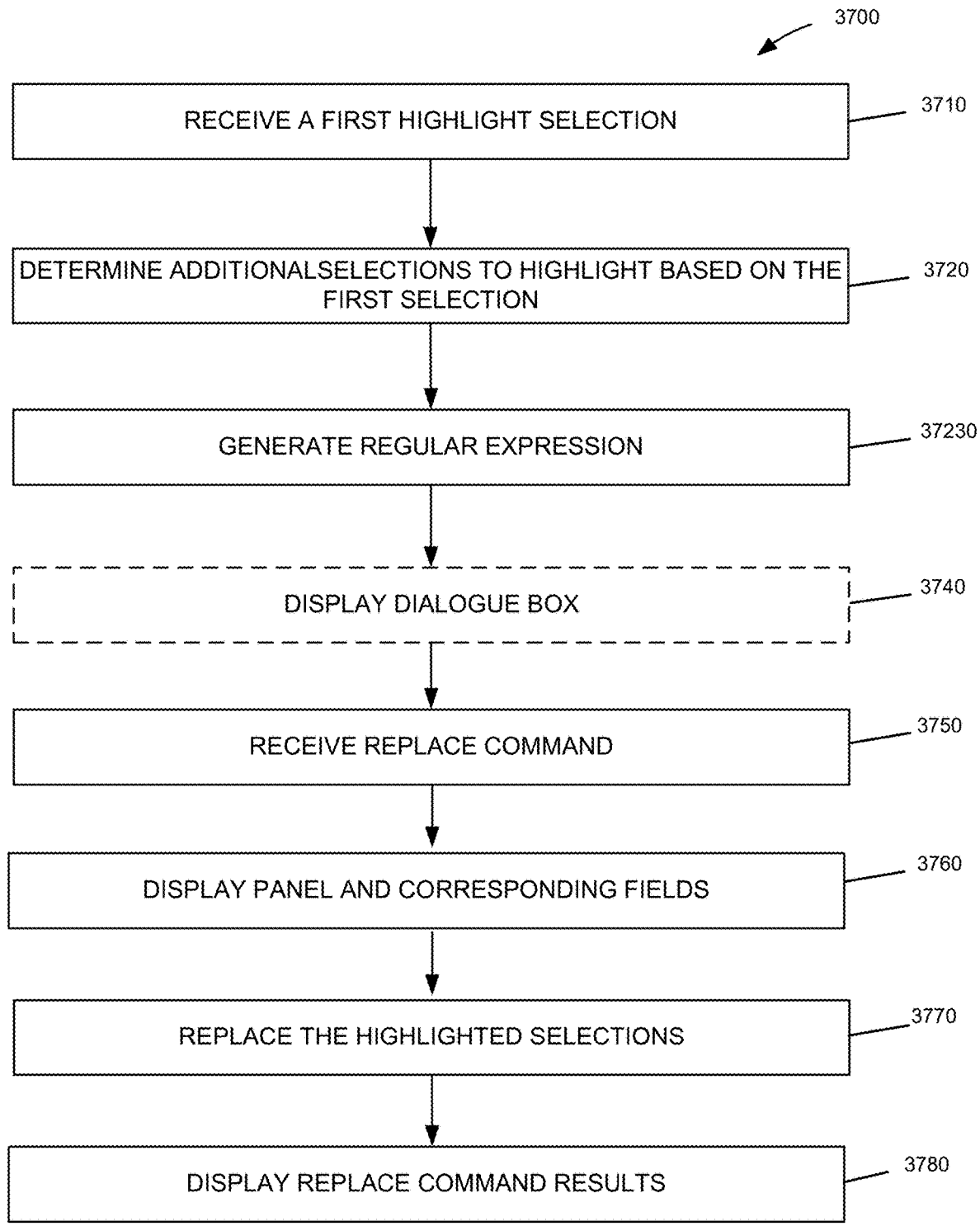
FIG. 37 illustrates a flowchart of a method for performing the replace command, in accordance with some example embodiments.

FIG. 37 illustrates a flowchart of a method 3700 for performing the replace command, in accordance with some example embodiments.

At step 3710, the user can select a field within the "street_address" column 2810 that the user would like to replace with other data. In the example shown in FIG. 34, the user would like to replace "Drive" in a street address with "Dr." As shown in FIG. 34, the user can select "Drive" from the fifth record 3420 of the dataset. The data to be replaced can be selected by the user highlighting the data to be replaced by using, for example, a mouse or a gesture on a display of the device if the user is on an interactive user interface.

At step 3720, after the user has highlighted the data to be replaced (e.g., "Drive") in the fifth record, the user interface data model generator can automatically highlight all of the fields in the remaining records that correspond to the highlighting that was performed in the fifth record 3420. The user interface data model generator can automatically highlight street addresses that include "Drive." As shown in FIG. 34, records 7, 13, 16, 18, and 20 include "Drive" and therefore, "Drive" is automatically highlighted by the user interface data model generator in records 7, 13, 16, 18, and 20. "Drive" can be highlighted in a first color in records 5, 7, 13, 16, 18, and 20. The remainder of the street address that includes "Drive" can be highlighted in a second color that is different from the first color. Therefore, the part to be replaced can be easily identified.

At step 3730, a regular expression 3432 can be generated. As shown in FIG. 35, a three-part generated regular expression 3532 is shown. The three-part generated regular expression allows the user to easily replace the "Drive" portion of the data, the portion before the "Drive," or the portion after the "Drive." In this example, the user replaces the "Drive" portion of the data with "Dr" and the user can immediately see the results in the preview spreadsheet of the pop-up "Regex-by-Example" dialog box 3530.

In FIG. 34, the user has selected a sufficient number of examples 3433 (positive and negative) from the "street_address" column of the spreadsheet to generate a regular expression corresponding to the addresses ending in "Drive." Address 3434 is a positive example and addresses 3435 are negative examples.

At step 3740, after the highlighting has been performed for all of the records, a "Regex-by-Example" dialog box 3430 can automatically appear on the screen. Although in the example shown in FIG. 34, the "Regex-by-Example" dialogue box 3430 appears after the highlighting has been performed for all of the records that contain the data to be replaced, the "Regex-by-Example" dialogue box 3430 can also appear after an initial input (e.g. highlighting of "Drive in the fifth record). The "Regex-by-Example" dialogue box 3430 can include the specified examples 3433 and the generated regular expression 3432. Address 3434 is a positive example and addresses 3435 are negative examples.

At step 3750, selection of the "replace" command is received. For example, the user can select the "replace" button 3431 on the "Regex-by-Example" dialogue box 3430 to initiate the replace command.

At step 3760, a panel 3538 and a "replace with" field 3537 can be displayed to assist the user in determining which information is being replaced. As shown in FIG. 35, within the panel 3538 the user can see the initial address and how the address will appear when replaced. For example, the word "Drive" in an address now appears as "Dr." in an address as shown by element 3539. The panel 3538 can assist the user in providing a preview regarding how the data would appear if a replace command was applied.

As shown in FIG. 35, the regex 3532 is converted into a triple capture group. The generated RegEx is "^(.*?)(D[a-z]+)( )$." Therefore, a user can easily see what data appears before the highlight (^(.*?)), on the highlight ((D[a-z]+)), and after the highlight (( )). In the example shown in FIG. 35, no data appears after the highlight (( )). The data on the highlight is the data that is selected by the user. In this example, the data on the highlight is "Drive" which is the data that the user selected for replacement.

The user can also identify what the selected term is to be replaced with. The "replace with" field 3537 identifies the term (e.g., "Dr.") that the selected term (e.g., "Drive") is to be replaced with. The user can modify the replacement term in the "replace with" field 3537. The replacement term selected by the user in the "replace with" field 3537 will be applied to the highlighted records. If the user agrees with the replacement, the user can select the create button 3536 and the replace data generator 2415 can perform the replacement.

As shown above, the replace command may also involve dynamically displaying a two-column table within the dialog that shows before and after examples (e.g., the preview spreadsheet of the pop-up "Regex-by-Example" dialog box). To utilize the contents of the capture group in the replace expression, the user may use $1 which is the standard regex replacement syntax from the Java and Javascript regex APIs. Additionally, if the user selects the Replace command, and if the user is in the mode that generates capture groups (namely, nested-auto-outer), then the generated regex displayed in the dialog gains two additional capture groups for a total of three: before the highlight, on the highlight, and after the highlight. The user may then refer to these within the replace expression as $1, $2, and $3. Further, if there are no capture groups, then the system may wrap the entire generated regex into a capture group, so that the user can reference the original text using $1.

As disclosed in an example embodiment, highlight modes can include nested-auto, nested-manual, and single-level. Nested-auto can also be known as nested (auto-outer). Nested-manual can also be known as nested (full-control).

At step 3770, the replacement can be performed. After clicking the "Create" button 3536 to confirm the change, the data is replaced.

Figure 36:
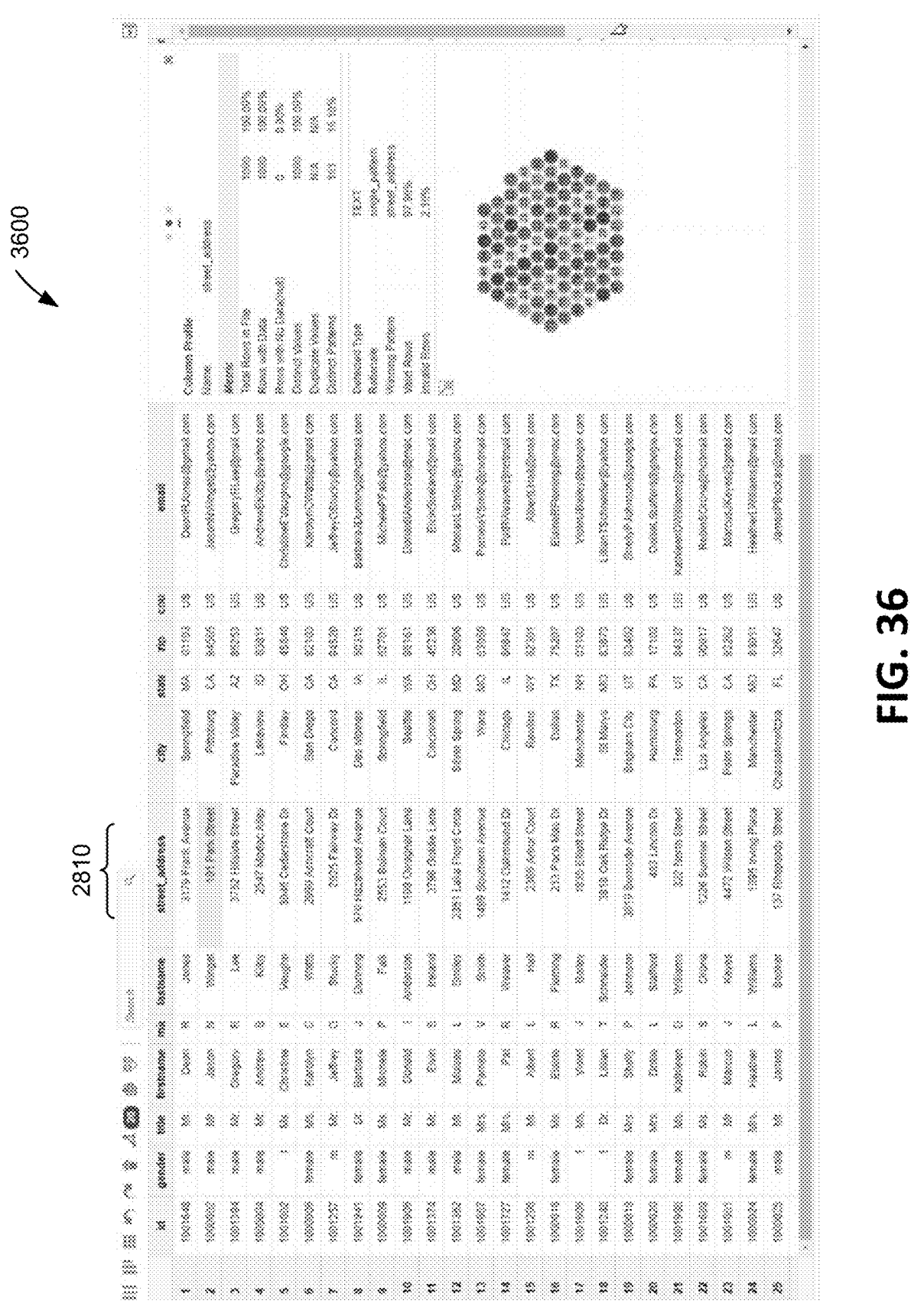

At step 3780, the replace results can be displayed. FIG. 36 illustrates a user interface 3600 displaying the results of the replace command on a data set, in accordance with some example embodiments. As shown in the user interface 3600 displayed in FIG. 36, the records containing "Drive" are now replaced with "Dr." Therefore, the records that contain "Drive" in the "street_address" column 2810 are replaced with "Dr."

After the replace command is performed, the replace command that was performed (e.g., replace_column_street_address) can be added to a transform script for the data set. The transform script indicates the commands that are applied to columns of data. The transform script can be used to apply the same commands to another data set.

Therefore, an example embodiment provides a fast and efficient user interface for replacing data in a data set.

6. Filter Rows

Figure 38:
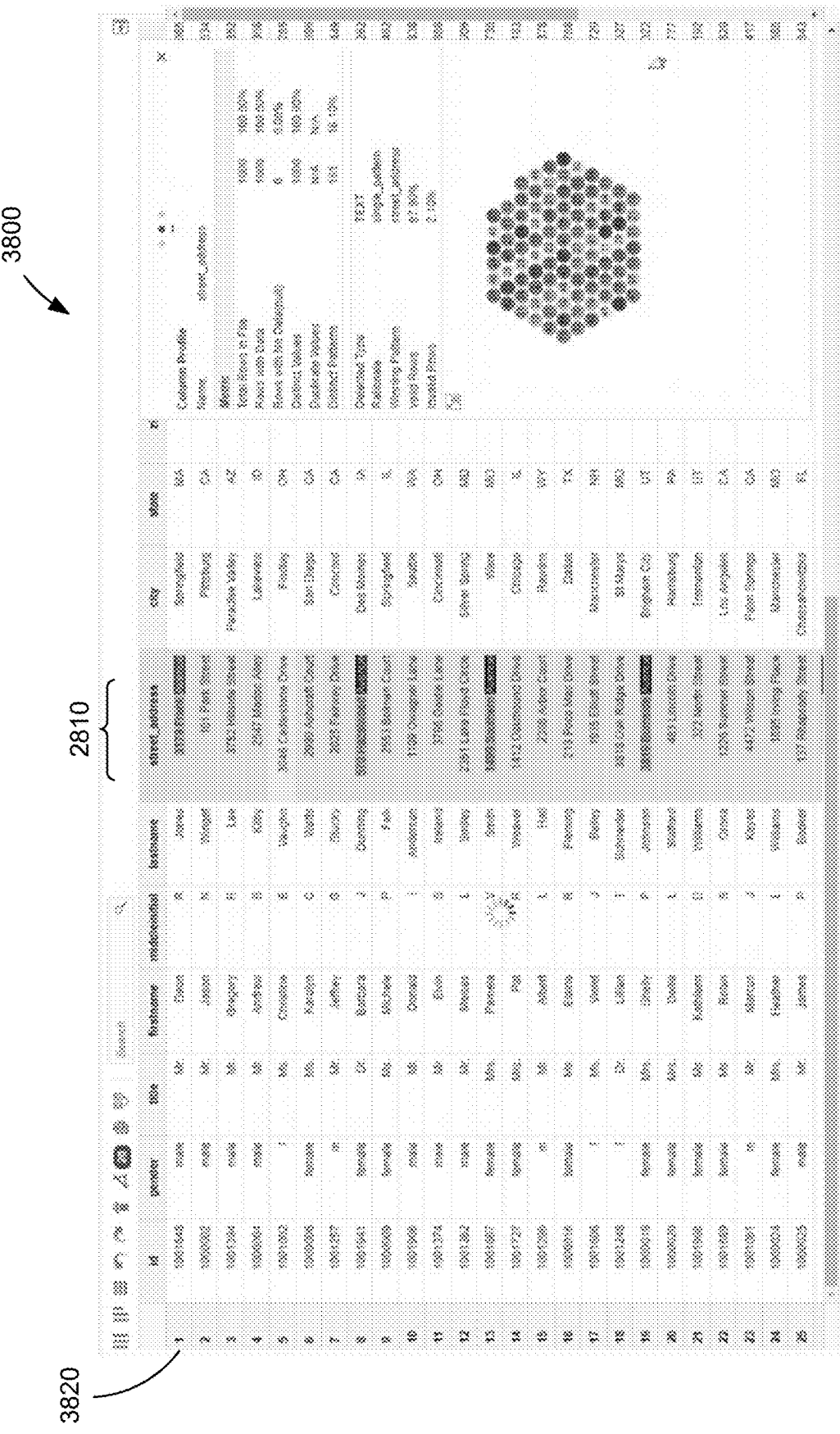
FIGS. 38 and 39 illustrate a user interface for implementing a filter rows command, in accordance with some example embodiments.
Figure 39:
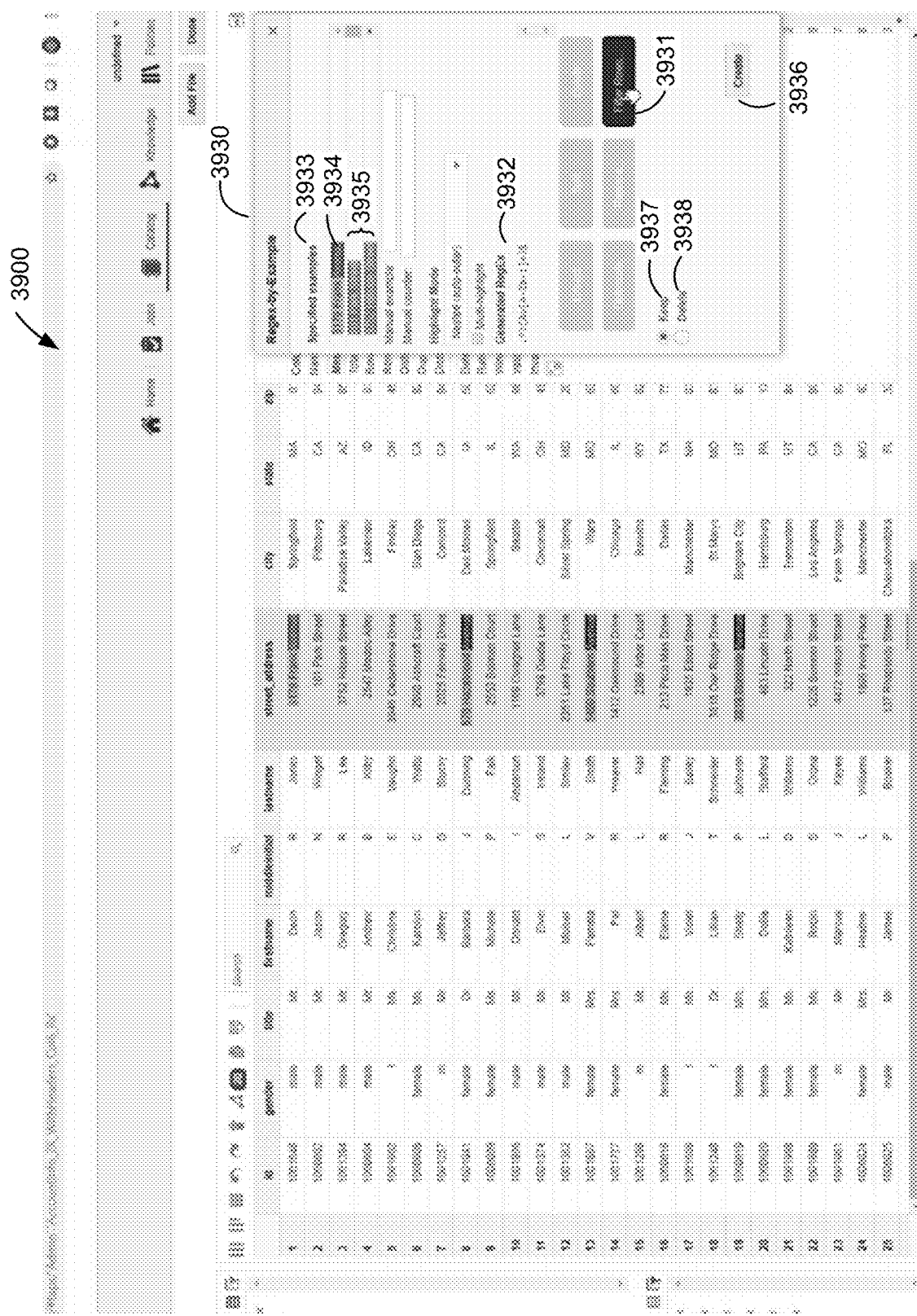
Figure 40:
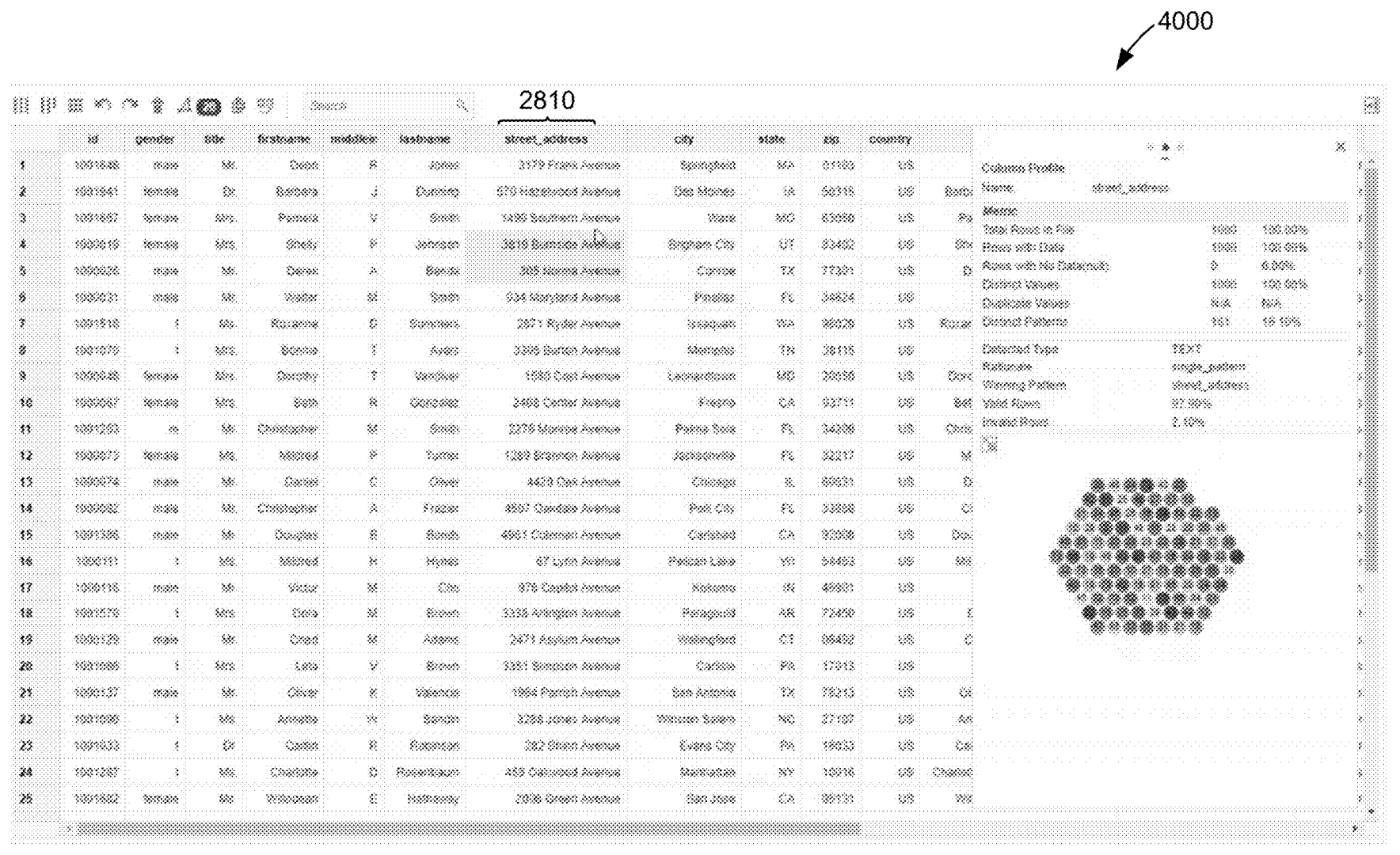

FIGS. 38 and 39 illustrate a user interface 3800 and 3900 for implementing a filter rows command, in accordance with some example embodiments. FIG. 40 illustrates a user interface 4000 displaying the results of the filter rows command on a data set, in accordance with some example embodiments.

In a filter operation, the user may highlight (or otherwise select) text examples to generate a regular expression corresponding to a pattern, and then filter the data to include (or exclude) the data matching the pattern. An example of a "Filter Rows" operation is shown in FIGS. 38, 39, 40 and 41.

Figure 41:
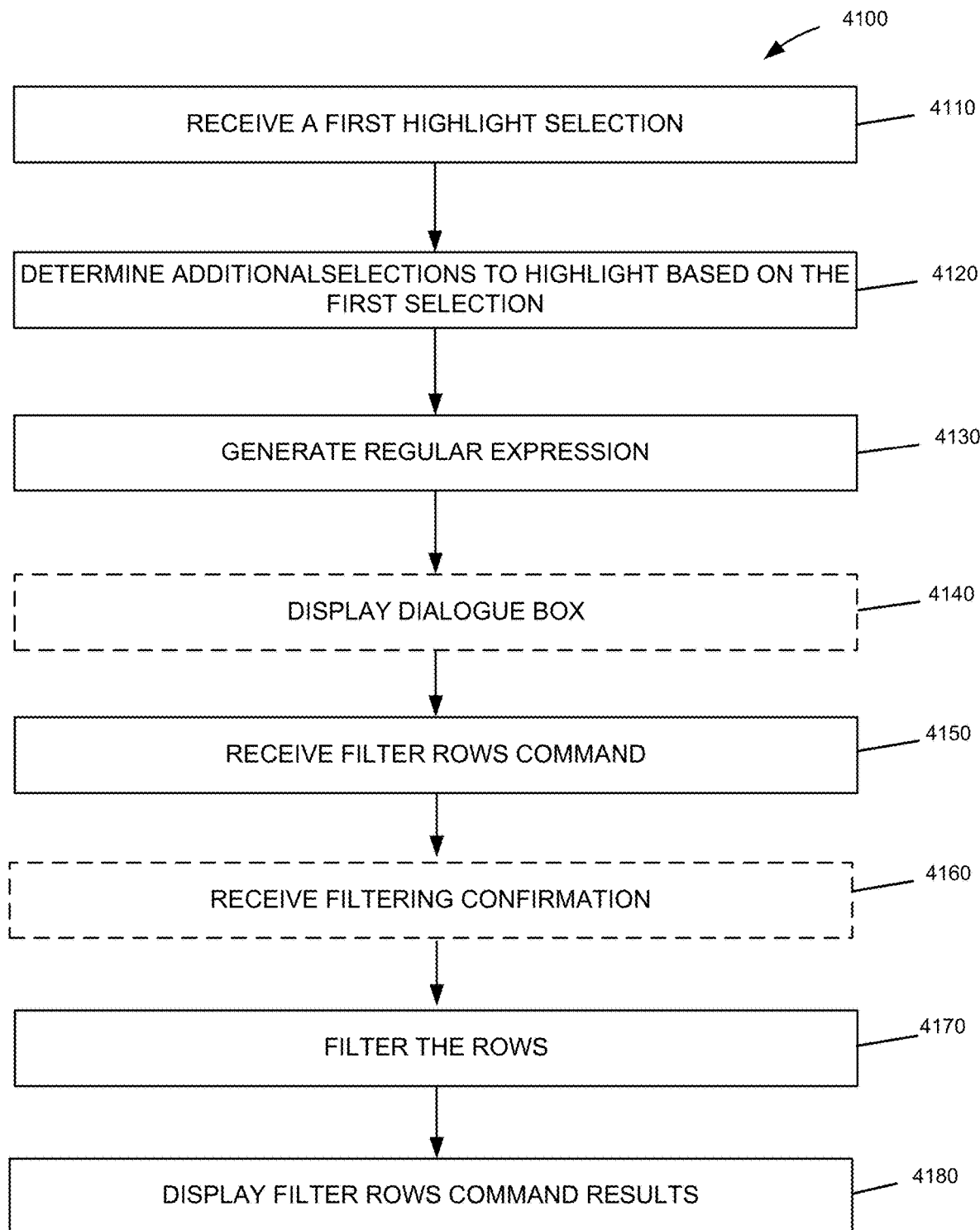
FIG. 41 illustrates a flowchart of a method for performing the filter rows command, in accordance with some example embodiments.

FIG. 41 illustrates a flowchart of a method 4100 for performing the filter rows command, in accordance with some example embodiments. In the example shown in FIG.

41, the user would like to filter the records in the data set so as to identify records that have "Avenue" in the street address.

At step 4110, the user can select the data which will be used to filter the records. In the example shown in FIG. 38, the user has selected "Avenue" from the "street_address" column 2810. The data can be selected by the user highlighting the data which will be used for filtering. For example, data can be selected using a mouse or via a gesture on a display of the device if the user is on an interactive user interface.

At step 4120, after the user has highlighted the data to be used for filtering, the user interface data model generator can automatically highlight the corresponding data in the other records. For example, the user interface data model generator can highlight the term "Avenue" in records 8, 13 and 19. That is, the user interface data model generator can determine, based on the highlighting performed for the first record 3820, what highlighting should be performed for the remaining records (e.g., 2-25) for the "street_address" column 2810.

At step 4130, a regular expression can be generated based on the highlighted selected by the user. FIG. 39 illustrates a dialogue box 3930 include the generated regular expression.

In FIG. 39, a generated regular expression 3932 is shown, allowing the user to easily identify the data to be used as a basis for filtering. In FIG. 39, three examples were highlighted by the user and are displayed in the specified examples 3933. Therefore, three addresses appear in the specified examples 3933. The user has selected a sufficient number of examples 3933 (positive 3934 and negative 3935) from the "street_address" column of the spreadsheet to generate a regular expression corresponding to the addresses ending in "Avenue." Although three example are shown, the user may use one or more examples based on the results desired by the user.

The positive and negative examples can be displayed in different colors or in any manner in which positive and negative examples are displayed differently in the dialogue box 3930 and within the data set displayed on the user interface. In the specified examples 3933 shown in FIG. 39, two addresses containing "street" are selected by the user from the "street_address" column 2810 as negative examples. That is, they are examples of data that the user does not want to appear in the records. However, if additional examples are provided by the user, a more accurate regex expression can be generated that will be applied to the filtering.

The user can modify the highlighting by changing the highlighting in the data in the "street_address column" 2810 or by changing the highlighting in the regular expression 3932. Changes made to the "street_address column" 2810 will be reflected in the regular expression 3932 that is generated. In other examples, the user may use similar techniques to define a regular expression corresponding to patterns that should be filtered out (rather than kept in).

At step 4140, after the highlighting has been performed, a "Regex-by-Example" dialogue box 3930 can automatically appear on the screen. Although in the example shown in FIG. 39, the "Regex-by-Example" dialogue box 3930 appears after the highlighting has been performed for all of the records (e.g., records 1-25) of the "street_address" column 2810, the "Regex-by-Example" dialogue box 3930 can also appear after an initial input (e.g. highlighting of the first record).

At step 4150, selection of the "Filter Rows" command is received. For example, the user can select the "Filter Rows" button 3931 on the "Regex-by-Example" dialogue box 3930. The user may click the "Filter Rows" 3931 button within the user interface to initiate a filter option which filters out all other types of addresses and leaves only the "Avenue" addresses, as shown in FIG. 38.

At step 4160, confirmation regarding the filtering rows command is received. Specifically, a selection is received whether to keep (keep button 3937) the records that are identified by the examples 3933 or to delete (delete button 3938) the records that are identified by the examples 3933. After selecting the "keep" button 3934 or the "delete" button 3935, the user can then select create button 3936 to initiate the filtering.

At step 4170, the filter rows data generator 2416 of the regular expression generator 2410 can automatically filter the records according to the filtering criteria input by the user.

At step 4180, the filter rows results can be displayed. As shown in the user interface 4000 displayed in FIG. 40, the records have been filtered so that only records having "Avenue" in the address are shown. In the example, the spreadsheet includes more than 25 records. For purposes of illustration, the first 25 records having "Avenue" in the "street_address" are shown.

After the filter rows command is performed, the filter rows command that was performed (e.g., filterrow_column_street_address) can be added to a transform script for the data set. The transform script indicates the commands that are applied to columns of data. The transform script can be used to apply the same commands to another data set.

Therefore, an example embodiment provides a fast and efficient user interface for filtering rows of data in a data set.

VI. CONTEXT FOR NEGATIVE EXAMPLES

In an example embodiment, for negative examples in nested-manual, a search can be performed for context that corresponds to positive examples.

If the user interface is in the nested-manual mode, an example may be received that has an outer highlight of "Windows NT 6.1" and an inner highlight of "6.1". In response to the initial example that is provided, e.g., by a user, the UI might highlight "Windows NT 6.0." The UI, via the regular expression generator, may highlight "Windows NT 6.0" since it has determined that "Windows NT 6.0" is a match to the "Windows NT 6.1" that was initially provided as an example. The user may then select "Windows NT 6.0" to indicate that "Windows NT 6.0" is not a desired match to "Windows NT 6.1." That is, the user may select on "Windows NT 6.0" to provide a negative example. If the user clicks on "Windows NT 6.0" to create a negative example, the UI might only send include "6.0" as the negative example. Therefore, in accordance with an example embodiment, the UI can search for the match "Windows NT" context prior to running LCS. An example embodiment will search for context based on the negative example that is provided.

Figure 50:
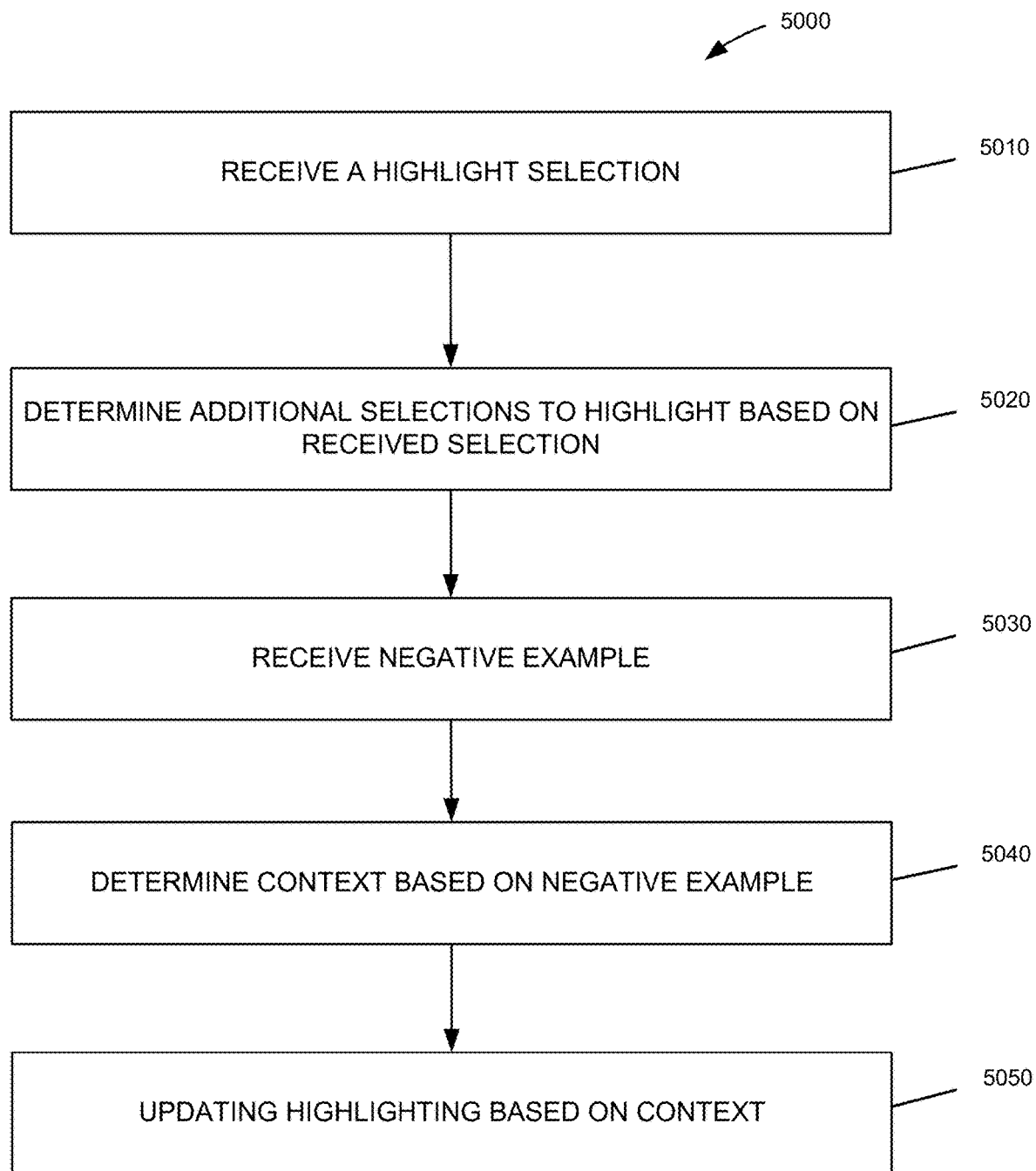
FIG. 50 illustrates a flowchart of a method for providing a negative example, in accordance with some example embodiments.

FIG. 50 illustrates a flowchart of a method 5000 for providing a negative example, in accordance with some example embodiments.

At step S010, an initial selection can be received. A regular expression is generated based on the initial selection.

For example, a user can select an outer highlight of "Windows NT 6.1" and an inner highlight of "6.1" of the "Windows NT 6.1." The outer highlight and the inner highlight can be made by highlighting the data. For the outer highlight, the user can highlight "Windows NT 6.1" and for the inner highlight, the user can highlight "6.1" of the already highlighted "Windows NT 6.1." The outer highlight corresponds to a name of an application and the inner highlight corresponds to the version number. The outer highlight can appear in a different color from the inner highlight. The highlighting can be performed by using, for example, a mouse or a gesture on a display of the device if the user is on an interactive user interface.

At step S020, after the user has highlighted the desired data fragment (e.g., inner and outer highlight), the user interface data model generator can automatically highlight corresponding data within the same record or remaining records. For example, the user interface data model generator can highlight all instances of "6.1" in the records. However, the regular expression generator may also highlight all instances of "Windows NT 6.0" from the records in the dataset. Therefore, to ensure greater accuracy in the results, the user can provide negative examples.

At step S030, the user can provide negative examples. The user may provide negative examples since the user does not want all of the application and version numbers that were automatically highlighted by the UI. For example, the user may select "Windows NT 6.0" to provide a negative example. The UI could then identify all records containing a version number of "6.0." However, this could result in identifying applications other than "Windows NT" that contains a "6.0" version number.

At step S040, the UI will determine context from the negative example. Instead of highlighting all version numbers that include a version number of "6.0," the UI will determine context from the example that was provided by the user. That is, the UI will not only identify the version number "6.0" from the data records, but will also identity the application name "Windows NT" from the records when identifying records containing a negative example. Therefore, the UI will search for "Windows NT 6.0" when identifying records containing the negative example, instead of merely searching for records containing "6.0" when identifying records containing the negative example.

Determining context from a negative example is explained in greater detail below with respect to FIG. 51.

At step S050, the highlighting on the dataset is updated according to the identified context. The UI will highlight terms including "Windows NT 6.0" and not only "6.0," thereby making the negative examples more accurate.

The regular expressions that are generated can be updated based on the context identified from the negative example.

Therefore, an example embodiment provides are more precise method of providing negative examples. Context is determined before running the LCS algorithm to determine the longest common subsequence that is shared by different sets of one or more regular expression codes. By determining context from the examples that are provided, a more accurate regular expression can be generated.

Figure 51:
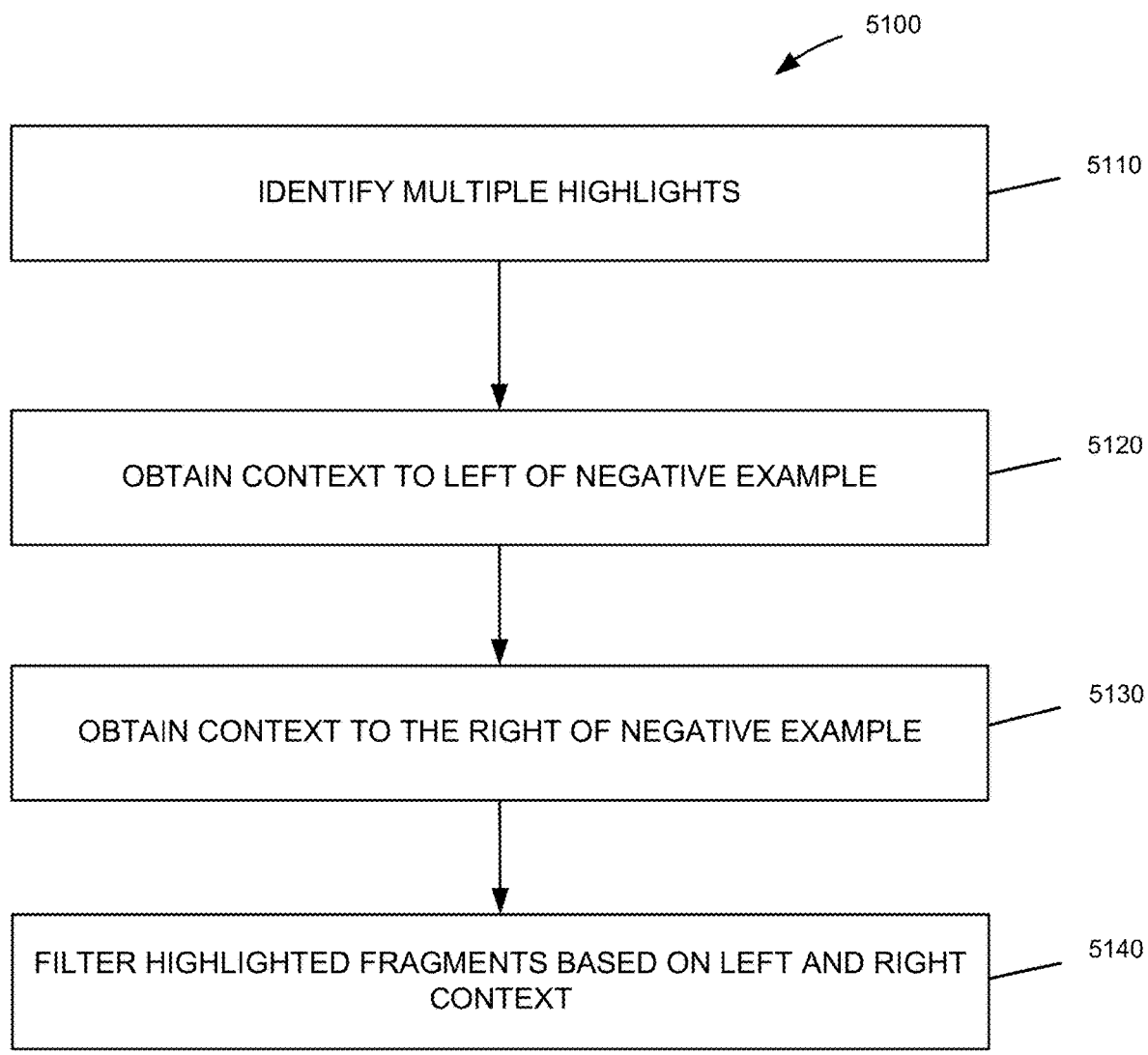
FIG. 51 illustrates a flowchart of a method for determining context from a negative example, in accordance with some example embodiments.

FIG. 51 illustrates a flowchart of a method 5100 for determining context from a negative example, in accordance with some example embodiments. FIG. 51 explains step S040 of FIG. 50 in more detail.

At step S110, after the negative example has been provided, it will be determined whether there are multiple highlights and whether those multiple highlights are nested (inner plus outer highlight). As shown in FIG. 51, the context of negative examples is not determined unless a negative example was provided (e.g., step S030 of FIG. 50).

At step S120, context is obtained from data to the left of the negative example.

Specifically, context is obtained from data to the left of where the negative highlight is embedded. The embedded location of the negative highlight can be determined prior to obtaining the context. Code for performing this step can include val eLookBehindStart=r.s.slice (0, r.highlightSpans.min).foldRight(es.slice(0, highlightSpanRange.start).reverse)((sElem,esLookBehind)=>esLookBehind.dropWhile(.cc==sElem.cc)).length.

In an example embodiment, the farthest left span is used. eLookBehindStart will get the span number of the furthest-left span from walking left (from the left edge of the negative highlight).

Step S120 can be an iterative process. For example, filtering can be performed for each span to the left of where the negative highlight is embedded. Highlighting of the fragments of the dataset can be removed for each span of the fragment that does not match the span of the negative example. In every iteration, the list of spans under consideration will be shortened.

At step S130, context is obtained from data to the right of the negative example. Specifically, context is obtained from data to the right of where the negative highlight is embedded. Code for this step can include val eLookAheadEnd=r.s.slice(r.highlightSpans.max+1, r.s.length).foldLeft(es.slice(highlightSpanRange.end, es.length)) ((esLookAhead,sElem)=>esLookAhead.dropWhile (_.cc==sElem.cc)).length In an example embodiment, the farthest right span is used. eLookAheadEnd will get the span number of the furthest-right span from walking right (from the right edge of the negative highlight).

Step S130 can be an iterative process. For example, filtering can be performed for each span of the fragment to the right of where the negative highlight is embedded. Highlighting of the fragments of the dataset can be removed for each fragment that does not match the span of the negative example. In every iteration, the list of spans under consideration will be shortened.

At step S140, filtering of fragments is performed. Highlighted fragments that do not correspond to the context to the left and to the right of the negative example (e.g., the context that is identified at step S120 and S130) are removed.

Although context is used to the left and to the right of a negative example, only the left or the right context may be used to identify context for negative examples, if for example, there is only left context data or only right context data. Further, although the left context is identified before the right context in the example described in FIG. 51, the right context can be identified before the left context. Further, although the above example is described with determining context for a negative example, context can also be determined for a positive example.

Example code for searching for context that corresponds to negative examples in nested-manual mode can include some or all of the following code:

```
val numberedExamplesWithContextualizedNegative =
    if (mustUseLookAheadAndBehind && examplesScala.exists(_.highlights.exists(h =>
!h.isPositive && h.outer == h.inner))) {
        val r = shortestRegEx(flaggedPosOnly.filter(_.e.isPositive),
```

```
inductParameters.isStartAligned, inductParameters.isEndAligned, inductParameters.useContext,
mustUseLookAheadAndBehind, true)
        numberedExamples.map(e => if (!r.r.isSuccess || e.isPositive) e else {
            val es = toSpans(e.s)
            val highlightSpanRange = highlightSpanRangeForExample(es, e.highlight)
            val eLookBehindStart = r.s.slice(0, r.highlightSpans.min).foldRight(es.slice(0,
highlightSpanRange.start).reverse)((sElem,esLookBehind) => esLookBehind.dropWhile(_.cc ==
sElem.cc)).length
            val eLookAheadEnd = r.s.slice(r.highlightSpans.max+1,
r.s.length).foldLeft(es.slice(highlightSpanRange.end, es.length))((esLookAhead,sElem) =>
esLookAhead.dropWhile(_.cc == sElem.cc)).length
            val lookBehindLength = (eLookBehindStart to highlightSpanRange.start-1).filter(_ >=
0).map(es(_).orig.head.s.length).sum
            val lookAheadLength = (highlightSpanRange.end+1 to eLookAheadEnd).filter(_ <
es.length).map(es(_).orig.head.s.length).sum
            val start = e.highlight.start - lookBehindLength
            val end = e.highlight.end + lookAheadLength
            NumberedExample(e.id, e.s.substring(start, end+1), e.isPositive, start to end)
        })
    }
    else
        numberedExamples
```

VII. REGULAR EXPRESSION GENERATION USING LONGEST COMMON SUBSEQUENCE ALGORITHM ON SPANS

Additional aspects described herein relate to the generation of regular expressions, based on the LCS algorithm from one or more data input character sequences, but wherein the regular expression generator 110 also may handle characters that are present in only some of the examples. To handle characters that are present in only some input examples, spans may be defined in which both a minimum and maximum number of occurrences of a regular expression code are tracked. For example, for the character sequence inputs of "9 pm" and "9 pm" an optional space is present between the number and the "pm" text. In such cases, when a certain span (e.g., the single space between "9" and "pm") might not be present at all of the given input examples, the minimum number of occurrences may be set to zero. These minimum and maximum numbers can then be mapped to the regular expression multiplicity syntax. A longest common subsequence (LCS) algorithm may be run on the spans of characters derived from the input examples, including "optional" spans (e.g., minimum length of zero) which do not appear in every input example. As discussed below, consecutive spans may be merged during the execution of the LCS algorithm. In such cases, when extra optional spans that are being carried along end up appearing consecutively, the LCS algorithm may be run recursively on those optional spans as well. That is, although the running of the LCS algorithm is by its nature recursive, in these cases the entire LCS algorithm may be run recursively (e.g., recursively running the recursive LCS algorithm). Among other technical advantages, this may allow for a shorter, cleaner, and more readable regular expression generation. For instance, (am|am) (i.e., with optional space before the am) might be generated without recursively running the LCS algorithm, whereas recursively running the LCS algorithm may result in the regular expression generated as (?am), which is shorter and cleaner.

Figure 18:
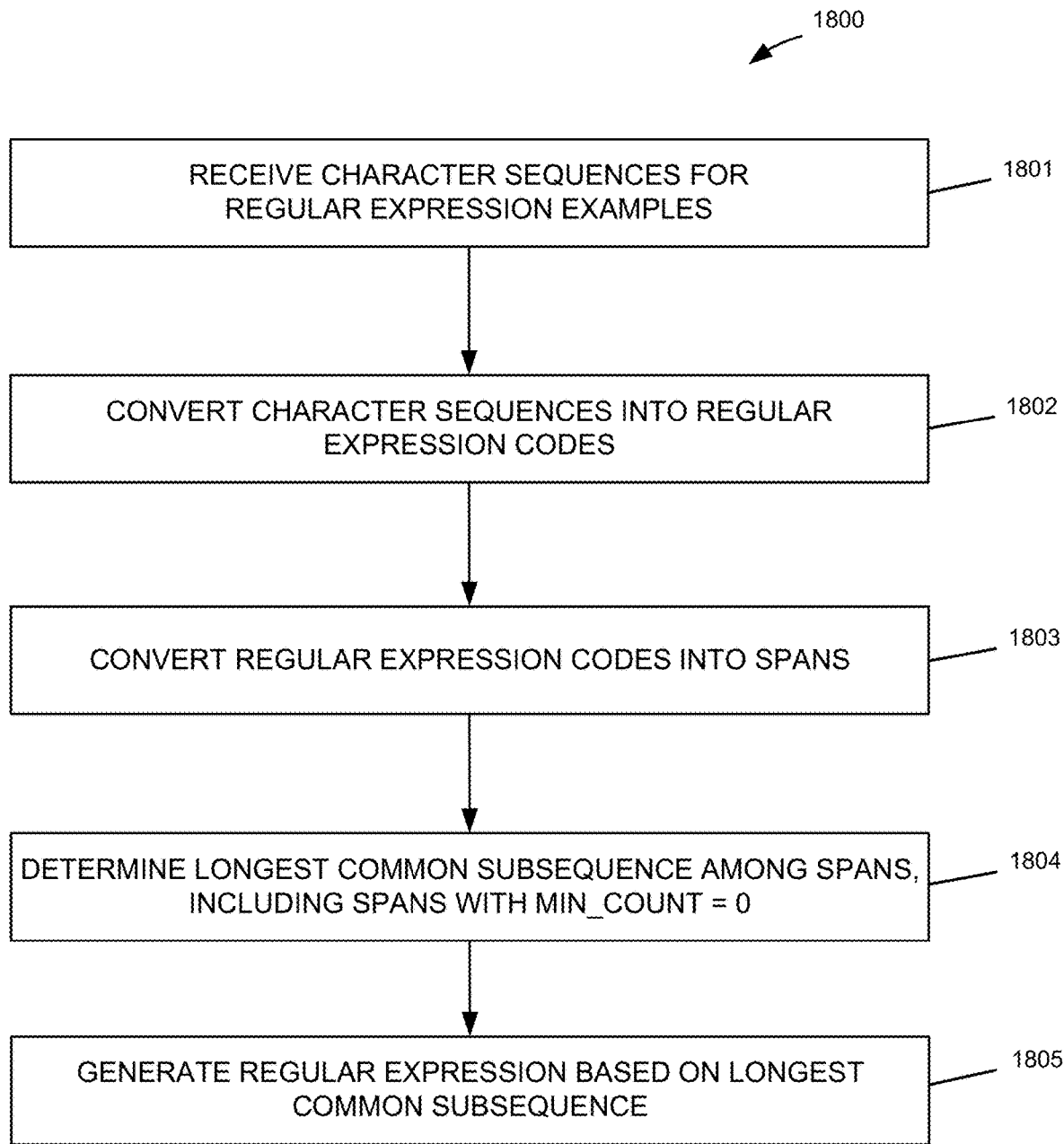
FIG. 18 is a flowchart illustrating a process for generating regular expressions, including optional spans, using a longest common subsequence (LCS) algorithm, according to one or more embodiments described herein.

FIG. 18 is a flowchart illustrating a process 1800 for generating regular expressions, including optional spans, using a longest common subsequence (LCS) algorithm, according to one or more embodiments described herein. In step 1801, the regular expression generator 110 may receive one or more character sequences as input data, corresponding to positive regular expression examples. In step 1802, the regular expression generator 110 may convert the character sequences into regular expression codes. Thus, steps 1801 and 1802 may be similar or identical to previous corresponding examples discussed above. Then, in step 1802, the regular expression codes may further by converted into span data structures (or spans). As noted above, each span may include a data structure storing a character class code (e.g., a regex code) and a repetition count range (e.g., a minimum count and/or a maximum count). In step 1804, the regular expression generator 110 may execute an LCS algorithm, providing the sets of spans as input to the algorithm. The output of the LCS algorithm in this example may include an output set of spans, including at least one span having a minimum repetition count range equal to zero, which corresponds to an optional span within the output of the LCS algorithm. Finally, in step 1805, the regular expression generator 110 may generate a regular expression based on the output of the output of the LCS algorithm, including the optional span.

In some embodiments, to improve both readability and achieve a proper level of restrictiveness, the regular expression generator 110 may use single-span alternation. To illustrate, after the LCS algorithm is executed in step 1804, the output (i.e., the intermediate output prior to final conversion to a regular expression) may be a sequence of spans, each having a minimum and maximum repetition count. A naïve straightforward conversion from a list of spans to a regular expression may result in multiple regular expression codes which marked as optional (e.g., using the question mark "?" modifier code). In contrast, in may be desirable in some cases to generate regular expressions involving alternation, which may be expressed as vertical bar-delimited alternatives enclosed within parentheses (see https://www-.regular-expressions.info/alternation.html). For example, a straightforward conversion of spans to a regular expression for time may be \d\d:\d\d (am)?(pm)?. However, in this example, the regular expression generator 110 may be configured to convert that regular expression to the more readable \d\d:\d\d (am|pm). To perform the conversion, the regular expression generator 110 may keep track of the original string fragments underlying the span, and if every original string fragment appears in at least two given positive examples, may determine that a list of those original string fragments should be output as vertical-bar delimited alternatives (e.g., rather than multiple optional regular expression codes).

Figure 19:
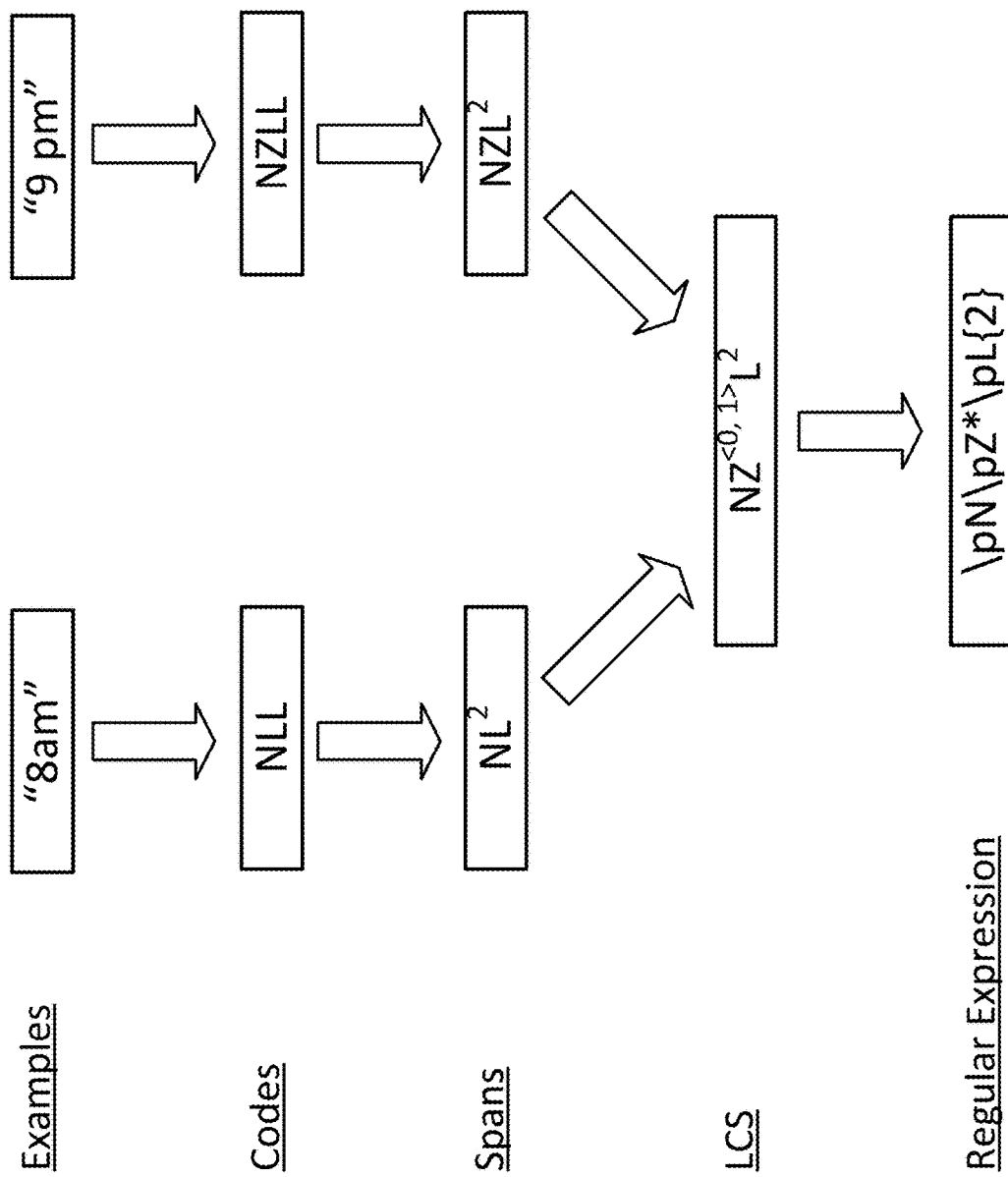
FIG. 19 is an example diagram for generating regular expressions, including optional spans, using a longest common subsequence (LCS) algorithm, according to one or more embodiments described herein.

FIG. 19 is an example diagram illustrating the generation of a regular expression using a longest common subsequence (LCS) algorithm, wherein the generated regular expression includes an optional span. In this example, the two input data character sequences are "8 am" and "9 pm". The input data character sequences are first converted to regular expression codes (step 1802) and then to spans (step 1803), as discussed above. The spans may be provided as input to an LCS algorithm (step 1804), and the LCS output includes the optional span $Z^{<0,1>}$, indicating that an optional single space may be number and the two-letter text sequence. That is, the superscript notation in this example may include the two numbers, the minimum repetition count range (e.g., 0), and the maximum repetition count range (e.g., 1) which apply to the preceding code (e.g., Z=spaces). Finally, the regular expression may be generated based on the output span of the LCS algorithm, and the optional span may be converted to the corresponding regular expression code "pZ*".

In some embodiments, the rendition and use of optional space by the regular expression generator 110, during the execution of the LCS algorithm, may provide additional technical advantages with respect to performance and readability. For example, when generating regular expressions, it is desirable in some cases to be able to handle both the characters that are in common amongst all the given examples, and the characters that are present in only some of the examples.

In certain embodiments, for each span data structure, both the minimum number of occurrences of a category code and a maximum number of occurrences of the category code may be tracked. In the case where a span is not present at all in one or more of the given examples, the minimum is set to zero. As another example, to generate a regular expression to handle months of the year spelled out, minimum and maximum numbers may then be mapped to the regular expression multiplicity syntax involving curly braces (e.g., [A-Z a-z{3, 9}]).

In some embodiments, the regular expression generator 110 may keep track of minimum and maximum number of occurrences for each span, but also may handle additional implementation details. For example, as a result of the combination of handling optional spans and running LCS on spans of characters, the regular expression generator 110 may be configured to detect and merge consecutive spans throughout the execution of the LCS algorithm. Additionally, the any extra optional spans being carried along sometimes appearing consecutively, and it may be desirable for the LCS algorithm to be run on those recursively as well. For example, in some cases, the regular expression generator 110 modify and/or extend the LCS algorithm to favor (or weight) fewer transitions between optional and required sequence elements (e.g., spans). For example, grouping optional spans together may minimize the number of grouping parentheses that have to be used within the regular expression, which may thus improve the human readability of the generated regular expression. In some cases, if the resultant lengths are equal even after considering optional spans, then the regular expression generator 110 may exhibit a preference for the alternative with fewer transitions between optional and required spans. For example, in some cases a standard LCS algorithm may be implemented to prefer the choice of longer sequences at its decision points. However, at decision points where the options are of equal length, a configuration preference may be programmed into the regular expression generator 110. One such configuration preference may be, for example, is to prefer shorter sequences (once optional spans are considered). Thus, the customized LCS within this configuration may simultaneously optimize for longer sequences (of required spans) and shorter sequences (of total required and optional spans).

In some embodiments, the implementation of the LCS algorithm by the regular expression generator 110 may be configured to select shorter outputs. As discussed above, the LCS algorithm generally may be used to find a longest common subsequence. For the generation of regular expressions using spans, the LCS algorithm may be used to identify the longest sequence of the required sequence elements (in our case, the required spans). However, for embodiments that include optional spans, the LCS algorithm may be configured to retain the original goal of maximizing the number of common sequence elements (e.g., spans), while also simultaneously minimizing the number of optional spans. That is, in the original LCS algorithm, an arbitrary choice may be made (in terms of maximizing the number of common sequence elements), regarding whether to consume a sequence element (e.g., span) from the first example string, or from the second example string. In such cases, the regular expression generator 110 may implement a modified version of the LCS algorithm that may choose the one that results in a shorter overall regular expression length, once the optional spans are also accounted for. A shorter regular expression in the end result may lead to improved readability.

Additionally, in some embodiments, the implementation of the LCS algorithm by the regular expression generator 110 may be configured to prefer a greater number of required spans. That is, given a choice, the regular expression generator 110 may select LCS output with a fewer optional spans in order to improve human readability.

In some embodiments, generated regular expressions may be more readable if they begin with a required span (which may also serve as a mental anchor to a human reader), rather than starting the regular expressions with optional spans. Thus, in some cases, if the resultant options have equal numbers of transitions, then the option with earlier non-optional spans may be chosen. Additionally, the LCS algorithm executed by the regular expression generator 110 may be configured in some embodiments to push all spaces (including optional spans corresponding to spaces) to the right within the regular expression. By pushing all the spaces to the right, there may be an increased chance that spans of spaces may be merged together, which may simplify the resulting regular expression as well as improving readability. Thus, during the execution of the LCS algorithm, when a determination is made that two sets of substrings have the same LCS, instead of arbitrarily selecting one of the two sets, the set that facilitates improved readability may be selected. Further, in some embodiments, the LCS algorithm may be configured to favor a greater number of required spans, and/or fewer optional spans, in order to improve readability.

As noted above, negative examples also may be based on optional spans in some cases. For example, the user may provide positive examples of "ab" and "a2b" and a negative example of "a3b". In this case, an example implementation may fail, because it may attempt to discriminate based only on required spans and the "2" digit is in an optional span. In such cases, the user may alerted to the failure and may be provided the options, via the user interface, to manually repair the generated regular expression and/or to remove some of the negative examples.

In some embodiments, there may be an isSuccess returned as part of the JSON coming back from the REST service. In some embodiments, the generated regex may become a different color (e.g., red) when isSuccess=false.

As noted above, the regular expression generator 110 may use single-span alternation in some cases. Additionally, in some embodiments, the regular expression generator 110 may be configured to perform multi-span alternation. That is, sometimes several spans in a row may form an alternation, such as date expressed as ([A-Z]{3}\s+\d\d,\s+|\d\d/\d\d/)\d\d\d\d. To detect these, the regular expression generator 110 may first find which spans from the output of the LCS algorithm are actually used in all of the given input positive examples. These common spans, together with a phantom span before the first span and a phantom span after the last span may constitute the anchor points. Between every pair of consecutive anchor points (that also have at least one non-anchor span between them) is a "bridge" that must be crossed. Then, for every bridge, the regular expression generator 110 may (a) determine the string fragment covered by the bridge spans for every input positive example, (b) convert each string fragment into a regular expression using the techniques described herein, and then (c) eliminate the duplicates from the above and put them into the regular expression alternation syntax.

Instead of alternatives within an alternation appearing in arbitrary order, they also may be sorted alphabetically. By having more deterministic output, the generated regex might not change as much for a small change in the input examples—such as during live typing when the regex is being generated in real-time with each character the user types. Additionally, some advanced regex interpreters, when encountering an alternation, may explicitly employ greedy vs. non-greedy strategies depending upon whether a greedy quantifier is present. However, other regex interpreters, such as those found in the standard Java and Javascript APIs, may simply attempt the alternatives within an alternation in the order in which they appear. In order to compensate for this commonly found weakness, the regex generation may output the longer alternatives within an alternation first. And to break any ties, it may use alphabetic order as the secondary sort criterion.

In some embodiments, the regular expression generator may be configured to collapse spans that appear in a minority of positive examples down to the non-greedy wildcard.*?. That is, sometimes input examples may get a bit chatty. Rather than trying to match each and every word and their particular word lengths, the regular expression generator may use wildcards.*? when it detects a significant of variance in the number and original fragment content of spans. In some embodiments, for a span to be considered for participation in such a collapse down to wildcards.*? it must meet one of the following three conditions. (1) The span may participate in (strictly) less than one-third of the total number of input examples, (2) The span is a SPACE (whitespace) span, and (3) All of the original text fragments for the span occur infrequently, and that there exists "unique punctuation" in the solution. "Infrequent" may mean (strictly) less than two-third of the number of examples. "Unique punctuation" may mean there exists a SYMBOL or PUNCTUATION span somewhere in the solution, or that the solution is anchored to the beginning of the text with ˆ or to the end of the text with $.

In some cases, eol wildcards may be prevented from abutting collapsed wildcards inside of a highlight. That is, recall that if ˆ or $ is used, then wildcards appear on the opposite end. E.g. ˆ([A-Z]+). *? matches the first word. Indiscriminate collapsing of wildcards may end up with something like ˆ(.*?).*? which would give the regex interpreter nothing concrete to serve as a reference point to match against. To solve this, if it is detected that, if ˆ is used and the last span within the capture group is part of the collapse-down-to-wildcards.*?, then one additional span after the capture group is used for the output before the end-of-line wildcards are emitted, as used for negative character classes abutting wildcards. Similarly, if $ is used and the first span within the capture group is part of the collapse-down-to-wildcards, then one additional span before the capture group is explicitly used for the output.

In some embodiments, symbols and punctuation may no longer be spannable, for example, to allow highlight endpoints to come between two punctuation marks. In such examples, each punctuation mark and each symbol may takes up its own PUNCTUATION or SYMBOL span. In other cases, "A.,S" might result in three spans LETTER (with orig fragment A), PUNCTUATION with orig fragment (.,), and LETTER (with orig fragment S). However, in these embodiments, there may be four spans. In this example, it may help if the comma serves as a delimiter in a comma-separated list, especially if there are multiple user highlights per example. In this example, the dot (the period) may be superfluous and it should not be in the same span as the comma.

Additionally, for Spans of type ALPHANUMERIC, the regular expression generator may keep track of how many letter and number spans were replaced. Because many aspects of the algorithm, such as determining the beginning and end of the inner highlight in the overall solution, keep track of position by span index, substituting multiple LETTER and NUMBER spans with a single ALPHANUMERIC span throws off these indices and positions. Therefore, it may become necessary to maintain a mapping from pre-substitution indices to after-substitution indices. Furthermore, these need to be tracked on a per-example basis as, generally speaking, each example does not contain all the indices from the total solution (which contains optional spans for those spans not represented in 100% of the examples). A class member numPreSubstitutedSpans has been added to the Span class, with a type and default value as follows:
numPreSubstitutedSpans:Map[ID,Int]=orig.flatMap (_.fromExamples).distinct.map((_,1)).toMap In some embodiments, commonly available regex APIs may be used to find ending offset of a capture group. For example, as described in relation to the replace command that may be implemented in some user interfaces, when using the replace command in nested-auto-outer mode, an additional capture group after the regular capture group may be generated (as well as one before, for a total of three). The user interface may perform this replacement, and, similar to above, to avoid having to implement a full parser in the user interface, techniques may be employed to find the right parenthesis of the capture group. This may be more complicated than finding the left parenthesis of the capture group, because there is no easy way to distinguish between the right parenthesis of a capture group (<stuff>) from the right parenthesis of a non-capture group (?:<stuff>). Distinguishing the left parenthesis may be possible by using a look-ahead to look for the ?: in some cases. In some embodiments, a technique may be employed to require in the search an example of something known to match the regular expression. By comparing the captured groups, concatenated together, to the original example text, it may be confirmed that the regular expression is completely covered with capture groups with no gaps. The code for this technique is shown below:

```
self.addEpilogueCaptureGroup = function(r, example) {
    let ret = "";
    const rightParenRegex =/(?<!\\)\)[^?+*]/g;
    let 1pm = null;
    while (!ret && (1pm = rightParenRegex.exec(r)) != null)
        try {
            ret = r.substring(0, 1pm.index+1) +
            "('" + r.substring(1pm.index+1) + "')";
            const m = XRegExp(ret).exec(example);
            if (m.length != 4 || m[1]+m[2]+m[3] != example)
                ret = "";
        } catch(err) {
            ret = "";
        }
    return ret;
}
```

VIII. REGULAR EXPRESSION GENERATION USING COMBINATORIC LONGEST COMMON SUBSEQUENCE ALGORITHMS

Further aspects described herein relate to a combinatoric search, in which the LCS algorithm executed by the regular expression generator 110 may be run multiple times to generate a "correct" regular expression (e.g., a regular expression that properly matches all given positive examples and properly excludes all given negative examples), and/or to generate multiple correct regular expressions from which a most desirable or optimal regular expression may be selected. For example, during a combinatoric search, the full LCS algorithm and regular expression generation process may be run multiple times, including different combinations/permutations of text processing directions, different anchoring, and other different characteristics of the LCS algorithm.

Figure 20:
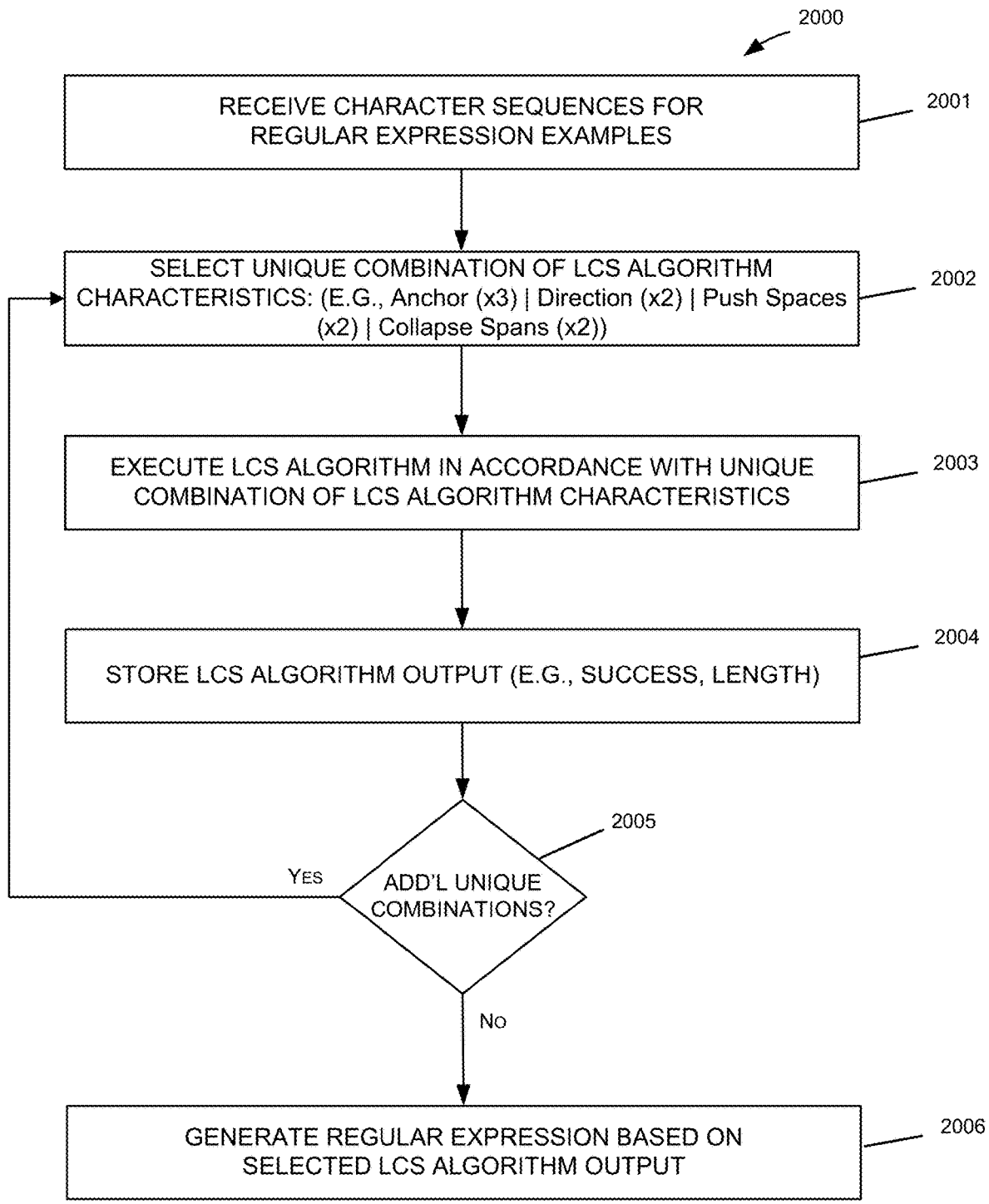
FIG. 20 is a flowchart illustrating a process for generating regular expressions based on combinatoric executions of a longest common subsequence (LCS) algorithm, according to one or more embodiments described herein.

FIG. 20 is a flowchart illustrating a process 2000 for generating regular expressions based on combinatoric executions of a longest common subsequence (LCS) algorithm. In step 2001, the regular expression generator 110 may receive input data character sequences corresponding to positive examples. In step 2002, the regular expression generator 110 may iterate over various different combinations of execution techniques for the LCS algorithm. As shown in this examples, during each iteration of steps 2002, the regular expression generator 110 may select a different combination of the following LCS algorithm execution parameters (or characteristics): anchor (i.e., no anchoring, anchoring to the beginning of the line, anchoring to the end of the line), processing direction (i.e., right-to-left order, left-to-right order), push space (i.e., do or do not push spaces), and collapse spans (i.e., do or not collapse spans). In step 2003, the LCS algorithm is run on the input data character sequences (or on regular expression codes if the input character sequences were converted first), wherein the LCS algorithm is configured based on the parameters/characteristics selected in step 2002. In step 2004, the output of the LCS algorithm of may be stored by the regular expression generator 110, include data such as whether or not an LCS was successfully identified by the algorithm, and the length of the corresponding regular expression. In step 2005, the process may iterate until the LCS algorithm has been run with all possible combinations of the parameters/characteristics of the combinatoric search. Finally, in step 2006, a particular output from one of the LCS is selected as an optimal output (e.g., based on success and regular expression length), and a regular expression may be generated based on the selected LCS algorithm output.

In various embodiments, a combinatoric search such as that described above in reference to FIG. 20, may be performed for various different combinations of parameters/characteristics. For example, in some embodiments an LCS algorithm may use the caret symbol A to anchor the regular expression to the beginning of the text, and/or the dollar symbol $ to anchor the regular expression to the end of the text. In some cases, such anchoring may result in generating a shorter regular expression. Anchors may be particularly useful when a user wishes to find a particular pattern at the beginning and/or at the end of a string. For example, a user may want a product name at the beginning. To avoid confusing the LCS algorithm with the varying number of words describing the product name, a caret may be used to anchor the regex to the beginning of a string as depicted in the image below.

Additionally, in some embodiments, the LCS algorithm may be executed with input data that is either forward or reversed (or similarly the LCS algorithm may be configured to receive the input data in the usual order and then reverse the order before executing the algorithm). Thus, in some embodiments, a combinatoric search of LCS algorithms that may be performed on a pair of input character sequences or codes may be:

1. Usual (right-to-left) order, no anchoring to start or end
2. Usual (right-to-left) order, anchoring to beginning of line using caret ^
3. Usual (right-to-left) order, anchoring to end of line using dollar $
4. Reverse (left-to-right) order, no anchoring to start or end
5. Reverse (left-to-right) order, anchoring to beginning of line using caret ^
6. Reverse (left-to-right) order, anchoring to end of line using dollar $ In this example, out of the six executions of the LCS, the shortest resulting regular expression may be selected (step 2006).

In some embodiments, the combinatoric search of the LCS algorithm also may iterate over a greedy quantifier "?" and non-greedy quantifier "??". For example, by default if there is an optional span a single question mark is emitted, e.g., [A-Z]+(?: [A-Z]\.)? [A-Z]+ for first and last name with optional middle initial. If a satisfactory regular expression cannot be found when using the greedy quantifier, then the combinatoric search may attempt to replace all question mark quantifiers with double-question mark quantifiers (e.g., [A-Z]+(?: [A-Z]\.)?? [A-Z]+). The double question mark corresponds to a non-greedy quantifier, which may instruct a downstream regular expression matcher to go into backtracking mode in order to find a match.

Additionally, in some embodiments, the combinatoric search of the LCS algorithm also may iterate over whether or not to prefer spaces on the right. For example, as noted above, a strategy may be used in some embodiments of pushing spaces to the right, e.g., when the LCS algorithm is faced with an arbitrary choice of otherwise equal options, in the hope that space spans may get merged together, resulting in a fewer number of overall spans. This feature adds another option to the combinatoric search, that is, to either push spaces to the right or execute in accordance with a traditional LCS approach of leaving the decision to be arbitrary.

Further, in some embodiments, the combinatoric search of LCS algorithm also may iterative over scanning/not scanning for literals common among all the examples, by running LCS on the original strings. In such embodiments, the LCS algorithm may be configured to identify and align on common words. As used herein, a "common word" may refer to a word that appears in every positive example. Once a common word is identified, its span type may be converted from LETTER to WORD, and the subsequent run through the LCS algorithm may then naturally aligns on it.

Thus, in the example below, a combinatoric search may iterate over several parameters/characteristics to reach 96 times that the complete LCS algorithm is to be performed. The various parameters/characteristics to be iterated over in this example are:

Anchor (3) (Values=^, $, or neither)
Pushing Spaces (2) (Values=Yes or No)
Coalescing Low Cardinality Spans to Wildcards (2) (Values=Yes or No)
Greedy Quantifier ? (2) (Values=Yes or No)
Aligning the LCS Algorithm on Common Tokens (2) (Values=Yes or No)
Using "\w" to Represent Alphanumeric, Versus Keeping Letters "\pL" and Numbers "\pN" Treated as Separate Spans (2) (Values=Yes or No)

As noted above, in this example, the complete LCS algorithm is to be performed 96 times (e.g., 3*2*2*2*2*2=96).

However, in other embodiments, the regular expression generator 110 may provide a performance enhancement, by which only the first three characteristics in the above list (Anchor, Pushing Spaces, and Coalescing Low Cardinality Spans to Wildcard, may participate in the combinatoric search. This may result in a far fewer number of complete LCS algorithm is to be performed (e.g., 3*2*2=12 times). In such embodiments, while the last three characteristics in the above list (Greedy Quantifier, Aligning the LCS Algorithm on Common Tokens, and Using "\w" to Represent Alphanumeric, Versus Keeping Letters "\pL" and Numbers "\pN" Treated as Separate Spans) do not participate in the combinatoric search, these characteristics may be tested at the end, individually and serially. Technical advantages may be realized in such embodiments, because dividing the search space in this manner may still resulted in a satisfactory regular expression being found, but with approximately an 8x speedup in performance.

To illustrate, the following example of a combinatoric search may provide a performance advantage over the previous example. In this example, the combinatoric search may be performed based on the following parameters/characteristics to be iterated over:

Anchoring (3): BEGINNING_OF_LINE_MODE, END_OF_LINE_MODE, NO_EOL_MODE
Order/Direction (2): Right-to-left (normal) LCS vs. Left-to-right (reverse) LCS
Push (2): Whether or not to try to push spaces to the right within the LCS algorithm
Compress to Wildcards (2): Whether or not to try to compress long sequences of only-sometimes occurring spans down to the wildcards.*?

The combinatoric in this example may result in running the complete algorithm 3*2*2*2=24 times). The regular expression generator 110 then may take the best of the 24 results of the LCS algorithm, where "best" may means that (a) the LCS algorithm succeeded, and (b) the shortest regular expression was generated. The regular expression generator 110 then may perform the following three additional tasks:

1. Try condensing sequences of letters and numbers that are unbroken by spaces, punctuation, or symbols, down to a new span type called ALPHANUMERIC, corresponding to generated regex of 4. This may be useful for hexadecimal numbers as found in IPv6 addresses from clickstream logs.
2. Try using the non-greedy quantifier ?? instead of the greedy quantifier ?
3. Try aligning on literals A. Span Highlighting Alignment A positive or negative example can include multiple highlights. Each example that is provided can include multiple highlighting (e.g., outer and inner highlighting). Therefore, an example embodiment provides a method for efficient and accurate handling when multiple examples each have their own highlights.

Each example is broken into a before-highlight, an on-highlight, and an after-highlight. A full algorithm is run on each set, each set including a before-highlight, an on-highlight, and an after-highlight. User highlights on multiple examples are supported even if there is a large degree of variation between the examples that are provided and highlighting failures will be avoided.

Figure 52:
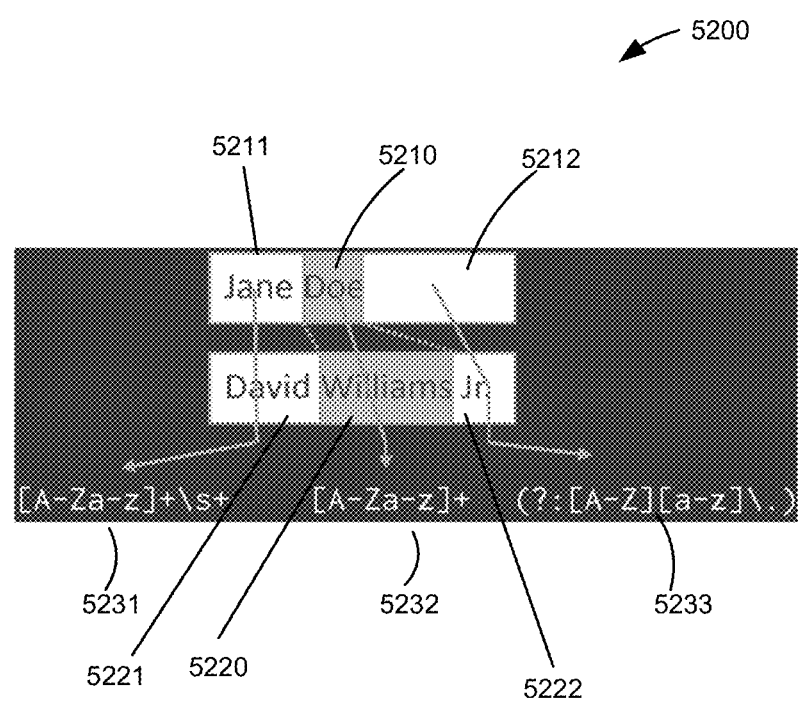
FIG. 52 illustrates a diagram for generating a regular expression based on span highlighting alignment, in accordance with some example embodiments.

FIG. 52 illustrates a diagram 5200 for generating a regular expression based on span highlighting alignment, in accordance with some example embodiments.

FIG. 52 illustrates performing highlighting alignment for two data examples "Jane Doe" 5210 and "David Williams Jr." 5220. As shown in FIG. 52, the last name for each entry (e.g., Doe and Williams) is highlighted. For example, a user may have selected "Doe" as an example in a first record and the user may have selected "Williams" as an example in another data record. For ease of explanation, two examples are shown. However, highlighting alignment can be performed for a plurality of data examples.

In the example shown in FIG. 52, a regex is generated in parts (e.g., three parts). There can be more or less part depending on the information in the data cell of the data record. A regex can be generated for all the "before the highlight" fragments, for the "on the highlight" fragments, and for the "after the highlight" fragments. A first regex 5231 is generated for the "before the highlight" fragments, a second regex 5232 is generated for the "on the highlight" fragments, and a third regex 5233 is generated for the after the highlight" fragments.

The spans (i.e. the intermediate result before the final regex generation) of the generated regex are concatenated together. The spans of the generated regex for the parts (e.g., before the highlight fragments, on the highlight fragments, and after the highlight fragments) are concatenated together.

Figure 53:
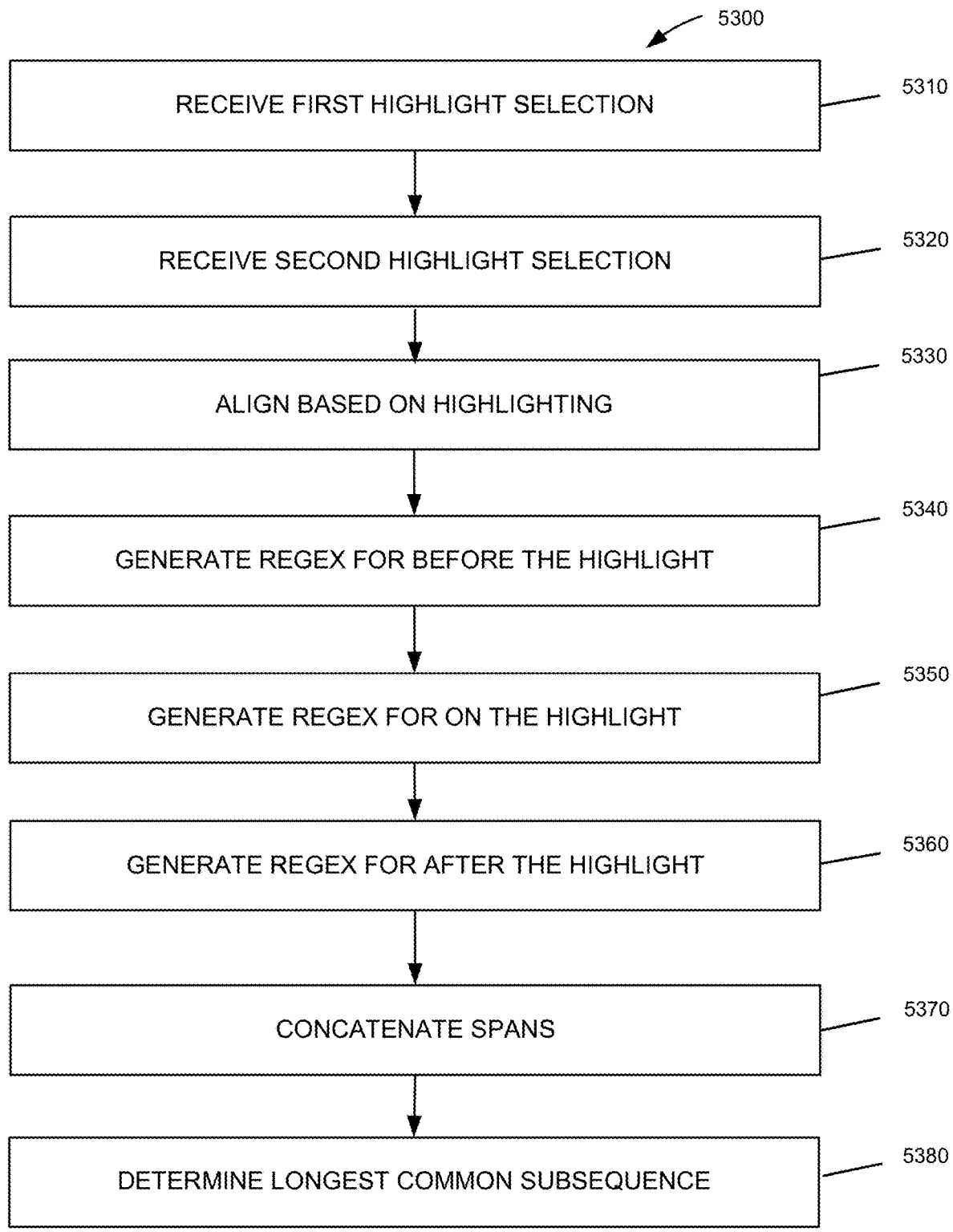
FIG. 53 illustrates a flowchart of a method for performing span highlighting alignment, in accordance with some example embodiments.

FIG. 53 illustrates a flowchart of a method 5300 for performing span highlighting alignment, in accordance with some example embodiments. The steps of FIG. 53 can be performed by a regular expression generator such as that shown in FIG. 1 and FIG. 24.

At step S310, an initial highlight selection can be received. For example, a user can select a text fragment from a first record in a column of data. In the example shown in FIG. 52, the user has highlighted a last name 5210 "Doe" in a name column. The fragment that is selected can be identified as the fragment "on the highlight". A fragment before the selected fragment can be identified as the fragment "before the highlight." A fragment after the selected fragment can be identified as the fragment "after the highlight."

At step S320, a second highlight selection can be received. For example, a user can select a text fragment from a second record in the same column of data (e.g., name column) as the initial highlight selection. In the example shown in FIG. 52, the user has highlighted a last name 5220 "Williams" in the name column. In the second example shown in FIG. 52, the user has also highlighted a last name. The fragment that is selected can be identified as the fragment "on the highlight". A fragment before the selected fragment can be identified as the fragment "before the highlight." A fragment after the selected fragment can be identified as the fragment "after the highlight." The user may want to provide multiple examples, therefore the user may provide additional highlighted selections. However, the examples that are provided may not clearly align.

At step S330, alignment of the fragments is performed. The fragments that occur before the highlight are aligned together, the fragments that occur after the highlight are aligned together and the fragments after the highlight are aligned together. Therefore, in the example shown in FIG. 52, fragment 5211 containing "Jane" and fragment 5221 containing "David" are aligned since they occur before the highlighted fragment. The fragment 5210 "Doe" and the fragment 5220 "Williams" are aligned together since they occur on the highlight. The fragment 5215, which does not contain any characters, and the fragment 5222 are aligned since they occur after the highlight.

At step S340, a regex is generated for a "before the highlight" fragments. For example, first regex 5231 can be generated. The first regex 5231 can be generated by the regex generator based on the data before the highlighted fragment.

At step S350, a regex is generated for an "on the highlight" fragments. For example, second regex 5231 can be generated. The second regex 5232 can be generated by the regex generator based on the data in the highlighted fragment.

At step S360, a regex is generated for "after the highlight fragments." For example, third regex 5231 can be generated. The third regex 5233 can be generated by the regex generator based on the data after the highlighted fragment.

As shown in FIG. 53, a regex is generated in three parts 5231, 5232 and 5233. A first regex 5231 is generated for a "before the highlight" fragment, then a second regex 5232 is generated for the "on the highlight" fragment, and then a third regex 4233 is generated for the "after the highlight fragment." Although an order of generating the first, second and third regex is described, the order of generating the regex can vary. Further, although three parts are described, highlighting may be performed for more than three parts of a data example.

At step S370, the spans for the three regex are concatenated. That is, instead of concatenating the three resulting regex together, the spans (i.e. the intermediate result before the final regex generation) are concatenated together.

At step S380, a longest common subsequence is determined for the three spans that were concatenated. The LCS can then be determined for the output of running the LCS algorithm on the before the highlight span, the on the highlight span, and the after the highlight span.

Therefore, an example embodiment provides a more accurate method of determining a longest common subsequence, since a longest common subsequence is determined based on similarly located data.

An example embodiment, also provides alphanumeric spans. Determining the beginning and end of the inner highlight, keeping track of a position by a span index, and substituting multiple letter spans and number spans with a single alphanumeric span can throw off indices and positions. Therefore, an example embodiment provides a mapping from pre-substitution indices to after-substitution indices. A mapping is generated that associates indices of the alphanumeric span to indices of the one or more numbers and the one or more letters.

Furthermore, the mapping is tracked on a per-example basis since each example may not contain all of the indices from the total solution. A number of pre-substituted spans can be identified.

Figure 54:
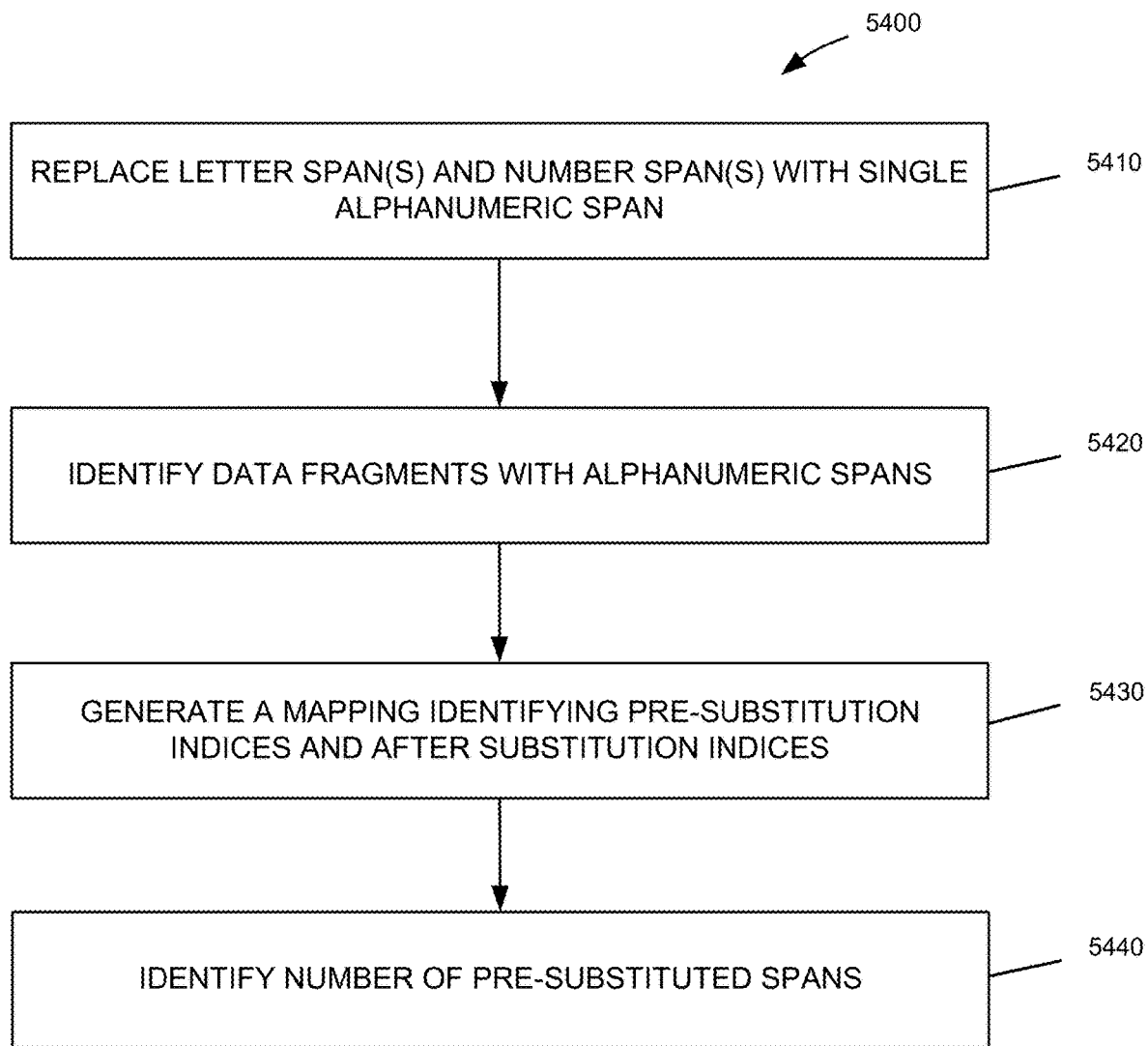
FIG. 54 illustrates a flowchart of a method of tracking spans, in accordance with some example embodiments.

FIG. 54 illustrates a flowchart of a method 5400 of tracking spans, in accordance with some example embodiments. Specifically, an example embodiment provides a method for determining how many letter spans and how many number spans of an alphanumeric span are replaced.

At step S410, one or more letter spans and one or more number spans are replaced with a single alphanumeric span. For example, HTML hex color codes can be replaced with a single alphanumeric span instead of three different spans such as a letter span and a number span. In an HTML hex color code such as <span style="color#FF030A">BUY NOW!</span>, a single alphanumeric span FF030A is used instead of three different spans (e.g., a letter span a number span, and another letter span).

Some data fragment examples can include the hex "digits" A-F. The hex digits can appear anywhere within a hex code. Therefore, an alphanumeric span can be used to easily identify matches for such data fragment examples.

At step S420, a data fragment example that includes the alphanumeric spans that replaced the one or more letter spans and one or more number spans is identified.

At step S430, a mapping is generated that identifies pre-substitution indices and after-substitution indices for the data fragment example. A mapping is generated for each data fragment example.

At step S440, a number of pre-substituted spans can be identified.

Figure 55:
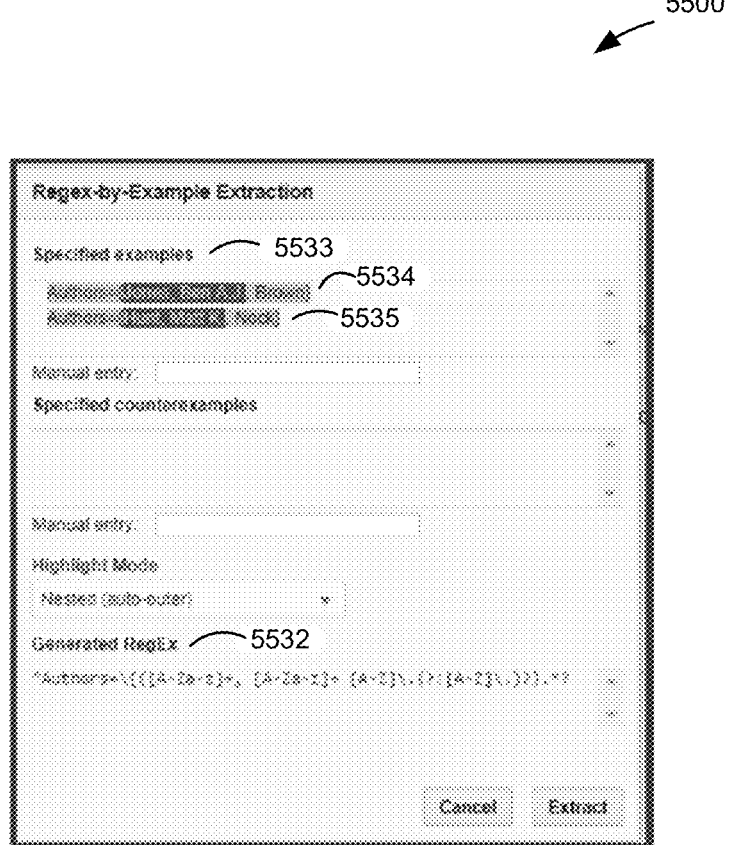
FIG. 55 illustrates a user interface displaying punctuation spans and symbol spans, in accordance with some example embodiments.

FIG. 55 illustrates a user interface 5500 displaying punctuation spans and symbol spans, in accordance with some example embodiments. As shown in FIG. 55, the user has provided specified examples 5533. The examples specified by the user include example 5534 and 5535. Regex 5532 is generated based on the specified examples 5533.

As shown in FIG. 55, symbols and punctuation are no longer spannable so that a highlight endpoint can come between two punctuation marks.

Each punctuation mark and each symbol can have its own punctuation span or symbol span. For example, an example including "A.,S" would include four spans "A" "." "," and "S".

Example embodiments provide improved regex generation aesthetics. Specifically, fragments can be associated with the example that gave rise to them. Fragments are associated back to the examples that gave rise to those fragments. In an example embodiment, the examples that gave rise to the fragments can be added to a list of example numbers.

Further, an example embodiment provides an even more detailed method of associating a fragment with the example that gave rise to it. The examples can be tied to specific text fragments and not just to the span object as a whole. That way, a user can more easily determine which example is tied to the fragment since the user can see the example itself instead of only seeing the example number in a list of example numbers.

For example, with respect to the following two input examples: Example 1: "a#s#" and Example 2: "a#", a solution span can include [(LETTER, [("a",[1,2])]), (SYM- BOL, [("#",[1,2])]), (LETTER, ["s",[1]]), (SYMBOL, ["#", [1]])]. By having the example numbers available for each individual fragment, the algorithm can walk back and forth (left or right) when searching for highlight start and/or end (or beyond a highlight to establish context) when processing a particular example. Each example can be broken up into spans and an LCS merging of the spans into its own set of spans is performed.

With respect to another two input examples, Example 1: "8 pm" and Example 2: "9 am" a solution span can include [(NUMBER, [("8",[1]), ("9",[2])]), (LETTER, [("pm",[1]), ("am",[2])]), (PUNCTUATION, [(".",[1,2])])]. Therefore, a fragment is associated with the particular example that gave rise to it.

In another example, regex generation aesthetics can include preventing spans from getting merged unless they come from the same set of examples. In order to facilitate matching, in an example embodiment, spans may not be merged unless they came from the same set of examples.

Therefore, example embodiments provide various mechanisms for generating accurate regular expressions. The regular expressions can be applied to data in order to obtain data results that are desired by the user. A user can more easily and efficiently obtain desired information without extensive searching or data manipulation.

IX. HARDWARE OVERVIEW

Figure 21:
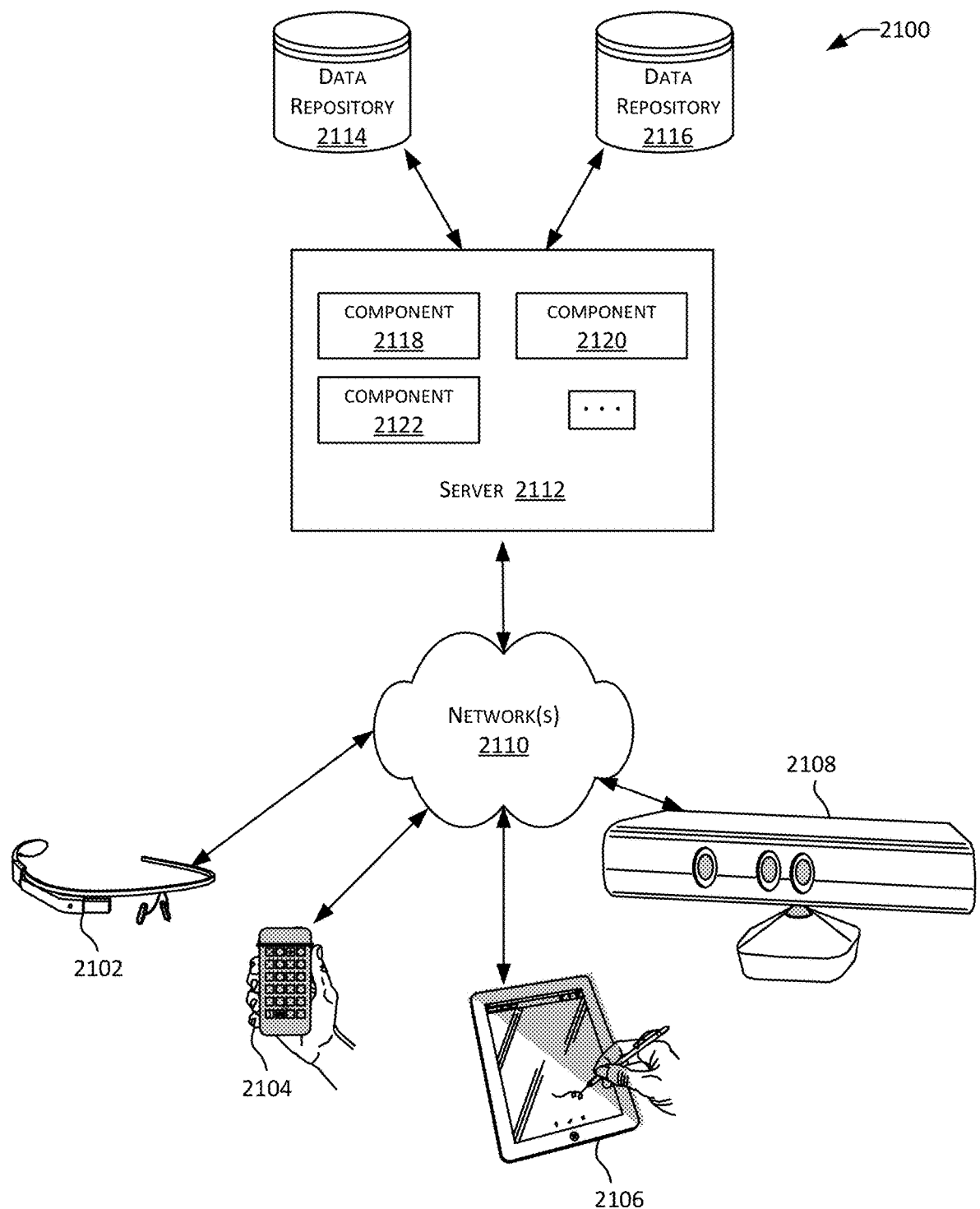
FIG. 21 is a block diagram illustrating components of an exemplary distributed system in which various embodiments of the present invention may be implemented.

FIG. 21 depicts a simplified diagram of a distributed system 2100 for implementing an embodiment. In the illustrated embodiment, distributed system 2100 includes one or more client computing devices 2102, 2104, 2106, and 2108, coupled to a server 2112 via one or more communication networks 2110. Clients computing devices 2102, 2104, 2106, and 2108 may be configured to execute one or more applications.

In various embodiments, server 2112 may be adapted to run one or more services or software applications that enable automated generation of regular expressions, as described in this disclosure. For example, in certain embodiments, server 2112 may receive user input data transmitted from a client device, where the user input data is received by the client device through a user interface displayed at the client device. Server 2112 may then convert the user input data into a regular expression that is transmitted to the client device for display through the user interface.

In certain embodiments, server 2112 may also provide other services or software applications that can include non-virtual and virtual environments. In some embodiments, these services may be offered as web-based or cloud services, such as under a Software as a Service (SaaS) model to the users of client computing devices 2102, 2104, 2106, and/or 2108. Users operating client computing devices 2102, 2104, 2106, and/or 2108 may in turn utilize one or more client applications to interact with server 2112 to utilize the services provided by these components.

In the configuration depicted in FIG. 21, server 2112 may include one or more components 2118, 2120 and 2122 that implement the functions performed by server 2112. These components may include software components that may be executed by one or more processors, hardware components, or combinations thereof. It should be appreciated that various different system configurations are possible, which may be different from distributed system 2100. The embodiment shown in FIG. 21 is thus one example of a distributed system for implementing an embodiment system and is not intended to be limiting.

Users may use client computing devices 2102, 2104, 2106, and/or 2108 to execute one or more applications, which may generate regular expressions in accordance with the teachings of this disclosure. A client device may provide an interface that enables a user of the client device to interact with the client device. The client device may also output information to the user via this interface. Although FIG. 21 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone, tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 2110 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 2110 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics Engineers (IEEE) 1002.11 suite of protocols, Bluetooth®, and/or any other wireless protocol), and/or any combination of these and/or other networks.

Server 2112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2112 can include one or more virtual machines running virtual operating systems, or other computing architectures involving virtualization such as one or more flexible pools of logical storage devices that can be virtualized to maintain virtual storage devices for the server. In various embodiments, server 2112 may be adapted to run one or more services or software applications that provide the functionality described in the foregoing disclosure.

The computing systems in server 2112 may run one or more operating systems including any of those discussed above, as well as any commercially available server operating system. Server 2112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 2112 may include one or more applications to analyze and consolidate data feeds and/or event updates received from users of client computing devices 2102, 2104, 2106, and 2108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2112 may also include one or more applications to display the data feeds and/or real-time events via one or more display devices of client computing devices 2102, 2104, 2106, and 2108.

Distributed system 2100 may also include one or more data repositories 2114, 2116. These data repositories may be used to store data and other information in certain embodiments. For example, one or more of the data repositories 2114, 2116 may be used to store information such as a new column of data that matches a system-generated regular expression. Data repositories 2114, 2116 may reside in a variety of locations. For example, a data repository used by server 2112 may be local to server 2112 or may be remote from server 2112 and in communication with server 2112 via a network-based or dedicated connection. Data repositories 2114, 2116 may be of different types. In certain embodiments, a data repository used by server 2112 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 2114, 2116 may also be used by applications to store application data. The data repositories used by applications may be of different types such as, for example, a key-value store repository, an object store repository, or a general storage repository supported by a file system.

Figure 22:
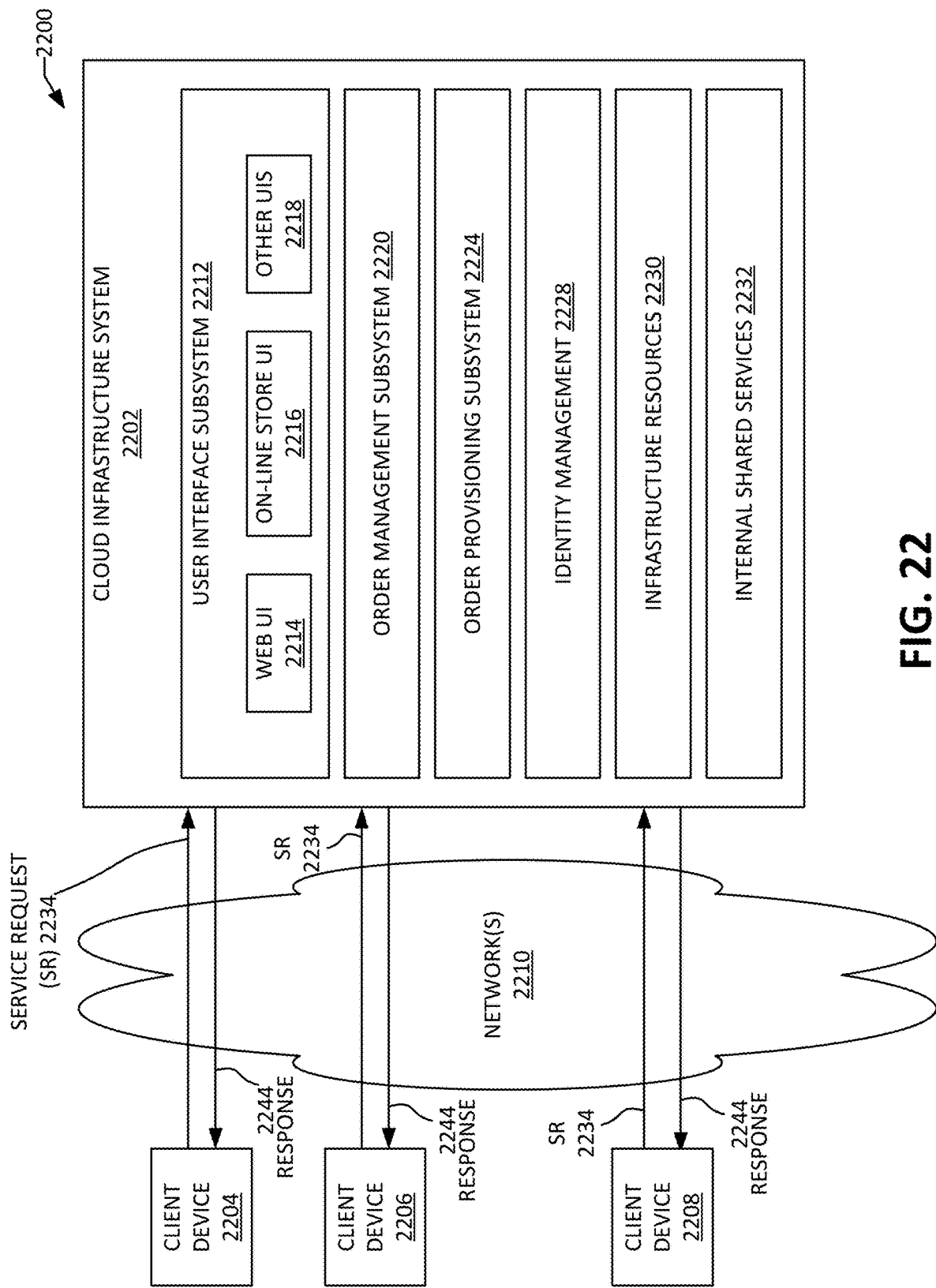
FIG. 22 is a block diagram illustrating components of a system environment by which services provided by embodiments of the present invention may be offered as cloud services.

In certain embodiments, the functionalities described in this disclosure may be offered as services via a cloud environment. FIG. 22 is a simplified block diagram of a cloud-based system environment in which various services may be offered as cloud services, in accordance with certain examples. In the example depicted in FIG. 22, cloud infrastructure system 2202 may provide one or more cloud services that may be requested by users using one or more client computing devices 2204, 2206, and 2208. Cloud infrastructure system 2202 may comprise one or more computers and/or servers that may include those described above for server 2112. The computers in cloud infrastructure system 2202 may be organized as general purpose computers, specialized server computers, server farms, server clusters, or any other appropriate arrangement and/or combination.

Network(s) 2210 may facilitate communication and exchange of data between clients 2204, 2206, and 2208 and cloud infrastructure system 2202. Network(s) 2210 may include one or more networks. The networks may be of the same or different types. Network(s) 2210 may support one or more communication protocols, including wired and/or wireless protocols, for facilitating the communications.

The example depicted in FIG. 22 is only one example of a cloud infrastructure system and is not intended to be limiting. It should be appreciated that, in some other examples, cloud infrastructure system 2202 may have more or fewer components than those depicted in FIG. 22, may combine two or more components, or may have a different configuration or arrangement of components. For example, although FIG. 22 depicts three client computing devices, any number of client computing devices may be supported in alternative examples.

The term cloud service is generally used to refer to a service that is made available to users on demand and via a communication network such as the Internet by systems (e.g., cloud infrastructure system 2202) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 2202 may provide one or more cloud services using different models such as under a Software as a Service (SaaS) model, a Platform as a Service (PaaS) model, an Infrastructure as a Service (IaaS) model, and others, including hybrid service models. Cloud infrastructure system 2202 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 2202. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 2202. Cloud infrastructure system 2202 then performs processing to provide the services requested in the customer's subscription order. Cloud infrastructure system 2202 may be configured to provide one or more cloud services.

Cloud infrastructure system 2202 may provide the cloud services via different deployment models. In a public cloud model, cloud infrastructure system 2202 may be owned by a third party cloud services provider and the cloud services are offered to any general public customer, where the customer may be an individual or an enterprise. Under a private cloud model, cloud infrastructure system 2202 may be operated within an organization (e.g., within an enterprise organization) and services provided to customers that are within the organization. For example, the customers may be various departments of an enterprise such as the Human Resources department, the Payroll department, etc. or even individuals within the enterprise. Under a community cloud model, the cloud infrastructure system 2202 and the services provided may be shared by several organizations in a related community. Various other models such as hybrids of the above mentioned models may also be used.

Client computing devices 2204, 2206, and 2208 may be of different types (such as devices 2102, 2104, 2106, and 2108 depicted in FIG. 21) and may be capable of operating one or more client applications. A user may use a client device to interact with cloud infrastructure system 2202, such as to request a service provided by cloud infrastructure system 2202.

In some embodiments, the processing performed by cloud infrastructure system 2202 for providing management-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 2202 for determining regular expressions in an automated manner. The data used for this analysis may include structured data (e.g., data stored in a database or structured according to a structured model) and/or unstructured data (e.g., data blobs (binary large objects)).

As depicted in the example in FIG. 22, cloud infrastructure system 2202 may include infrastructure resources 2230 that are utilized for facilitating the provision of various cloud services offered by cloud infrastructure system 2202. Infrastructure resources 2230 may include, for example, processing resources, storage or memory resources, networking resources, and the like.

In certain embodiments, to facilitate efficient provisioning of these resources for supporting the various cloud services provided by cloud infrastructure system 2202 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 2202 may itself internally use services 2232 that are shared by different components of cloud infrastructure system 2202 and which facilitate the provisioning of services by cloud infrastructure system 2202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 2202 may comprise multiple subsystems. These subsystems may be implemented in software, or hardware, or combinations thereof. As depicted in FIG. 22, the subsystems may include a user interface subsystem 2212 that enables users or customers of cloud infrastructure system 2202 to interact with cloud infrastructure system 2202. User interface subsystem 2212 may include various different interfaces such as a web interface 2214, an online store interface 2216 where cloud services provided by cloud infrastructure system 2202 are advertised and are purchasable by a consumer, and other interfaces 2218. For example, a customer may, using a client device, request (service request 2234) one or more services provided by cloud infrastructure system 2202 using one or more of interfaces 2214, 2216, and 2218. For example, a customer may access the online store, browse cloud services offered by cloud infrastructure system 2202, and place a subscription order for one or more services offered by cloud infrastructure system 2202 that the customer wishes to subscribe to. The service request may include information identifying the customer and one or more services that the customer desires to subscribe to. For example, a customer may place a subscription order for an automated-generation-of-regular-expressions-related service offered by cloud infrastructure system 2202.

In certain embodiments, such as the example depicted in FIG. 22, cloud infrastructure system 2202 may comprise an order management subsystem (OMS) 2220 that is configured to process the new order. As part of this processing, OMS 2220 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 2220 may then invoke the order provisioning subsystem (OPS) 2224 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 2224 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 2202 may send a response or notification 2244 to the requesting customer to indicate when the requested service is now ready for use. In some instances, information (e.g., a link) may be sent to the customer that enables the customer to start using and availing the benefits of the requested services. In certain embodiments, for a customer requesting the automated-generation-of-regular-expressions-related service, the response may include instructions which, when executed, cause display of a user interface.

Cloud infrastructure system 2202 may provide services to multiple customers. For each customer, cloud infrastructure system 2202 is responsible for managing information related to one or more subscription orders received from the customer, maintaining customer data related to the orders, and providing the requested services to the customer. Cloud infrastructure system 2202 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 2202 may provide services to multiple customers in parallel. Cloud infrastructure system 2202 may store information for these customers, including possibly proprietary information. In certain embodiments, cloud infrastructure system 2202 comprises an identity management subsystem (IMS) 2228 that is configured to manage customer information and provide the separation of the managed information such that information related to one customer is not accessible by another customer. IMS 2228 may be configured to provide various security-related services such as identity services; information access management, authentication and authorization services; services for managing customer identities and roles and related capabilities, and the like.

Figure 23:
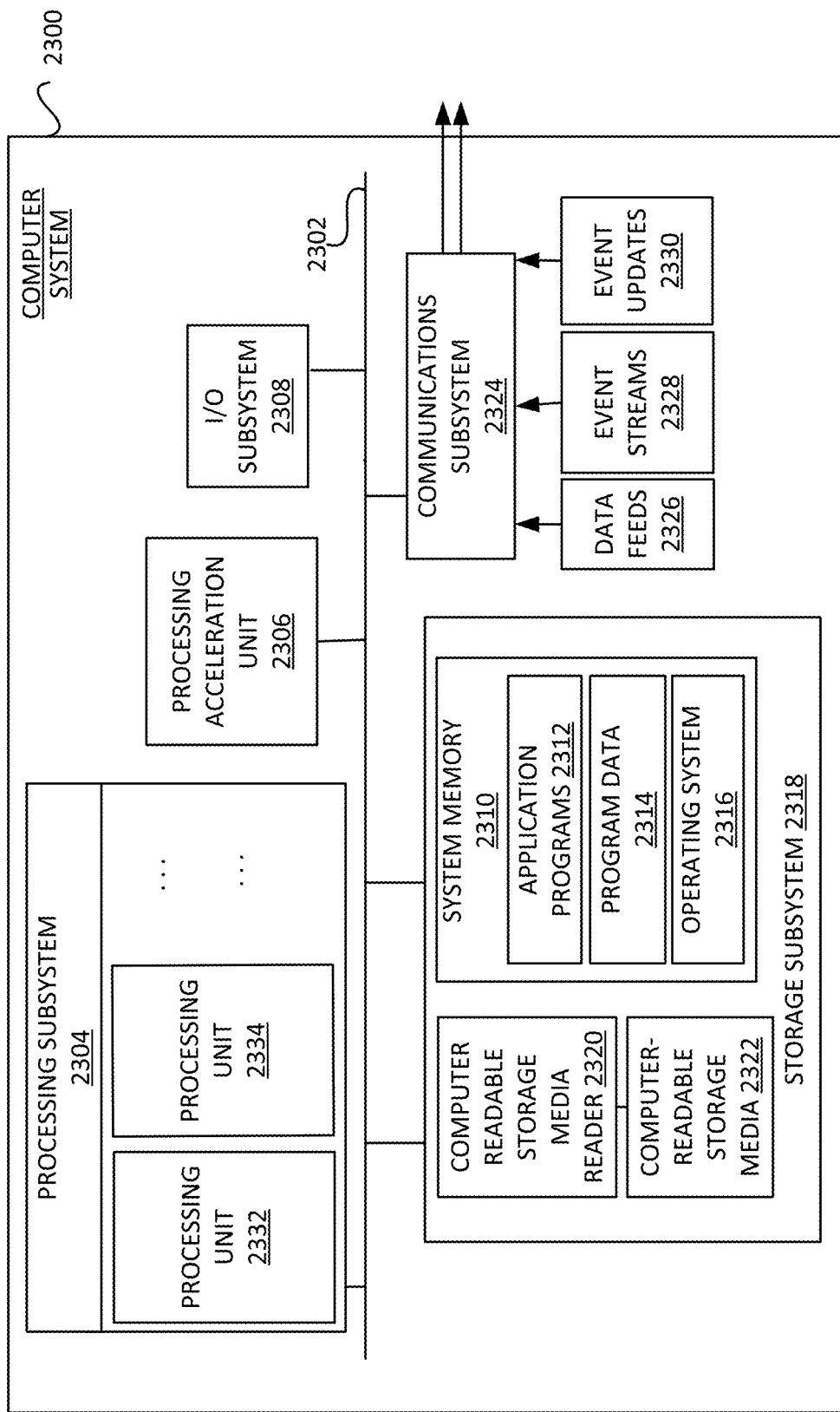
FIG. 23 is a block diagram illustrating an exemplary computer system in which embodiments of the present invention may be implemented.

FIG. 23 illustrates an example of computer system 2300. In some embodiments, computer system 2300 may be used to implement any of the systems described above. As shown in FIG. 23, computer system 2300 includes various subsystems including a processing subsystem 2304 that communicates with a number of other subsystems via a bus subsystem 2302. These other subsystems may include processing acceleration unit 2306, I/O subsystem 2308, storage subsystem 2318, and communications subsystem 2324. Storage subsystem 2318 may include non-transitory computer-readable storage media including storage media 2322 and system memory 2310.

Bus subsystem 2302 provides a mechanism for letting the various components and subsystems of computer system 2300 communicate with each other as intended. Although bus subsystem 2302 is shown schematically as a single bus, alternative examples of the bus subsystem may utilize multiple buses. Bus subsystem 2302 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 2304 controls the operation of computer system 2300 and may comprise one or more processors, application specific integrated circuits (ASICs), or field programmable gate arrays (FPGAs). The processors may include be single core or multicore processors. The processing resources of computer system 2300 may be organized into one or more processing units 2332, 2334, etc. A processing unit may include one or more processors, one or more cores from the same or different processors, a combination of cores and processors, or other combinations of cores and processors. In some embodiments, processing subsystem 2304 may include one or more special purpose co-processors such as graphics processors, digital signal processors (DSPs), or the like. In some embodiments, some or all of the processing units of processing subsystem 2304 may be implemented using customized circuits, such as application specific integrated circuits (ASICs), or field programmable gate arrays (FPGAs).

In some embodiments, the processing units in processing subsystem 2304 may execute instructions stored in system memory 2310 or on computer readable storage media 2322. In various examples, the processing units may execute a variety of programs or code instructions and may maintain multiple concurrently executing programs or processes. At any given time, some or all of the program code to be executed may be resident in system memory 2310 and/or on computer-readable storage media 2322 including potentially on one or more storage devices. Through suitable programming, processing subsystem 2304 may provide various functionalities described above. In instances where computer system 2300 is executing one or more virtual machines, one or more processing units may be allocated to each virtual machine.

In certain embodiments, a processing acceleration unit 2306 may optionally be provided for performing customized processing or for off-loading some of the processing performed by processing subsystem 2304 so as to accelerate the overall processing performed by computer system 2300.

I/O subsystem 2308 may include devices and mechanisms for inputting information to computer system 2300 and/or for outputting information from or via computer system 2300. In general, use of the term input device is intended to include all possible types of devices and mechanisms for inputting information to computer system 2300. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 2300 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2318 provides a repository or data store for storing information and data that is used by computer system 2300. Storage subsystem 2318 provides a tangible non-transitory computer-readable storage medium for storing the basic programming and data constructs that provide the functionality of some examples. Storage subsystem 2318 may store software (e.g., programs, code modules, instructions) that when executed by processing subsystem 2304 provides the functionality described above. The software may be executed by one or more processing units of processing subsystem 2304. Storage subsystem 2318 may also provide a repository for storing data used in accordance with the teachings of this disclosure.

Storage subsystem 2318 may include one or more non-transitory memory devices, including volatile and non-volatile memory devices. As shown in FIG. 23, storage subsystem 2318 includes system memory 2310 and computer-readable storage media 2322. System memory 2310 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2300, such as during start-up, may typically be stored in the ROM. The RAM typically contains data and/or program modules that are presently being operated and executed by processing subsystem 2304. In some implementations, system memory 2310 may include multiple different types of memory, such as static random access memory (SRAM), dynamic random access memory (DRAM), and the like.

By way of example, and not limitation, as depicted in FIG. 23, system memory 2310 may load application programs 2312 that are being executed, which may include various applications such as Web browsers, mid-tier applications, relational database management systems (RDBMS), etc., program data 2314, and operating system 2316. By way of example, operating system 2316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 2322 may store programming and data constructs that provide the functionality of some examples. Computer-readable media 2322 may provide storage of computer-readable instructions, data structures, program modules, and other data for computer system 2300. Software (programs, code modules, instructions) that, when executed by processing subsystem 2304 provides the functionality described above, may be stored in storage subsystem 2318. By way of example, computer-readable storage media 2322 may include non-volatile memory such as a hard disk drive, a magnetic disk drive, an optical disk drive such as a CD ROM, DVD, a Blu-Ray® disk, or other optical media. Computer-readable storage media 2322 may include, but is not limited to, Zip® drives, flash memory cards, universal serial bus (USB) flash drives, secure digital (SD) cards, DVD disks, digital video tape, and the like. Computer-readable storage media 2322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 2318 may also include computer-readable storage media reader 2320 that may further be connected to computer-readable storage media 2322. Reader 2320 may receive and be configured to read data from a memory device such as a disk, a flash drive, etc.

In certain embodiments, computer system 2300 may support virtualization technologies, including but not limited to virtualization of processing and memory resources. For example, computer system 2300 may provide support for executing one or more virtual machines. In certain embodiments, computer system 2300 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 2300. Accordingly, multiple operating systems may potentially be run concurrently by computer system 2300.

Communications subsystem 2324 provides an interface to other computer systems and networks. Communications subsystem 2324 serves as an interface for receiving data from and transmitting data to other systems from computer system 2300. For example, communications subsystem 2324 may enable computer system 2300 to establish a communication channel to one or more client devices via the Internet for receiving and sending information from and to the client devices.

Communication subsystem 2324 may support both wired and/or wireless communication protocols. In certain embodiments, communications subsystem 2324 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments, communications subsystem 2324 may provide wired network connectivity (e.g., Ethernet) in addition to or instead of a wireless interface.

Communication subsystem 2324 may receive and transmit data in various forms. In some embodiments, in addition to other forms, communications subsystem 2324 may receive input communications in the form of structured and/or unstructured data feeds 2326, event streams 2328, event updates 2330, and the like. For example, communications subsystem 2324 may be configured to receive (or send) data feeds 2326 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 2324 may be configured to receive data in the form of continuous data streams, which may include event streams 2328 of real-time events and/or event updates 2330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2324 may also be configured to communicate data from computer system 2300 to other computer systems or networks. The data may be communicated in various different forms such as structured and/or unstructured data feeds 2326, event streams 2328, event updates 2330, and the like to one or more databases that may be in communication with one or more streaming data source computers coupled to computer system 2300.

Computer system 2300 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 2300 depicted in FIG. 23 is intended only as a specific example. Many other configurations having more or fewer components than the system depicted in FIG. 23 are possible. Based on the disclosure and teachings provided herein, a person of ordinary skill in the art will appreciate other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The invention claimed is:

1. A method of generating a regular expression comprising:
receiving, by a regular expression generator comprising one or more processors, a first input data that is divided into a first fragment of the first input data, a second fragment of the first input data and a third fragment of the first input data;
receiving, by the regular expression generator, a second input data that is divided into a first fragment of the second input data, a second fragment of the second input data, and a third fragment of the second input data;
receiving, by the regular expression generator, a first selection of the first fragment of the first input data;
in response to receiving the first selection of the first fragment of the first input data highlighting the first fragment of the first input data;
receiving, by the regular expression generator, a second selection of the first fragment of the second input data;
in response to receiving the second selection of the first fragment of the second input data highlighting the first fragment of the second input data;
aligning, by the regular expression generator, the first fragment of the first input data that is highlighted with the first fragment of the second input data that is highlighted; and
generating a first regular expression for data in the first fragment of the first input data that is highlighted and data in the first fragment of the second input data that is highlighted based on the alignment of the highlighted first fragment of the first input data with the highlighted first fragment of the second input data.

2. The method according to claim 1, further comprising:
aligning, by the regular expression generator, the second fragment of the first input data and the second fragment of the second input data; and
aligning, by the regular expression generator, the third fragment of the first input data and the third fragment of the second input data.

3. The method according to claim 2, further comprising:
generating, by the regular expression generator, a second regular expression for the second fragment of the first input data and the second fragment of the second input data that are aligned; and
generating, by the regular expression generator, a third regular expression for the third fragment of the first input data and the third fragment of the second input data that are aligned.

4. The method according to claim 3, further comprising
determining, by the regular expression generator, a first span for the first regular expression;
determining, by the regular expression generator, a second span for the second regular expression;
determining, by the regular expression generator, a third span for the third regular expression; and
concatenating, by the regular expression generator, the first span, the second span and the third span.

5. The method according to claim 4, further comprising:
executing, by the regular expression generator, a longest common subsequence algorithm on the concatenated first span, second span and third span; and
determining, by the regular expression generator, a longest common subsequence for the concatenated first span, second span and third span.

6. The method according to claim 5, further comprising generating a fourth regular expression based on the determined longest common subsequence for the concatenated first span, second span and third span.

7. The method according to claim 4, further comprising:
converting the first span comprising one or more numbers and one or more letters into an alphanumeric span; and
generating a mapping of indices that associates the alphanumeric span to indices of the one or more numbers and the one or more letters.

8. The method according to claim 1, wherein the first fragment of the first input data is a highlighted fragment, wherein the second fragment of the first input data is data before the highlighted fragment, and wherein the third fragment of the first input data is data after the highlighted fragment.

9. The method according to claim 1, wherein in response to the first regular expression comprising one or more symbols, associating each of the one or more symbols with a separate span.

10. A regular expression generator server computer comprising:
 a processor;
 a memory;
 a computer readable medium coupled to the processor, the computer readable medium storing instructions executable by the processor for implementing a method comprising:
 receiving, by a regular expression generator comprising one or more processors, a first input data that is divided into a first fragment of the first input data, a second fragment of the first input data and a third fragment of the first input data;
 receiving, by the regular expression generator, a second input data that is divided into a first fragment of the second input data, a second fragment of the second input data, and a third fragment of the second input data;
 receiving, by the regular expression generator, a first selection of the first fragment of the first input data;
 in response to receiving the first selection of the first fragment of the first input data highlighting the first fragment of the first input data;
 receiving, by the regular expression generator, a second selection of the first fragment of the second input data;
 in response to receiving the second selection of the first fragment of the second input data highlighting the first fragment of the second input data;
 aligning, by the regular expression generator, the first fragment of the first input data that is highlighted with the first fragment of the second input data that is highlighted; and
 generating a first regular expression for data in the first fragment of the first input data that is highlighted and data in the first fragment of the second input data that is highlighted based on the alignment of the highlighted first fragment of the first input data with the highlighted first fragment of the second input data.

11. The server computer according to claim 10, further comprising:
 aligning, by the regular expression generator, the second fragment of the first input data and the second fragment of the second input data; and
 aligning, by the regular expression generator, the third fragment of the first input data and the third fragment of the second input data.

12. The server computer according to claim 10, further comprising:
 generating, by the regular expression generator, a second regular expression for the second fragment of the first input data and the second fragment of the second input data that are aligned; and
 generating, by the regular expression generator, a third regular expression for the third fragment of the first input data and the third fragment of the second input data that are aligned.

13. The server computer according to claim 12, further comprising determining, by the regular expression generator, a first span for the first regular expression;
 determining, by the regular expression generator, a second span for the second regular expression;
 determining, by the regular expression generator, a third span for the third regular expression; and
 concatenating, by the regular expression generator, the first span, the second span and the third span.

14. The server computer according to claim 13, further comprising:
 executing, by the regular expression generator, a longest common subsequence algorithm on the concatenated first span, second span and third span; and determining, by the regular expression generator, a longest common subsequence for the concatenated first span, second span and third span.

15. A non-transitory computer readable medium including instructions configured to cause one or more processors to perform operations comprising:
 receiving, by a regular expression generator comprising one or more processors, a first input data that is divided into a first fragment of the first input data, a second fragment of the first input data and a third fragment of the first input data;
 receiving, by the regular expression generator, a second input data that is divided into a first fragment of the second input data, a second fragment of the second input data, and a third fragment of the second input data;
 receiving, by the regular expression generator, a first selection of the first fragment of the first input data;
 in response to receiving the first selection of the first fragment of the first input data highlighting the first fragment of the first input data;
 receiving, by the regular expression generator, a second selection of the first fragment of the second input data;
 in response to receiving the second selection of the first fragment of the second input data highlighting the first fragment of the second input data;
 aligning, by the regular expression generator, the first fragment of the first input data that is highlighted with the first fragment of the second input data that is highlighted; and
 generating a first regular expression for data in the first fragment of the first input data that is highlighted and data in the first fragment of the second input data that is highlighted based on the alignment of the highlighted first fragment of the first input data with the highlighted first fragment of the second input data.

16. The computer readable medium according to claim 15, further comprising:
 aligning, by the regular expression generator, the second fragment of the first input data and the second fragment of the second input data; and
 aligning, by the regular expression generator, the third fragment of the first input data and the third fragment of the second input data.

17. The computer readable medium according to claim 15, further comprising:
 generating, by the regular expression generator, a second regular expression for the second fragment of the first input data and the second fragment of the second input data that are aligned; and
 generating, by the regular expression generator, a third regular expression for the third fragment of the first input data and the third fragment of the second input data that are aligned.

18. The computer readable medium according to claim 17, further comprising
 determining, by the regular expression generator, a first span for the first regular expression;
 determining, by the regular expression generator, a second span for the second regular expression;

determining, by the regular expression generator, a third span for the third regular expression; and concatenating, by the regular expression generator, the first span, the second span and the third span.

\* \* \* \* \*

UNITED STATES PATENT AND TRADEMARK OFFICE
CERTIFICATE OF CORRECTION

PATENT NO. : 11,580,166 B2
APPLICATION NO. : 16/904316
DATED : February 14, 2023
INVENTOR(S) : Malak et al.

It is certified that error appears in the above-identified patent and that said Letters Patent is hereby corrected as shown below:

On the Title Page

On page 2, Column 2, under item [56] Other Publications, Line 30, delete "Algorithmfor" and insert -- Algorithm for --, therefor.

In the Specification

In Column 6, Line 32, delete "in in" and insert -- in --, therefor.

In Column 14, Line 38, delete "{1}" and insert -- {6} --, therefor.

In Column 15, Line 8, delete ""[Am]" and insert -- "[AM] --, therefor.

In Column 30, Line 39, delete "WindowsNT)" and insert -- Windows NT) --, therefor.

In Column 30, Line 55, delete ""WindowsNT" and insert -- "Windows NT --, therefor.

In Column 31, Line 14, delete ""WindowsNT" and insert -- "Windows NT --, therefor.

In Column 31, Line 25, delete ""WindowsNT" and insert -- "Windows NT --, therefor.

In Column 40, Line 19, after "3131." delete "[0231]", therefor.

In Column 40, Lines 19-23, delete "At step 3360, after the obfuscate command is received, the obfuscate generator 2414 of the regular expression generation server 2400 can automatically obfuscate all of the second fields of the social security numbers in the "ssn" column 3110." and insert the same on Column 40, Line 20, as a new paragraph, therefor.

In Column 44, Line 61, delete "S010," and insert -- 5010, --, therefor.

Signed and Sealed this
Second Day of January, 2024

Katherine Kelly Vidal
*Director of the United States Patent and Trademark Office*

CERTIFICATE OF CORRECTION (continued)
U.S. Pat. No. 11,580,166 B2

In Column 45, Line 9, delete "S020," and insert -- 5020, --, therefor.

In Column 45, Line 20, delete "S030," and insert -- 5030, --, therefor.

In Column 45, Line 29, delete "S040," and insert -- 5040, --, therefor.

In Column 45, Line 42, delete "S050," and insert -- 5050, --, therefor.

In Column 45, Line 58, delete "S040" and insert -- 5040 --, therefor.

In Column 45, Line 59, delete "S110," and insert -- 5110, --, therefor.

In Column 46, Line 4, delete "S030" and insert -- 5030 --, therefor.

In Column 46, Line 5, delete "S120," and insert -- 5120, --, therefor.

In Column 46, Line 19, delete "S120" and insert -- 5120 --, therefor.

In Column 46, Line 26, delete "S130," and insert -- 5130, --, therefor.

In Column 46, Line 38, delete "S130" and insert -- 5130 --, therefor.

In Column 46, Line 45, delete "S140," and insert -- 5140, --, therefor.

In Column 46, Line 48, delete "S120 and S130)" and insert -- 5120 and 5130) --, therefor.

In Column 49, Line 41, delete "[A-Z a-z{3, 9})." and insert -- [A-Za-z] {3, 9}). --, therefor.

In Column 54, Line 10, delete "A" and insert -- ^ --, therefor.

In Column 56, Line 4, delete "4." and insert -- \w. --, therefor.

In Column 56, Line 44, delete "after" and insert -- "after --, therefor.

In Column 56, Line 56, delete "S310," and insert -- 5310, --, therefor.

In Column 56, Line 66, delete "S320," and insert -- 5320, --, therefor.

In Column 57, Line 14, delete "S330," and insert -- 5330, --, therefor.

In Column 57, Line 26, delete "S340," and insert -- 5340, --, therefor.

In Column 57, Line 31, delete "S350," and insert -- 5350, --, therefor.

In Column 57, Line 36, delete "S360," and insert -- 5360, --, therefor.

CERTIFICATE OF CORRECTION (continued)
U.S. Pat. No. 11,580,166 B2

In Column 57, Line 50, delete "S370," and insert -- 5370, --, therefor.

In Column 57, Line 54, delete "S380," and insert -- 5380, --, therefor.

In Column 57, Line 62, delete "times)." and insert -- times. --, therefor.

In Column 58, Line 15, delete "S410," and insert -- 5410, --, therefor.

In Column 58, Line 28, delete "S420," and insert -- 5420, --, therefor.

In Column 58, Line 31, delete "S430," and insert -- 5430, --, therefor.

In Column 58, Line 35, delete "S440," and insert -- 5440, --, therefor.

In Column 60, Line 26, delete "(PDAs)," and insert -- (PDAs)), --, therefor.